US008321688B2

(12) United States Patent
Auradkar et al.

(10) Patent No.: US 8,321,688 B2
(45) Date of Patent: Nov. 27, 2012

(54) SECURE AND PRIVATE BACKUP STORAGE AND PROCESSING FOR TRUSTED COMPUTING AND DATA SERVICES

(75) Inventors: Rahul V. Auradkar, Sammamish, WA (US); Roy Peter D'Souza, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 12/483,817

(22) Filed: Jun. 12, 2009

(65) Prior Publication Data

US 2010/0318812 A1 Dec. 16, 2010

(51) Int. Cl.
*G06F 15/16* (2006.01)
*G06F 12/14* (2006.01)

(52) U.S. Cl. ........ 713/189; 713/190; 713/191; 713/192; 713/193; 380/44

(58) Field of Classification Search .......... 713/189–193, 713/150; 380/44
See application file for complete search history.

(56) References Cited

U.S. PATENT DOCUMENTS 6,538,669 B1 3/2003 Lagueux
6,577,734 B1 6/2003 Etzel
6,772,332 B1 8/2004 Boebert
7,277,941 B2 10/2007 Ignatius et al.
2004/0151318 A1* 8/2004 Duncanson, Jr. ............. 380/277
2004/0230958 A1* 11/2004 Alaluf ............................ 717/140
2004/0236958 A1 11/2004 Teicher et al.
2005/0137983 A1* 6/2005 Bells ............................... 705/51
2005/0257062 A1 11/2005 Ignatius
2006/0272023 A1 11/2006 Schmeidler
2007/0143365 A1 6/2007 D'Souza et al.
2008/0016127 A1* 1/2008 Field ............................ 707/202
2008/0263363 A1* 10/2008 Jueneman et al. ............ 713/184
2008/0320319 A1 12/2008 Muller et al.
2010/0162002 A1* 6/2010 Dodgson et al. .............. 713/193
2010/0211781 A1 8/2010 Auradkar et al.
2010/0211782 A1 8/2010 Auradkar et al.
2010/0313039 A1* 12/2010 Ignatius et al. ............... 713/189
2010/0318782 A1 12/2010 Auradkar et al.
2010/0318812 A1* 12/2010 Auradkar et al. ............. 713/193

OTHER PUBLICATIONS

International Search Report and Written Opinion regarding International Application No. PCT/US2010/038218 dated Dec. 14, 2010.
"HP Storage Data Protector Software", accessed from <<http://h20195.www2.hp.com/PDF/5982-9285EEW.pdf>> on Jan. 24, 2009.
"Data Encryption", accessed from <<http://documentation.commvault.com/commvault/release_7_0_0/books_online_1/english_us/features/data_encryption/data_encryption.htm>> on Jan. 24, 2009.

(Continued)

*Primary Examiner* — Krisna Lim

(57) ABSTRACT

A digital escrow pattern is provided for backup data services including searchable encryption techniques for backup data, such as synthetic full backup data, stored at remote site or in a cloud service, distributing trust across multiple entities to avoid a single point of data compromise. In one embodiment, an operational synthetic full is maintained with encrypted data as a data service in a cryptographically secure manner that addresses integrity and privacy requirements for external or remote storage of potentially sensitive data. The storage techniques supported include backup, data protection, disaster recovery, and analytics on second copies of primary device data. Some examples of cost-effective cryptographic techniques that can be applied to facilitate establishing a high level of trust over security and privacy of backup data include, but are not limited to, size-preserving encryption, searchable-encryption, or Proof of Application, blind fingerprints, Proof of Retrievability, and others.

23 Claims, 42 Drawing Sheets

First Region of Control 110
Second Region of Control 130
Computing Device(s) 100
Processor(s) P1
Memory(ies) M1
Data Set for Full or Incremental Backup 105
Encrypted Backup Data 140
Restored Data Items 150
Computing Device(s) 120
Processor(s) P2
Encrypted Synthetic Full Backup Data 145
Memory(ies) M2
Analysis Services 170
Third Region of Control 190
Fourth Region of Control 195
Cryptographic Technology Provider 180
Computing Device(s) 160
Processor(s) P3
Memory(ies) M3

OTHER PUBLICATIONS

"Retrospect 7 for Windows", accessed from <<http://list.dantz.com/pipermail/rdu__announcement/2005-January/000027.html>> on Jan. 24, 2009.

"Kaseya Backup and Disaster Recovery", accessed from <<http://www.kaseya.com/products/backup-disaster-recovery__aspx>> on Jan. 24, 2009.

"Hitachi Backup and Recovery Software, Powered by CommVault", accessed from <<http://www.hds.com/assets/pdf/wp186__backup__%20recovery.pdf>> on Jan. 24, 2009.

"The State of Data Backup Protection", accessed from <<http://www.networkcomputing.com/showitem.jhtml?articleID=199905067&pgno=3>> on Jan. 24, 2009.

* cited by examiner

Ecosystem 1720
Data Center1 1730 (e.g. Secure Cert/Trust Authority)
Policy 1732
CKG 1734
A
Setup 1735
Obtain Public Parameters 1745
Extract 1765
C
Data Center2 1740 (e.g. Crypto Provider)
Computer and Storage Abstraction 1742
Encrypt 1755
B
Decrypt 1775
D
Data Center3 1750 (e.g. storage provider)
Cloud Service Provider (CSP) 1752
Enterprises 1700
Organization A 1702
Server 1712 (e.g. SharePoint)
Organization B 1704
Publisher 1714
Subscriber 1716

SECURE AND PRIVATE BACKUP STORAGE AND PROCESSING FOR TRUSTED COMPUTING AND DATA SERVICES

TECHNICAL FIELD

The subject disclosure relates to providing trusted cloud computing and data services for device(s), and more specifically, to enabling cryptographically secure and private storage, processing or analysis services for backup data, such as synthetic full backup data.

BACKGROUND

By way of background concerning some conventional systems, computing devices have traditionally executed applications and data services locally to the device. In such case, as data is accessed, processed, stored, cached, etc., the data may travel on the device over local buses, interfaces and other data pathways, however, the user of the device has not had to worry about interference or exposure of user data unless the device itself is lost or stolen.

Yet, with the evolution of on-line and cloud services, applications and services are increasingly being moved to network providers who perform some or all of a given service on behalf of devices. In such case, the user of the device(s) may become concerned with who can access, or potentially worse, interfere with, the user's data while it is uploaded to a service, while it is stored or processed by the service or while it retrieved from the service. In short, when the data of a user's device leaves the domain of physical possession and enters a network environment away from the user, a concern over sloppy or malicious handling of or interference with the data by third parties naturally arises. Accordingly, it is desirable to increase the trust, security and privacy for cloud services and the handling of data in connection with cloud services, or even within an enterprise where the data leaves one region of control and enters another.

For instance, today, users can attach an external drive to a primary device, such as a local personal computer (PC) or other device, and create a synthetic full backup of data of the primary device. As the name suggests, a synthetic full backup is a synthesized backup created based on most recent full backup data, e.g., standard or synthetic, and any implicated subsequent incremental or differential backups.

Conventionally, this physical possession of a reconstructable copy of data on an external drive has guarded against the loss of important data stored on the primary device. For instance, by attaching the external drive or disk, such as a Flash memory drive or other external hard drive, via USB cable or the like, a user of the device could be comforted that the data can be reconstructed in the event of loss of the primary device. This way, if the primary device suffers some sort of catastrophic condition that prevents access to its data, or results in irrevocable distortion or destruction of the data, the data can be recovered from the external drive or disk in possession of the user. However, of course, if the primary device and the external drive are both damaged in the same catastrophe (e.g., earthquake), then the problem is back to square one.

The evolution of network storage farms capable of storing terabytes of data (with potential for petabytes, exabytes, etc. of data in the future) has created an opportunity to mimic the local scenario in a cloud, with separation of the primary device and the external storage. Cloud storage of backup data also allows many devices to store their backup data without the need for separate storage for each device. In this regard, instead of storing the backup data by attaching a secondary storage device to the primary device via cable, with cloud storage, the backup data is transmitted to and stored by a cloud service provider, which manages the storage of the backup data on behalf of the device.

However, as alluded to above, the problem remains that no cloud service or network storage provider has been able to effectively alleviate the problems of and demands for security, privacy and integrity of the backup data while stored in the cloud. In short, users require elevated trust that their data remains secure and private when physical control over the storage vehicle is surrendered, and this hurdle has significantly prevented enterprises and consumers from adopting the backup of important data via third party network services and solutions.

The above-described deficiencies of today's devices and data backup services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Network data services including searchable encryption techniques for backup data in a cloud that may be stored, processed, accessed or retrieved are provided in a way that distributes trust across multiple entities to avoid a single point of data compromise. In one embodiment, a key generator, a cryptographic technology provider and a cloud services provider are each provided as separate entities, enabling publishers of backup data to publish data confidentially (encrypted) to a cloud services provider, and enabling selective access to the encrypted backup data to authorized subscribers based on subscriber identity information encoded in requests for access.

In one embodiment, an operational synthetic full is maintained with encrypted data as a data service in a cryptographically secure manner that addresses integrity and privacy requirements for external or remote storage of potentially sensitive data. In one embodiment, the storage techniques supported include backup, data protection, disaster recovery, and analytics on second copies of primary device data. Some examples of cost-effective cryptographic techniques that can be applied to facilitate establishing a high level of trust over security and privacy of data include, but are not limited to, size-preserving encryption, searchable-encryption, or Proof of Application, blind fingerprints, Proof of Retrievability, etc.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
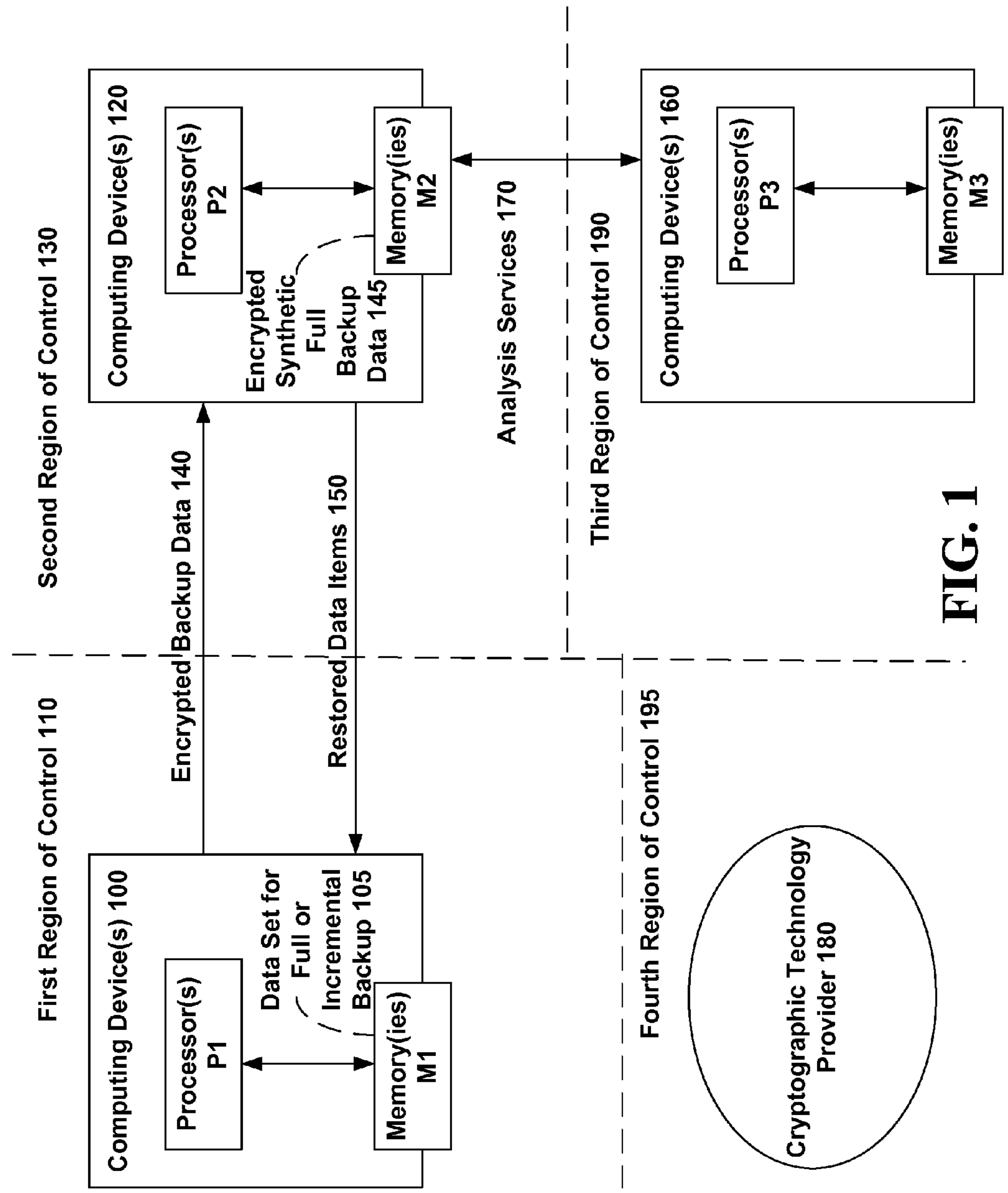
FIG. 1 is a block diagram of a general environment for providing one or more embodiments of backup services.

As discussed in the background, backup data sent to a network service can create discomfort with respect to privacy, potential for tampering, etc., e.g., when data is transmitted from a user's device to a network application, service or data store, a user needs sufficient assurance that no malevolent third party can cause harm. By definition, the user has lost control over the data. It is thus desirable to increase trust so that publishers and/or owners of backup data are willing to surrender physical control over their backup data, trusting that their data will remain private, and inviolate, while in the network, except when accessed by the publishers and/or owners or to anyone to whom privileges have been granted as verified based on requester identity.

As described in a variety of non-limiting embodiments below, techniques for maintaining an operational external synthetic full with encrypted data are provided as part of the provision of network data backup services. Most enterprise production servers and services provide the ability to implement a conventional synthetic full, and many servers, such as Microsoft Exchange, deploy this capability at customer sites in the form of cluster continuous replication (CCR) and standby continuous replication (SCR). With CCR and SCR, however, as alluded to in the background, control over the data is not surrendered to third parties as is the case where a cloud service provider or other data service provider performs the storage.

The provision of data backup services as described herein involves various combinations and permutations of storage and cryptography techniques that enable cost-effective as well as secure and private solutions. For instance, various optional embodiments described in more detail below implement a data protection technique called a 'synthetic full' with cryptographic techniques that include size-preserving encryption, searchable-encryption, and a cryptographic technique termed Proof of Application. Such embodiments enable new business scenarios for outsourced cloud data protection, disaster recovery, or analytics, which today cannot be implemented without failing the privacy or security need of customers.

In this regard, to eliminate the trust barriers that surround conventional provision of network services, a trusted cloud computing and data services ecosystem or framework is provided that achieves the above-identified objectives as well as other advantages highlighted in the various embodiments described below. The term "cloud" services generally refers to the notion that a service is performed not locally from a user's device, but rather delivered from one or more remote devices accessible via one or more networks. Since the user's device does not need to understand the details of what happens at the one or more remote devices, the service appears to be delivered from a "cloud" from the perspective of the user's device.

In one embodiment, a system comprises a key generator that generates key information for publishing or subscribing to data. A cryptographic technology provider, implemented independently from the key generator, implements searchable encryption/decryption algorithm(s) based on the key information generated by the key generator. In addition, a network service provider, implemented independently from the key generator and the cryptographic technology provider, provides a network service with respect to data encrypted by the cryptographic technology provider.

In one embodiment, a data store is provided that exposes selectively accessible, e.g., searchable, encrypted data wherein at least one publisher publishes data representing resource(s) to the data store. Providing a division of the potential for abuse of trust, a first independent entity performs generating of cryptographic key information. A second independent entity in turn performs encrypting of the published data prior to storing based on the cryptographic key information generated by the first independent entity. A set of network or cloud services then selective access to the encrypted data for a given request to the network service based on late bound selected privileges granted by the publisher(s) or owner(s) of the resource(s).

In other embodiments, a data store stores selectively accessible encrypted data wherein subscriber(s) subscribes to a specified subset of the encrypted data. A first independent entity generates cryptographic key information based on identity information associated with the subscriber(s), and a second independent entity performs decrypting of the specified subset based on the cryptographic key information generated by the first independent entity. Network service(s) respond to requests by the subscriber(s) and provide selective access to the encrypted data based on late bound selected privileges granted by the publishers or owners of the specified subset.

In this respect, the terms publisher and subscriber generally refer to anyone that publishes or subscribes to data of a trusted cloud service, respectively. However, in practice, depending on the industry, field, or application of the trusted cloud services ecosystem and digital escrow pattern, publishers and subscribers will take on more specific roles. For instance, in the context of backup data of an entire system, typically only a small group of subscribers will have privileges to access the backup data. For an example in the context of backup data, an auditor of an encrypted backup data store may have certain capabilities based on the role of auditor of the backup data, to make sure certain requirements are met, such as frequency of backup, without being granted access to the content itself.

Further details of these and other various exemplary, non-limiting embodiments and scenarios are provided below.

Secure and Private Backup Storage and Processing

As mentioned, a variety of data protection techniques are applied in connection with the backup of data along with the tools to allow third parties to provide the services while maintaining security and trust. The following description first provides a brief overview of synthetic full techniques. Many enterprise servers, such as Microsoft's Exchange Server, provide the ability to extract full, incremental and differential backups. A differential backup (sometimes referred to as a differential, for short) contains the changes since the last full, and an incremental backup (sometime called an incremental, for short) contains the changes since the most recent full or incremental backup.

For example, for Exchange server, the full backup is a copy of the Exchange DataBase (EDB), and the incremental and differential is a journal log. For another example, in tape-based backup systems, these full and differential or incremental backups are stored on tape and recovered when needed, at which time the most recent full backup is restored from tape. After that, if there is a differential, then that is restored from tape and applied to the recently restored full backup. If there are incremental, then these are restored from tape and sequentially applied to the full in order to bring the data up-to-date.

In some more recent disk-based backup systems, periodic full backups (sometimes referred to as fulls, for short) and subsequent incrementals are transferred from the primary server (the server in operation), to a disk-based server that hosts the backups in lieu of tape. As incrementals arrive in the form of logs, they are applied to the full that is maintained on the backup (or "secondary") server, to bring the data up-to-date. This mechanism of maintaining a remote up-to-date copy is termed a 'synthetic full'. In recent continuous data protection (CDP) systems, a synthetic full is maintained by streaming modifications on the primary server to a backup server and applying these modifications on that server to keep the copy on the backup server up-to-date.

Two measures of effectiveness of a synthetic fulls are the Recovery Point Objective (RPO) and the Recovery Time Objective (RTO). The RPO is an upper bound on the amount of data that can be lost when a primary server is lost for any reason. The RTO is an upper bound on the time between that primary server going offline for any reason, and the secondary server coming online with full functionality. A synthetic full provides significantly better RTO than previous tape-based mechanisms since the incremental logs have already been applied to the backup (or "played"). In a typical enterprise scenario there could be several thousand logs that were generated since the last full, which could take several hours (or even days) to be applied ("replayed") before the secondary copy is brought up-to-date. Therefore, a synthetic full can significantly improve the RTO. The RPO is also enhanced because potential data loss cannot be accurately bounded until there is a guarantee that there are no missing or corrupt logs. Using post-processing at the secondary site, this can be accomplished by replaying the logs as part of maintaining the synthetic full.

Typically, a synthetic full is maintained at a secondary site so that the copy can be transferred back to the primary site after that site has recovered from any failure that resulted in loss of the primary copy. The synthetic full could also be maintained in order to provide near-instantaneous service recovery by deploying this copy as a recovery service from the secondary center when the primary center fails. The synthetic full is also an enabler for fine-grain recovery of objects within that database. For instance, for Exchange, this involves extracting messages, tasks or calendar items from the EDB. This could be due to accidental or malicious deletions at the primary site, or it could be due to a need to stream items back to the primary center for "Dial Tone" recovery, where the primary server returns to operation and is back up from failure that caused data loss. In this regard, the service is made available to users and they can send and receive mail while their data is streamed back in from the secondary copy.

In addition to data protection and disaster recovery capabilities, the synthetic full is also available for use by a range of analytics, from business intelligence to intrusion detection. A variety of services can also execute with respect to the secondary copy to post-process the data for a variety of applications that include, but are not limited to, eDiscovery, Compliance, Governance, Security and BI. However, for data protection and disaster recovery reasons, there is typically a need to host the secondary server at a remote location, so that the secondary server can survive failures independently from the primary server. In addition, the operational complexity could be outsourced to an external organization. A cloud service provider, for instance, could provide a Cloud backup service that would enable all these applications, without the enterprise needing to bear the cost and complexity of maintaining multiple copies of their enterprise data, and without having to spend development resources to implement.

As alluded to in the background, the maintenance of sensitive enterprise data at a remote site owned by a service organization can put that data at risk ranging from privacy violations to data loss. As described for various embodiments herein, protecting privacy involves encrypting the data before it leaves the primary data center. However, that would not protect from data loss or corruption at the secondary site. In addition, conventional encryption of data would preclude any post processing of that data for maintaining a synthetic full, for performing administrative operations as part of that synthetic full, and for accessing that copy for implementing services, some of which were outlined above.

FIG. 1 is a block diagram of a general environment for providing one or more embodiments of backup services as described herein. In general, computing device(s) 100 (e.g., the backup customer) are in a first region of control 110, computing device(s) 120 (e.g., the cloud service providers) are in a second region of control 130, computing device(s) 160 are in a third region of control 190 and cryptographic technology provider 180 is provided within a fourth region of control 195. Each of the computing device(s) 100, 120, 160 may include processor(s) P1, P2, P3, respectively and storage M1, M2, M3, respectively. In this regard, as described in accordance with various non-limiting embodiments, techniques for enabling encrypted backup data 140 in the cloud are provided so that items 150 can be restored from the cloud and so that a set of analytical services 170 can be predicated on top of the encrypted synthetic full backup data 145 that is maintained in the cloud based on the local data set 105 from device(s) 100.

As described in more detail below, various cryptographic techniques are incorporated into the provision of backup services that can provide strong guarantees of privacy and non-repudiation for service users. By integrating these cryptographic techniques with data protection techniques, a synthetic full can be maintained as a remote service and layered applications can be implemented on top of the synthetic full data in a manner that lets the owner of that data and the enterprise customer (the "customer"), to have precise control over the type of operations that can be performed by the entity hosting the data, or the Cloud Service Provider or Operator (the "CSP"). In addition, many of these operations can be performed by the CSP on behalf of the customer, without learning or otherwise seeing the actual contents of the data on which operations are performed. Finally, the customer can detect if the CSP is inappropriately deleting or modifying data, or moving the data to lower-performance secondary or tertiary storage.

As mentioned, a variety of cryptography techniques are integrated with backup services to provide confidence to the customer to relinquish control over backup data, e.g., to increase security and privacy.

For instance, searchable encryption is an encryption method where essential metadata is copied out of the data before it is encrypted. For a non-limiting example, in the case of Exchange e-mail, the data is a message with its attachments and the essential metadata could include selected messaging application programming interface (MAPI) properties and a full-text index. For instance, the data is encrypted, e.g., using advanced encryption standard (AES), whereas the metadata is encrypted in a manner that generates encrypted indices. As a result, the encrypted data and indices can now be handed over to another entity that is not fully trusted, such as a CSP. Subsequent selective access to the aggregated encrypted data and indices can be accomplished by the owner of that data, the customer, sending up an encrypted query to the CSP (or other authorized subscribers). Hence, the CSP can apply encrypted queries on the encrypted indices and return the encrypted data that matches, however, the CSP does not learn anything about the contents of the data, the metadata, the queries, or the results (unless authorized by the customer).

Proof of Possession and Proof of Retrievability are cryptographic techniques where a "Prover" (in this case, the CSP providing backup storage) and a "Verifier" (the customer) can engage in a protocol where the verifier can efficiently determine if the data they own is intact and available for easy retrieval from the possessor of the data, the CSP. These techniques are efficient in network bandwidth, and in the operations that the CSP performs, so the cost of goods sold (COGS)

of the CSP remain relatively unchanged and the time for completing the protocol is reasonably short.

Another cryptographic technique that can be integrated into the provision of backup data services is Proof of Application. Proof of Application, similar to Proof of Possession, enables the Verifier to ascertain that the synthetic full is being correctly maintained by the Prover, the CSP.

With respect to Proof of Application, when incremental backups are streamed from a primary site to a remote secondary site, which may be outsourced, possibly in the Cloud, the remote entity, per their service level agreement (SLA), is expected to immediately apply incrementals to the copy kept at the secondary in order to maintain the synthetic full. However, this remote entity at the secondary site may choose to not apply these logs, perhaps due to oversight, or perhaps due to a need to keep their cost of goods low, e.g., they may opt to apply the logs at a later time during periods of lower server utilization.

The consequence of this delay in applying the logs would result in a degraded RTO, or the upper bound on the time it would take to restore service at the secondary site if the primary site fails, if a primary server/site failure were to occur during that window. In addition, the RPO, or the upper limit on the production data that could be lost at any instant if the primary server/site were to disappear, would degrade. The reason is that if the logs are not applied, without a Proof of Application mechanism, the data backup owner or customer does not know there is a lurking problem until such time as it is too late to rectify, resulting in lost production data.

Using Exchange as a non-limiting example, incremental backups are in the form of transaction logs, which are sequences of records; the payloads can be suitably encrypted and the metadata can be visible to the secondary/Cloud site operator so they can play the logs to maintain the synthetic full. The Exchange database (EDB) that is being updated is a 4-level B+ tree, with the leaf nodes containing production data. The Verifier knows what the target EDB will look like after any logs are applied. The allocation of the physical pages can be arbitrary, based on the allocator used, but there is a deterministic mapping from the incoming record format of the journal log, to the logical B+ tree.

The Verifier also possibly has embedded information in the encrypted record payload that can be stored in the B+ trees. In such case, the Proof of Application involves the Verifier, or the owner of the data, sending a challenge to the Prover, or the entity responsible for maintaining the synthetic fulls. At the end of the interaction, the Verifier learns if the logs were applied, or not.

Figure 2:
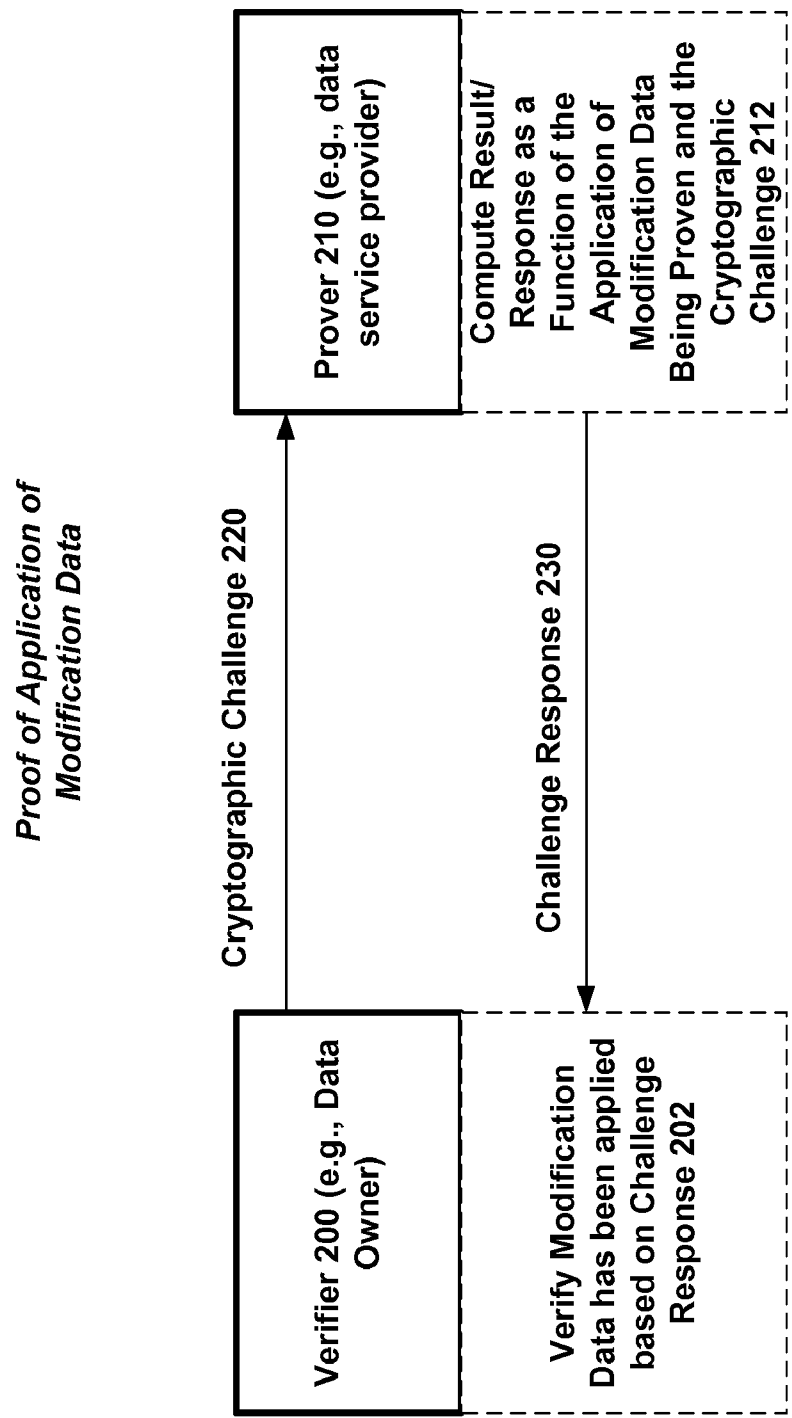
FIG. 2 is a block diagram of a general environment for providing one or more embodiments of backup services including proof of application.

FIG. 2 is a block diagram of a general environment for providing one or more embodiments of backup services including proof of application. In this regard, a verifier 200 (e.g., the data owner or backup customer) issues a cryptographic challenge 220 to a prover 210 (e.g., the backup data service provider), which computes a result 212 as a function of the application of the modification data being proven and the cryptographic challenge. A challenge response 230 is returned which enables the verifier 200 to verify the modifications (e.g., transaction logs of incremental) have been applied based on the challenge response 202.

Blind Fingerprints represent another kind of cryptographic technique that extends network de-duping techniques, such as Rabin Fingerprints, which are typically used for minimizing the exchange of redundant data over a network. In various embodiments herein, fingerprinting is applied such that a participant in the protocol, e.g., the CSP in the case of storage of backup data, is unaware of the actual contents of the data that they are hosting.

For some additional context regarding Blind Fingerprints, any large exchange of data across wide area networks (WANs), including the maintenance of a synthetic full, will desire techniques for "de-duping" over the wire, or making sure that unnecessary data is not sent over the wire. This is accomplished by fingerprinting segments of the data and then exchanging fingerprints so that senders know what they have that the receivers do not have. Also, the receivers know for what data they need to ask the senders. Distributed File Service Replication (DFS-R) can be used for optimizing data exchanges in scenarios, such as branch office backups and distributed file systems over a WAN.

In the case of Exchange, there is significant duplication of data, and it is possible that up to 50%, or more, of data on the wire could be duplicates at any given time. The fingerprints can be obtained at the block level or at an object level, e.g., e-mail, calendar items, tasks, contacts, etc. The fingerprints can be cached at both the primary and secondary data centers. Thus, if there is a failure at a primary data center, then the secondary data can be restored to the primary data center along with fingerprints. The encryption of data at the primary data center should nonetheless allow the fingerprints to be visible to the secondary data center operator, despite being obscured. This can be achieved, for example, by storing fingerprints as keywords/metadata with searchable encryption, so that other than authorized entities/agents in the secondary data center, no other entity would be able to detect patterns.

In the context of backup data services, when sending up a full or an incremental, the primary data center can examine each item/segment/block in the logs, or EDB, and consult the local copy of the fingerprints. If there is a match, then the primary data center replaces the item/segment/block with the fingerprint. The term "blind fingerprints" is referred to as such herein because of the manner in which fingerprinting is applied. In one embodiment, the selection of cryptographic technologies to achieve blind fingerprinting includes a size preservation cryptographic technique.

Figure 3:
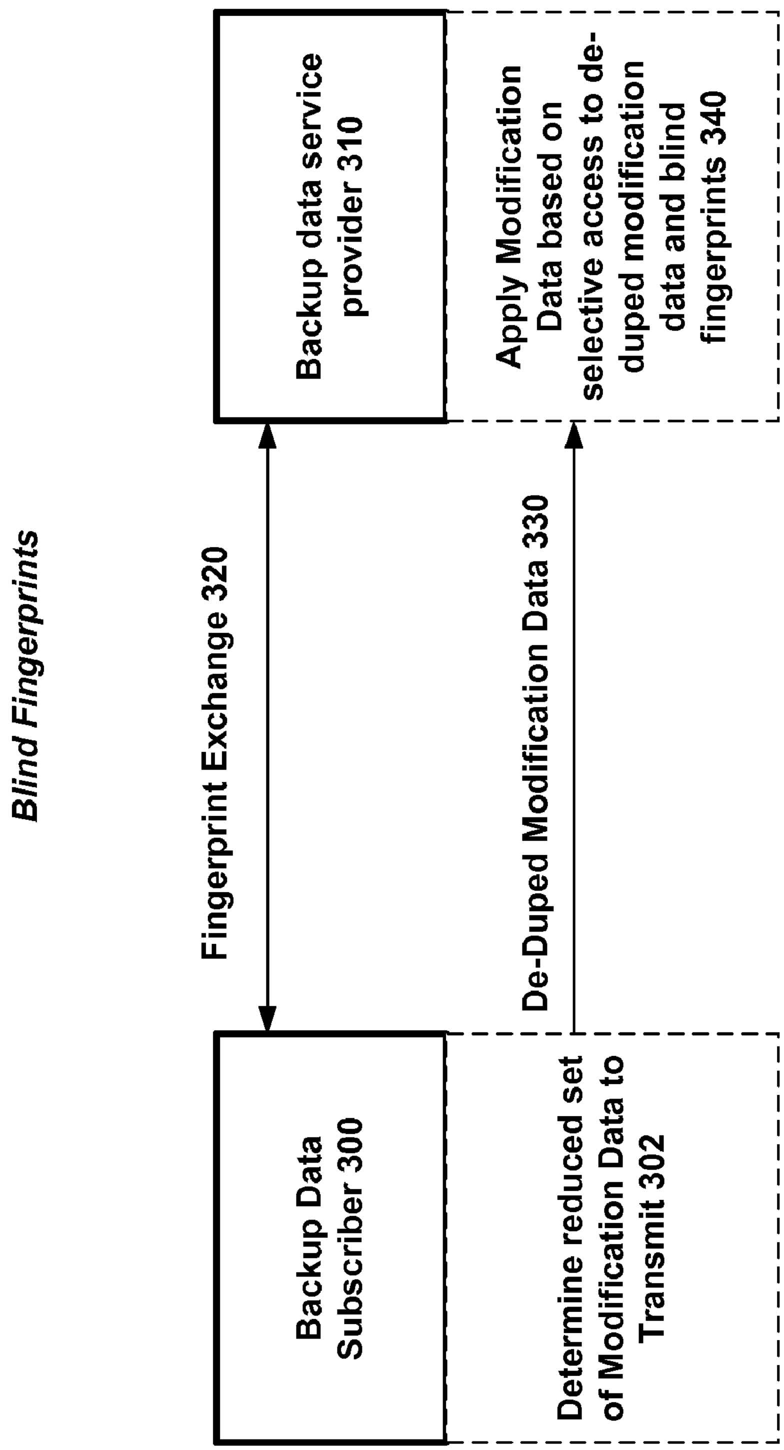
FIG. 3 is a block diagram of a general environment for providing one or more embodiments of backup services including blind fingerprinting.

FIG. 3 is a block diagram of a general environment for providing one or more embodiments of backup services including blind fingerprinting. With blind fingerprints, a backup data subscriber 300 and a backup data service provider 310 undergo a fingerprint exchange to understand as a proxy for what data segments are already possessed on the respective local and backup copies of the data set being backed up. As a result of the fingerprint exchange 320, a reduced set of modification data is determined to transmit at 302 as de-duped modification data 330 to backup data service provider 310, which then applies the modification data based on selectively accessing the de-duped modification data and any blind fingerprints 340.

A variety of scenarios based on the provision of backup services by a CSP thus emerge based on the above-described framework and corresponding cryptographic techniques ranging from storage and compute services to communication and collaboration services. Larger enterprise customers have significant compute and storage assets in their current enterprise data centers, and the inertia to adoption of Cloud services may be high. In addition, customers are experienced in, and familiar with data center operations, wanting to leverage the operating expenses (OPEX) and capital expenses (CAPEX) advantages, and thus are concerned about their sensitive business data moving from premise to the Cloud.

For this class of customers, in various embodiments, a set of applications are provided that involve the customer owning and operating their existing servers, such as Exchange server. The second copy of the data would then be delegated to the cloud service provider for reasons of data protection, archival, compliance, governance, legal or other reasons. The CSP thus has the skills, technologies and economies of scale to preserve this data against data loss or disclosure, and can facilitate running applications on top of this second copy. A small sampling of example products and services that can be offered based on maintaining a synthetic full to the customer include litigation support, monitoring and supervision, service dial-tone, data navigation, etc.

With respect to litigation support, when a company is being sued, there are a variety of entities that are required by the litigation process to perform searches on historical e-mail records. These entities include internal legal staff, HR, managers, external legal counsel, their external litigation support partner, and the opposing legal counsel. There are specific scope rules regarding who can perform what search. In current litigation support scenarios, it is difficult to bound scopes. Hence, it is possible for any individual involved in the litigation support to look at e-mail that is outside scope. In the case of email, results of searches are typically exchanged in the form of personal storage table (PST) files, which constitute additional risk, since these files can be inadvertently or maliciously handed over to unauthorized individuals.

In contrast, when the second copy is hosted remotely, e.g., in the cloud by a CSP, and maintained through a synthetic full, it is possible for a single trusted entity in the enterprise, e.g., the Chief Legal Officer, to provide each individual in the operation with specific trapdoors that will limit their query capabilities to their need. The data being hosted in the Cloud and protected through searchable encryption and a tamper-resistant audit log provides a higher level of protection so that inappropriate e-mail access is prevented. The need to exchange PST files is eliminated, since all individuals in the operation are directly accessing the cloud for queries, and the litigation support partner is the only entity exporting the targeted content for conversion to tagged image file format (TIFF) for case management.

With respect to monitoring and supervising the remote backup data copy, any reasonably sized corporation should proactively monitor their organization's e-mail for various purposes. These could range from legal/compliance, to governance reasons such as monitoring IP leakage, plagiarism, inappropriate language, etc. Typically, the monitoring and supervision software monitors either the primary servers, or a second copy that is backed up or archived. The problem with monitoring the primary servers is that this could place excessive load on busy production servers. In addition, since it is possible for administrators to accidentally or maliciously modify or delete data on the primary servers, a solution is to capture data in a compliant manner and transfer it to a second copy, where monitoring and supervision software continually scans incoming e-mail, looking or searching for patterns. However in many enterprise setups, there is local administrative access to these second copies, and as a result, a resourceful administrator can modify or delete information in spite of tamper detection and prevention mechanisms.

In contrast, maintaining a synthetic full by the CSP advantageously places the second copy in a different region of control. Suitable cryptographic techniques, such as searchable public key encryption (PEKS) and Proof of Possession (POP) can ensure that even collusion between an enterprise administrator and an employee of the CSP still prevents them from positively identifying exactly what item they want to modify. The monitoring and supervision software runs at the remote site or in the Cloud and looks for items that have specific pre-determined keywords through trapdoors that have been previously provided.

With respect to service dial tone, when a primary center suffers from any failure that results in loss of data, to recover, the most recent backup is retrieved and the service is restarted. For certain classes of servers, it is more important for the end user to have the service available than it is for them to have access to all of their data. Therefore, servers, such as Exchange, implement a capability called Dial Tone, where the Exchange mail services are restarted as soon as possible after recovery from failure. The user is then able to send and receive e-mail, while in the background the contents of their mailbox are streamed in from a second backup copy.

In Cloud backup scenarios, bandwidth is at a premium, and the recovery of data from Cloud to enterprise could take an excessive amount of time if it is in the critical path of recovery. A solution that is analogous to Dial Tone is "Service Dial Tone", where the client-side software, e.g., in Exchange or Outlook, streams trapdoors in some order to the remote site, or Cloud, and the CSP would send the associated encrypted messages back to the enterprise. This can be implemented in two phases—the first one sends down the message stubs (headers without body); the second request the actual body and attachments when the user tries to directly access the message. For the above-described backup scenarios, Dial Tone is implemented in a manner that does not compromise the customer's privacy.

With respect to data navigator, in a typical enterprise collaboration or records management scenario, there are likely to be multiple duplicates of documents in a repository. For instance, a group of collaborators might exchange a PowerPoint slide with individual modifications through e-mail. The result is a confusing set of versions that the end user needs to reverse engineer somehow to determine which version is the most relevant, or recent.

When a Cloud hosts the second encrypted copy, a service can operate on the mass of encrypted data through searchable encryption, where the CSP is only provided with specific trapdoors that let the CSP understand message IDs, conversational threads, and anonymized document IDs. Thus, when the user sends up a trapdoor corresponding to a specific document, the CSP service is able to traverse the repository and return the best match. This can range from the most recent, to the entire hierarchy of versions.

Thus, as described according to various embodiments, a synthetic full can be implemented for any server/service that supports full and incremental backups. In this section, Exchange is used as an example scenario, however, it is to be understood that any kind of backup data is supported. Accordingly, while the present embodiment is discussed in the context of Exchange data, the embodiments described herein are not limited to message data. The following steps are executed for maintaining a synthetic full.

1. Full Backup Extraction: A software agent initiates a full backup at a primary Exchange server by invoking either the extensible storage engine (ESE) or volume shadow copy service (VSS) backup application programming interfaces (APIs). This provides a copy of the EDBs, streaming database files (STMs) and Logs in the Storage Group that is being backed up.

2. Full Backup Preparation: The EDBs, STMs and Logs are traversed by the software agent and the production data is encrypted in a size preserving manner. The structural metadata is encrypted using searchable encryption. Cryptographic trapdoors are generated so that the remote entity maintaining the synthetic full can use the trapdoors to traverse the Logs or the EDBs.

3. Full Backup Transfer: The EDBs, STMs and Logs are transferred over to the secondary site in a network optimized manner.

4. Full Backup Baseline Storage: The secondary site stores this newly-received set as the baseline for subsequent synthetic full operations. A Full Backup is typically repeated after certain events such as a recovery, or an offline de-fragmentation.

5. Incremental Backup: After the full backup, the software agent runs an incremental extraction from Exchange using either the ESE or VSS backup APIs. This provides a copy of all the logs that have been generated since the last full or incremental.

6. Incremental Backup Preparation: The Logs are traversed by the software agent and the production data is encrypted in a size preserving manner while the structural metadata is encrypted in a searchable manner.

7. Incremental Backup Transfer: The Logs are transferred over to the secondary site in a network optimized manner.

8. Incremental Log Access: After incremental backup transfer, e.g., immediately after, the entity at the secondary site uses trapdoors that are provided to it out-of-band so that the secondary site can access the EDB, STM and Log structural metadata, traverse the Logs and apply them to the EDBs.

9. Log Apply ["Replay"]: After incremental log access, e.g., immediately after, the Logs are applied to the EDBs to bring them up-to-date.

10. Item Restore: In order to restore an item, or a stream of items, from the secondary copy maintained through the synthetic full, a software agent at the secondary data center receives a trapdoor that is used to extract the item (e.g., message, calendar item, task, contact, etc.) from the EDB to be restored typically to the primary data center.

11. Analytics/Recovery: The recipient of the item, or stream of items, from the previous set is an authorized entity that has access to the symmetric keys that were used to encrypt the production data, and is able to use the items for applications that range from recovery to analytics.

Figure 4:
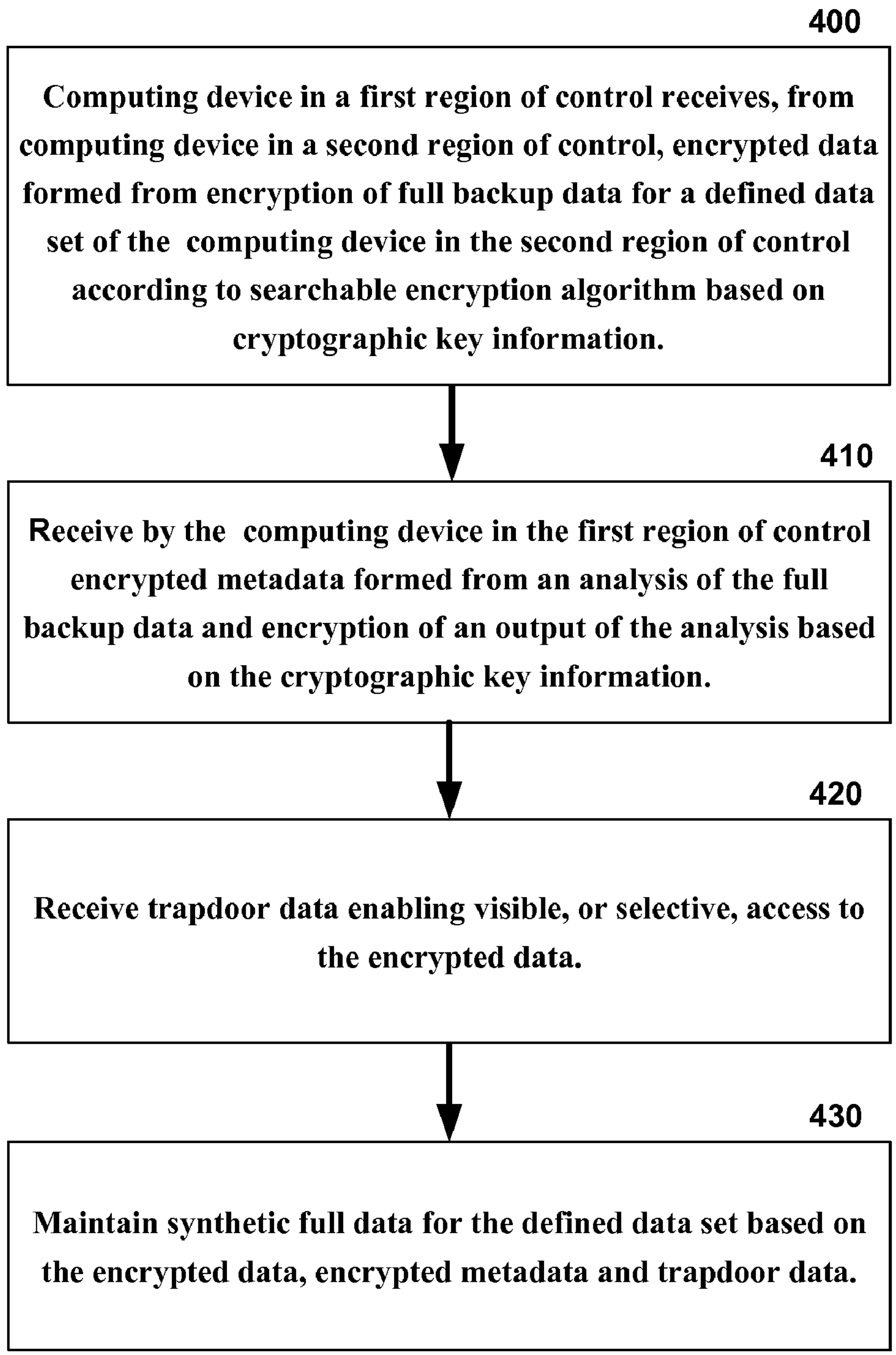
FIG. 4 is a flow diagram illustrating an exemplary non-limiting process for maintaining synthetic full data for a defined data set based on encrypted data and metadata and trapdoor data.

Accordingly, consistent with the above-described techniques, a variety of embodiments are described as follows. FIG. 4 is a flow diagram illustrating an exemplary non-limiting service side process for maintaining synthetic full data for a defined data set based on encrypted data and metadata and trapdoor data. At 400, a computing device in a first region of control receives, from a computing device in a second region of control, encrypted data formed from encryption of full backup data for a defined data set of the computing device in the second region of control according to a searchable encryption algorithm based on cryptographic key information. At 410, the computing device in the first region of control receives encrypted metadata formed from an analysis of the full backup data and encryption of an output of the analysis based on the cryptographic key information. At 420, trapdoor data is received enabling visible, or selective, access to the encrypted data. At 430, the backup service maintains synthetic full data for the defined data set based on the encrypted data, encrypted metadata and trapdoor data.

Figure 5:
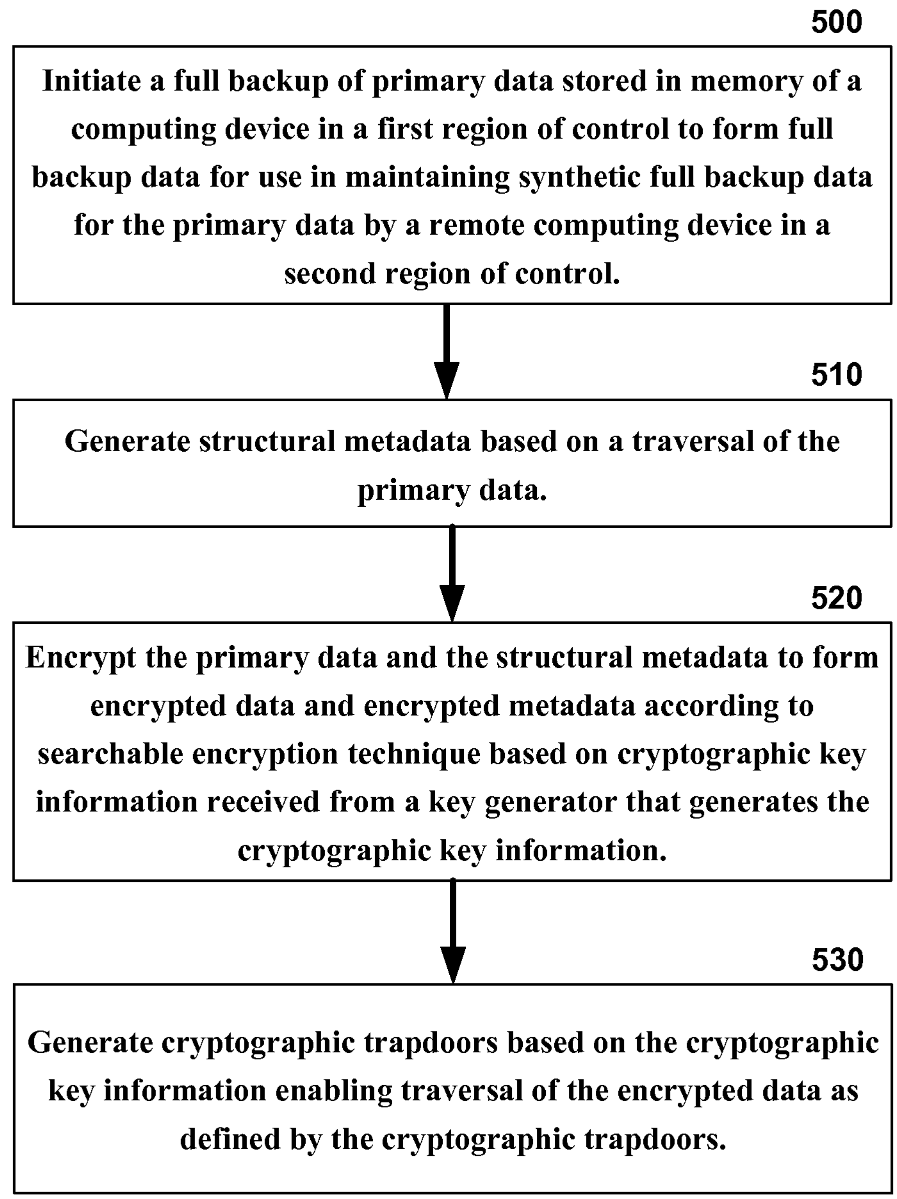
FIG. 5 is a flow diagram illustrating an exemplary non-limiting process for maintaining synthetic full data according to an embodiment.

FIG. 5 is a flow diagram illustrating an exemplary non-limiting customer side process for maintaining synthetic full data according to an embodiment. At 500, a full backup of primary data stored in memory of a computing device in a first region of control is initiated to form full backup data for use in maintaining synthetic full backup data for the primary data by a remote computing device in a second region of control. At 510, structural metadata is generated based on a traversal of the primary data that describes the primary data. At 520, the primary data and the structural metadata are encrypted to form encrypted data and encrypted metadata according to searchable encryption technique(s) based on cryptographic key information received from a key generator that generates the cryptographic key information. At 530, cryptographic trapdoors are generated based on the cryptographic key information enabling traversal of the encrypted data as defined by the cryptographic trapdoors.

Figure 6:
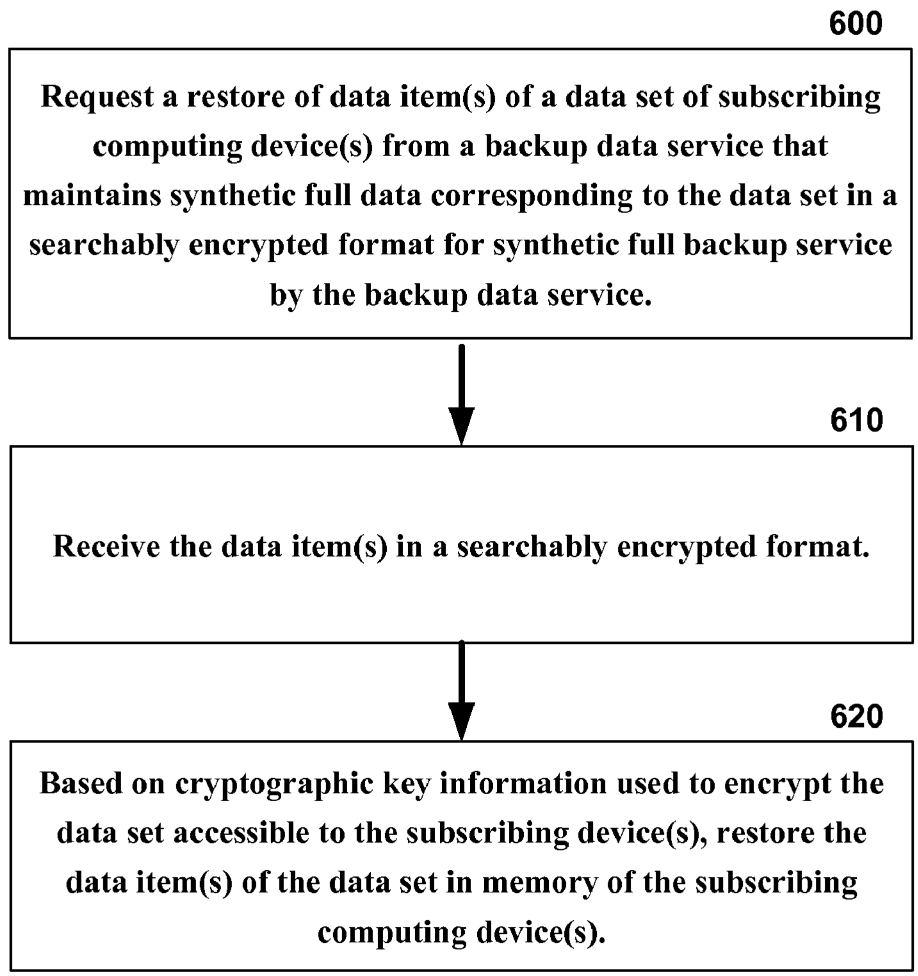
FIG. 6 is a flow diagram illustrating an exemplary non-limiting process for restoring data items in an embodiment for maintaining synthetic full data.

FIG. 6 is a flow diagram illustrating an exemplary non-limiting process for restoring data items in an embodiment for maintaining synthetic full data. At 600, a restore of data item(s) of a data set of subscribing computing device(s) is requested of a backup data service that maintains synthetic full data corresponding to the data set in a searchably encrypted format for synthetic full backup service by the backup data service. At 610, the data item(s) are received in a searchably encrypted format. At 620, based on cryptographic key information used to encrypt the data set accessible to the subscribing device(s), the data item(s) of the data set are restored in memory of the subscribing computing device(s).

Figure 7:
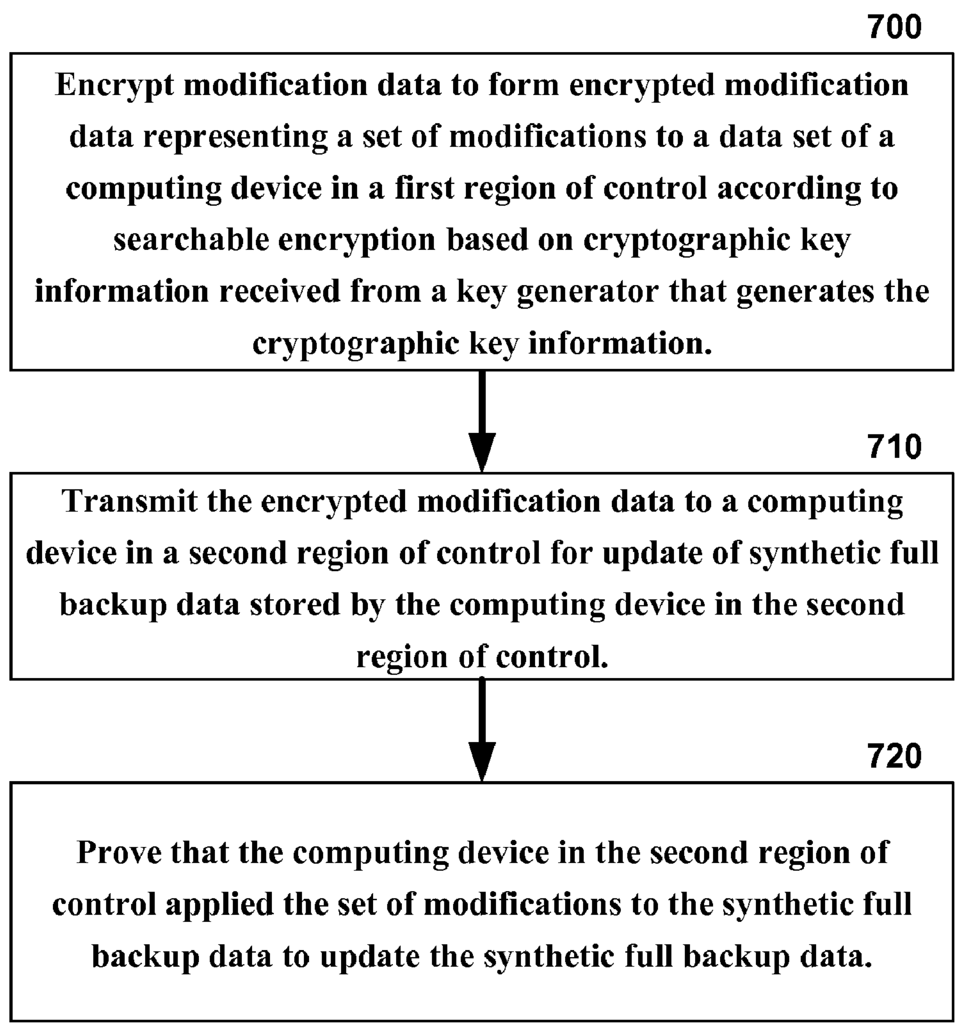
FIG. 7 is a flow diagram illustrating an exemplary non-limiting process for providing backup services including proof of application.

FIG. 7 is a flow diagram illustrating an exemplary non-limiting process for providing backup services including proof of application. At 700, modification data (e.g., transaction logs represented as a full, or incremental) is encrypted to form encrypted modification data representing a set of modifications to a data set of a computing device in a first region of control according to searchable encryption based on cryptographic key information received from a key generator that generates the cryptographic key information. At 710, the encrypted modification data is transmitted to a computing device in a second region of control for update of synthetic full backup data stored by the computing device in the second region of control. At 720, it is proved that the computing device in the second region of control applied the set of modifications to the synthetic full backup data to update the synthetic full backup data per agreement as the backup service.

Figure 8:
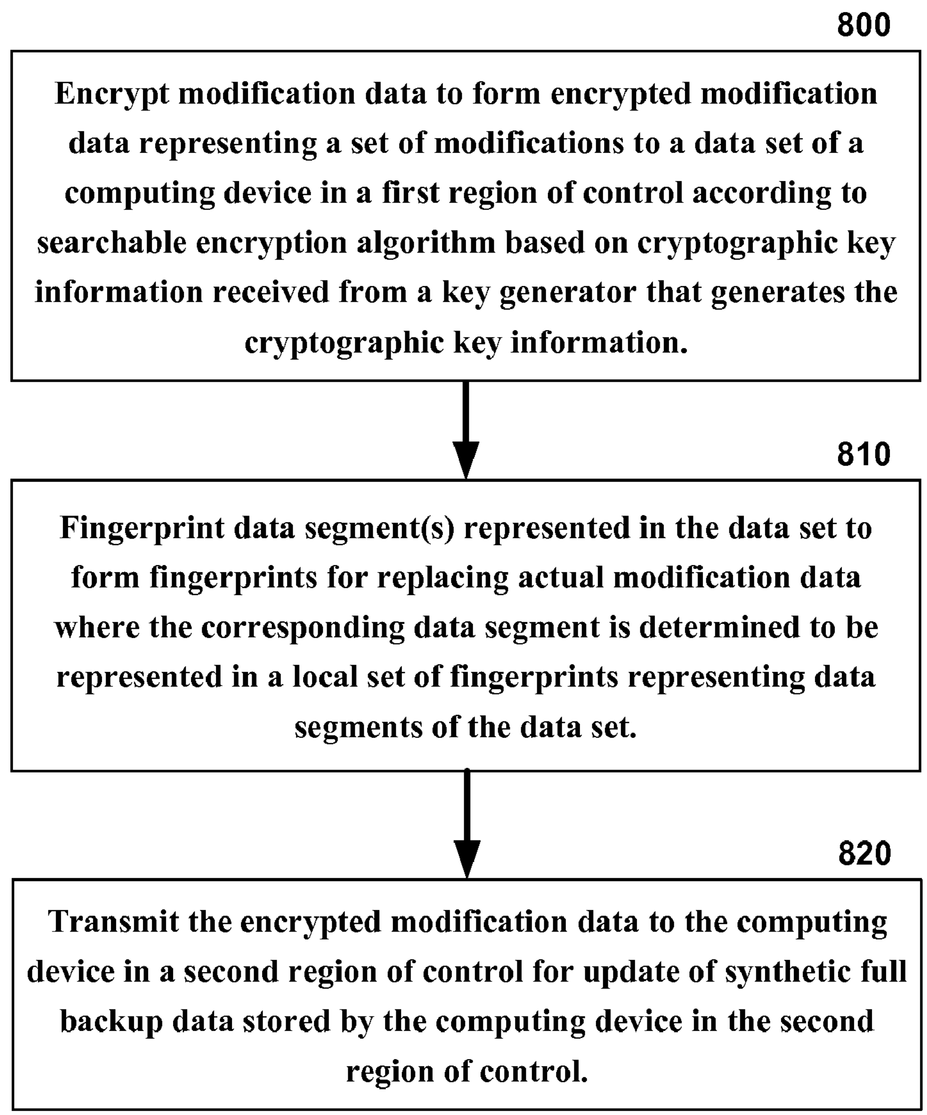
FIG. 8 is a flow diagram illustrating an exemplary non-limiting process for backup services including blind fingerprints.

FIG. 8 is a flow diagram illustrating an exemplary non-limiting process for providing backup services including blind fingerprinting as described above. At 800, modification data is encrypted to form encrypted modification data representing a set of modifications to a data set of a computing device in a first region of control according to searchable encryption algorithm based on cryptographic key information received from a key generator that generates the cryptographic key information. At 810, data segment(s) represented in the data set are fingerprinted to form fingerprints for replacing actual modification data where the corresponding data segment is determined to be represented in a local set of fingerprints representing data segments of the data set. At 820, the encrypted modification data is transmitted to the computing device in a second region of control for update of synthetic full backup data stored by the computing device in the second region of control.

Figure 9:
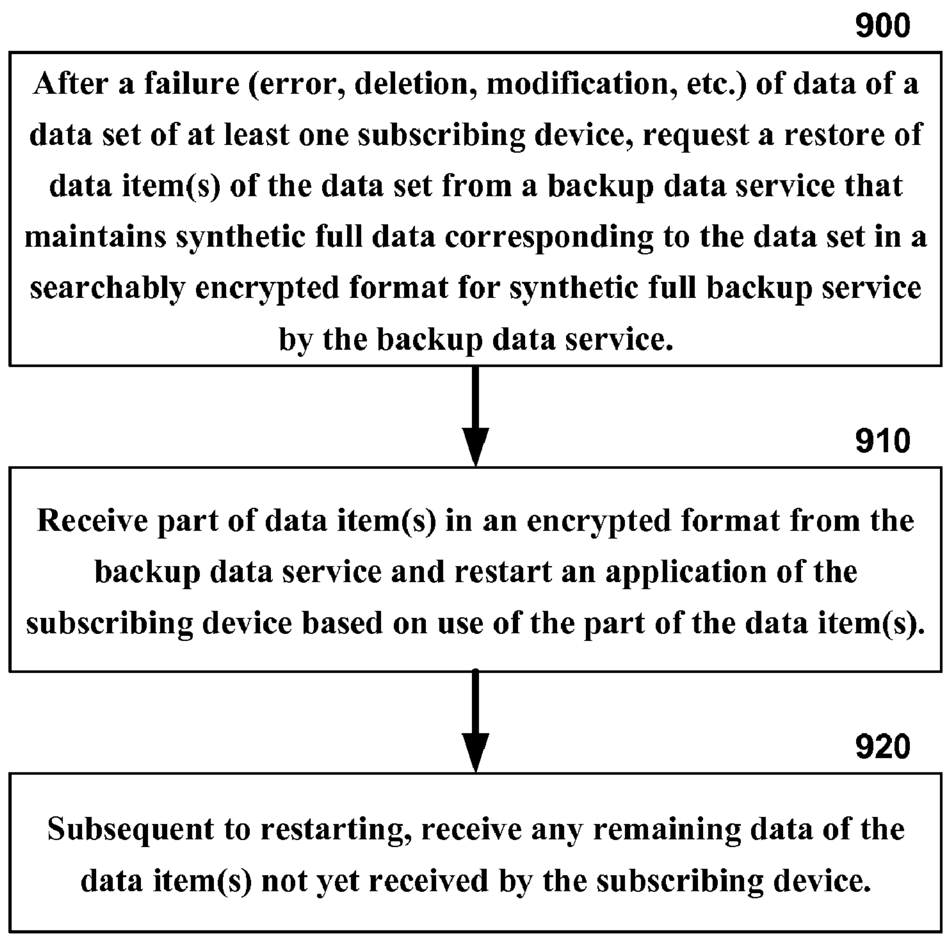
FIG. 9 is a flow diagram illustrating an exemplary non-limiting process for backup services including a dial tone restarting of an application depending on local data.

FIG. 9 is a flow diagram illustrating an exemplary non-limiting process for providing backup services including failure recovery for restarting an application quickly. At 900, after a failure (error, deletion, modification, etc.) of data of a data set of a subscribing device, a restore of data item(s) of the data set is requested from a backup data service that maintains synthetic full data corresponding to the data set in a searchably encrypted format for synthetic full backup service by the backup data service. At 910, part of the data item(s) are received in an encrypted format from the backup data service and restart an application of the subscribing device based on use of the part of the data item(s). At 920, subsequent to restarting, any remaining data of the data item(s) not yet received by the subscribing device are received.

As described herein according to various embodiments, independent data protection and cryptographic techniques are combined in a manner that enhances and modifies each to support the other, to provide aggregate solutions that are not currently available to consumers, enterprises, ecosystems and social networks.

Supplemental Context for Trusted Cloud Services Ecosystem

As described above, independent data protection and cryptographic techniques are variously combined to enhance privacy, trust and security concerning backup data, e.g., stored as a synthetic full, at a remote site, such as maintained by a CSP. While a general ecosystem is described below in the context of a general data or network service, such general data or network service can be used to for any one or more of the above-described scenarios for storing backup data at a remote site.

A digital escrow pattern is provided for network data services including searchable encryption techniques for data stored in a cloud, distributing trust across multiple entities to avoid compromise by a single entity. In one embodiment, a key generator, a cryptographic technology provider and a cloud services provider are each provided as separate entities, enabling a publisher of data to publish data confidentially (encrypted) to a cloud services provider, and then expose the encrypted data selectively to subscribers requesting that data based on subscriber identity information encoded in key information generated in response to the subscriber requests.

With respect to the searchable encryption/decryption algorithm(s), a searchable public key encryption (PEKS) scheme implemented by one or more cryptographic technology providers generates, for any given message W, a trapdoor TW, such that TW allows a check of whether a given ciphertext is an encryption of W or not, where TW does not reveal any additional information about the plaintext. In accordance with various embodiments described below, PEKS schemes can be used to prioritize or filter encrypted data, such as encrypted messages, based on keywords contained in the data, e.g., the message text. A data recipient can thus be given selected access to parts of the encrypted data relating to keyword(s) by releasing the capabilities (sometimes called "trapdoors" by cryptographers) for the corresponding keyword(s). This way, the encrypted data can be checked for these keywords, but there is assurance that nothing more will be learned from a subscriber than the subscriber's capabilities allow.

For the avoidance of doubt, while PEKS is disclosed as an algorithm for implementing searchable encryption in one or more embodiments herein, it can be appreciated that a variety of alternative algorithms exist for achieving searchable encryption. Some exemplary non-limiting alternatives to PEKS, for instance, include Oblivious RAMs. Thus, the terminology "Searchable Encryption" as used herein should not be limited to any one technique and thus refers to a wide range of encryption mechanisms or combination of encryption mechanisms that allow selective access of a subset of encrypted data based on search or query functionality over the encrypted data.

Optionally, validation and/or verification of results can be provided as an additional benefit to subscribers and publishers of data in the ecosystem. Validation provides a way of validating that the items of data received as a result of a subscription request for a subset of data is the correct set of items, i.e., that the correct subset of data that should have been received was in fact received. A technique in the cryptographic arts is proof of data possession (PDP); however, for the avoidance of doubt, PDP is just an example algorithm that can be implemented and that others that achieve the same or similar objectives can be used. Provable or Proof of Data Possession is a topic about how to frequently, efficiently and securely verify that a storage server is faithfully storing its client's potentially large outsourced data. The storage server is assumed to be untrusted in terms of both security and reliability.

Verification of results provides an additional mechanism for checking that the contents of the items themselves, i.e., to ensure that the items received in connection with the subscription request were not tampered with by any unauthorized entity. An example of verification in the cryptographic arts is proof of data possession (PDP); however, for the avoidance of doubt, PDP is just an example algorithm that can be implemented and that others that achieve the same or similar objectives can be used. Another technique known in the cryptographic arts is proof of retrievability (POR); however, for the avoidance of doubt, POR is just an example algorithm that can be implemented and that others that achieve the same or similar objectives can be used. A POR is a compact proof by a service provider or data hoster (prover) to a client (verifier) that a target file F is intact, in the sense that the client can fully recover file F, and that no tampering has occurred.

As an additional option, the ecosystem can implement notions of anonymous credentials, whereby publishers can upload information about themselves in an anonymous way without exposing critical details, and subscribers can be limited by their capabilities so that they cannot be exposed or provided access to critical details uploaded by a publisher. In this way, a publisher or subscriber can interact with the system while exposing only as much information as they wish to third parties.

Conventional web services have been limited to static client server arrangements and statically defined user policy for accessing data of the web service. However, when many publishers and subscribers are contemplated according to constantly changing and evolving complex business and other relationships, such conventional web services model fail to be flexible or secure enough. Accordingly, in various embodiments, late binding is enabled such that publishers and/or owners of data and content can change access privileges to encrypted content based on who the subscriber(s) are, based on their capability(ies) and based on what they are looking for, e.g., based on the keyword(s) employed in a request for data. Thus, what a subscriber can selectively access changes dynamically consistent with changes to the access privileges by the publishers and/or owners, since subscriber capabilities are encoded in the key information provided by the key generator on the fly. Thus, subscriber privileges are defined for a given request at the time of key generation for the request, and thus always reflect current policy with respect to request from the subscriber.

Similarly, an administrator of a server of a trusted cloud service can be permitted to observe the log of activity and data transactions handled by the server, but can also be restricted from seeing any customer names or credit card information. The identity of the subscriber can thus be the basis for limiting the kind of data the subscriber can access.

Various non-limiting embodiments of a trusted ecosystem are presented herein in the context of building trust for a cloud service; however, the trust building of the ecosystem provided herein is much more general, and not limited to application to cloud services. Rather, the embodiments described herein are similarly applicable to different servers or participants within enterprise data centers. Thus, while the data may never leave a given entity, the techniques for building trust as described herein are equally applicable where different processes within an enterprise operate within separate regions of control. Without visibility across all enterprise processes, similar mistrust issues can develop as if the participants were external to the enterprise. For instance, a Server could be breached within the enterprise, even though it is in the control of the administrator, or the administrator could be careless or malicious.

In addition to applying to encrypted data in the cloud, the various techniques of the subject disclosure can also apply to data stored on a laptop or other portable device, since the laptop may be lost or stolen. In such a case, the device could end up in the possession of an overly curious or malicious entity; however, the same techniques described herein that apply to protecting data in the cloud can also be applied to protect data on servers or laptops. If the local data is encrypted, without proper subscriber credentials, a thief will not be able to understand the local encrypted data being able to show no proper role or capabilities to access the data.

Figure 10:
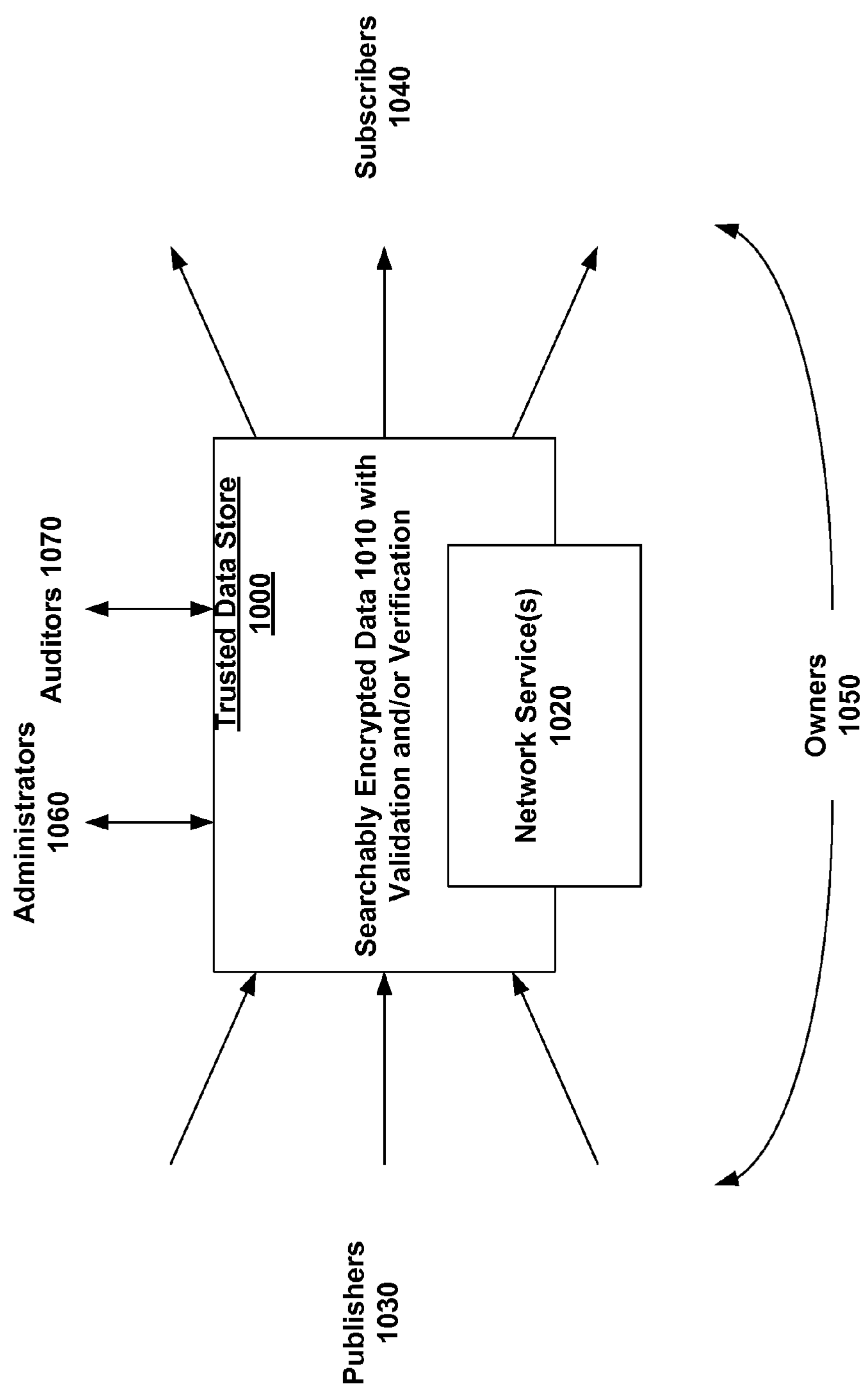
FIG. 10 is an exemplary non-limiting block diagram of a trusted cloud services framework or ecosystem in accordance with an embodiment.

FIG. 10 is a block diagram of a trusted cloud services framework or ecosystem in accordance with an embodiment. The system includes a trusted data store 1000 for storing searchably encrypted data 1010 with the results of subscriber requests being subject to validation and/or verification. In this regard, network services 1020 can be built on top of the secure data 1010 such that the publishers of the data retain control over the capabilities granted to subscribers 1040 who request the data, e.g., via network service(s) 1020. Publishers 1030 can also be subscribers 1040, and vice versa, and owners 1050 of the data can be either publishers 1030 and/or subscribers 1040 as well. As an example of some common roles and corresponding sets of capabilities that can be defined, a specialized kind of publishers 1030 and subscribers 1040 are administrators 1060 and auditors 1070.

For instance, administrators 1060 can be a specialized set of permissions over data 1010 to help maintain the operation of trusted data store 1000, and auditor entities 1070 can help maintain the integrity of certain data within scope of the audit. For instance, an auditor 1070 could subscribe to messages of data 1010 containing offensive keywords in which case the auditor 1070, if permitted according to capabilities granted, would be alerted when messages of data 1010 contained such offensive keywords, but unable to read other messages. In this regard, a myriad of scenarios can be built based on the ability to place publisher data into digital escrow such that keys can be handed out enabling selective access to that data.

For instance, a publisher authenticates to the ecosystem and indicates a set of documents to upload to the ecosystem. The documents are encrypted according to a searchable encryption algorithm based on cryptographic key information received from a separate key generator that generates the cryptographic key information. Then, the encrypted data is transmitted to a network service provider for storage of the encrypted data such that the encrypted data is selectively accessible according to late binding of selected privileges granted to a requesting device based on identity information of the requesting device. Separating the cryptographic technology provider from the storage of the encrypted data additionally insulates the encrypted data from further compromise.

Figure 11:
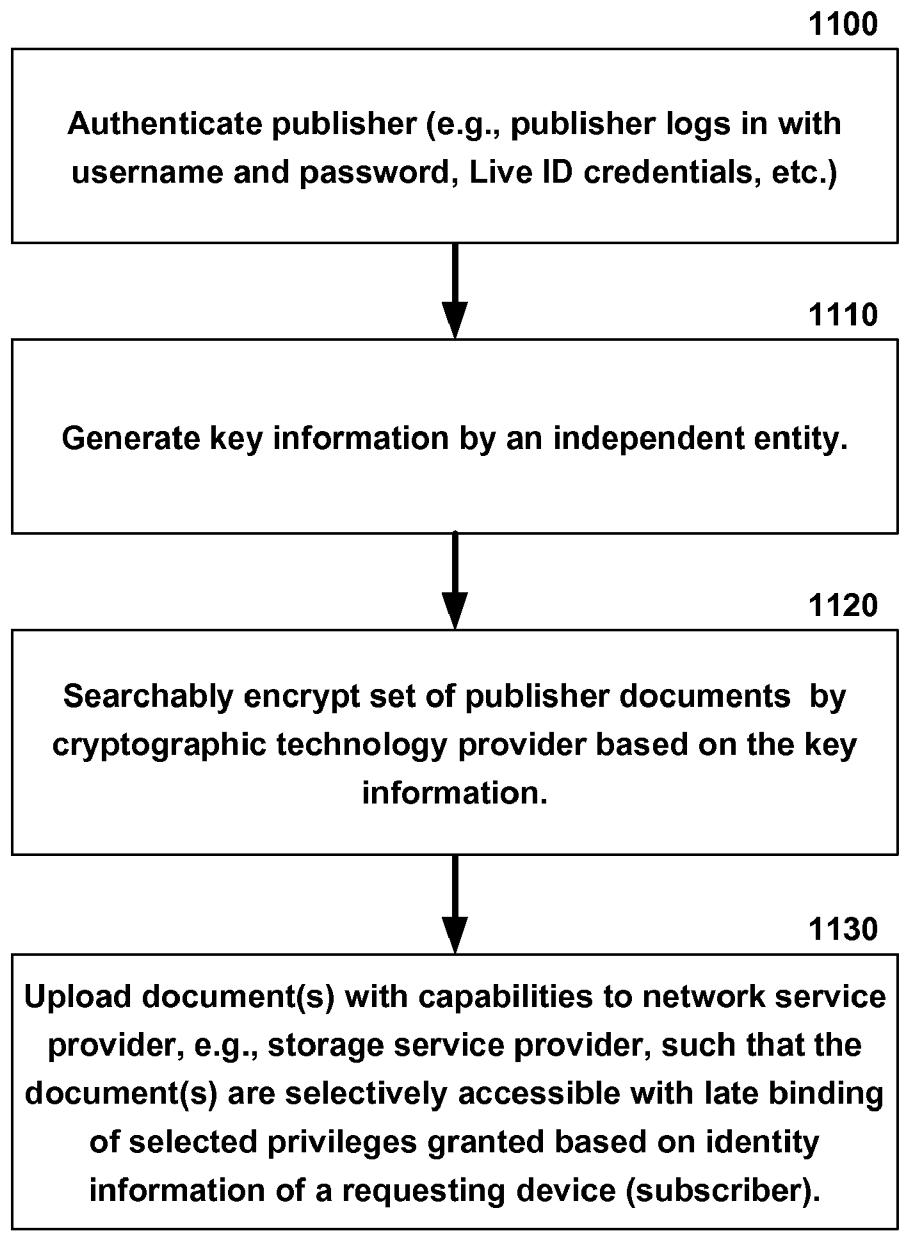
FIG. 11 is a flow diagram illustrating an exemplary non-limiting process for publishing data according to a trusted cloud services ecosystem.

In this regard, FIG. 11 is a flow diagram illustrating an exemplary non-limiting method for publishing data according to the trusted cloud services ecosystem. At 1100, a publisher authenticates to the system (e.g., publisher logs in with username and password, Live ID credentials, etc.). At 1110, key information is generated by key generator, such as a center for key generation as described in one or more embodiments below. At 1120, a separate cryptographic technology provider encrypts a set of publisher documents based on the key information. At 1130, the encrypted documents are uploaded with capabilities to network service provider, e.g., storage service provider, such that the encrypted document(s) are selectively accessible with late binding of selected privileges granted based on identity information of a requesting device (subscriber).

On the subscriber side, for example, a subscriber authenticates to the ecosystem and indicates a request for a subset of data, e.g., a query for a subset of documents containing a given keyword or set of keywords. In response to a request for a subset of searchably encrypted data from at least one subscriber device, a key generation component generates cryptographic key information based on identity information associated with the subscriber device. Then, the subset of encrypted data is decrypted as a function of privileges granted the subscriber device as defined in the cryptographic key information.

Figure 12:
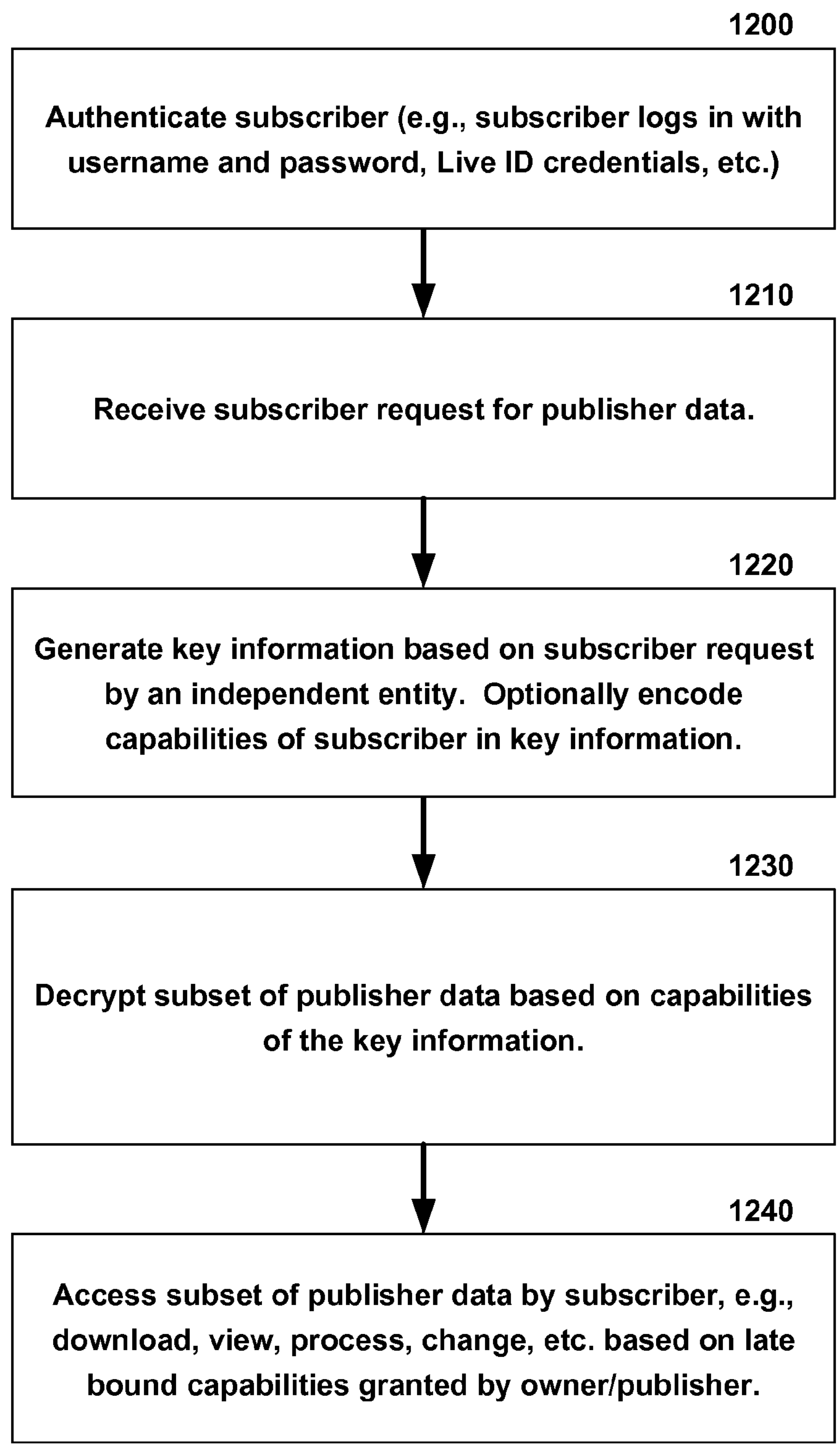
FIG. 12 is a flow diagram illustrating an exemplary non-limiting process for subscribing to data according to a trusted cloud services ecosystem.

FIG. 12 is a flow diagram illustrating an exemplary non-limiting method for subscribing to data according to the trusted cloud services ecosystem. At 1200, a method for subscribing to data includes authenticating a subscriber (e.g., subscriber logs in with username and password, Live ID credentials, etc.). At 1210, a subscriber makes a request for data. At 1220, key information is generated by an independent key generation entity based on the subscriber request, where the capabilities of the subscriber can be defined in the key information. At 1230, a subset of publisher data is decrypted based on the capabilities defined in the key information. For instance, the CSP can decrypt the data. At 1240, the subset of publisher data is made accessible to the subscriber, e.g., the subscriber can download, view, process, change, etc. the data based on the dynamically definable capabilities granted by owner/publisher. Optionally, the technology used for encryption, decryption and key generation can be supplied by a separate cryptographic technology provider, but hosted by any participant.

In one embodiment, the identity information of the subscriber device includes a role of the subscriber. For instance, an auditor role, or administrator role, or other pre-specified role can be used by publishers/owners as a basis for restricting or granting access to various portions of the searchably encrypted data store.

Figure 13:
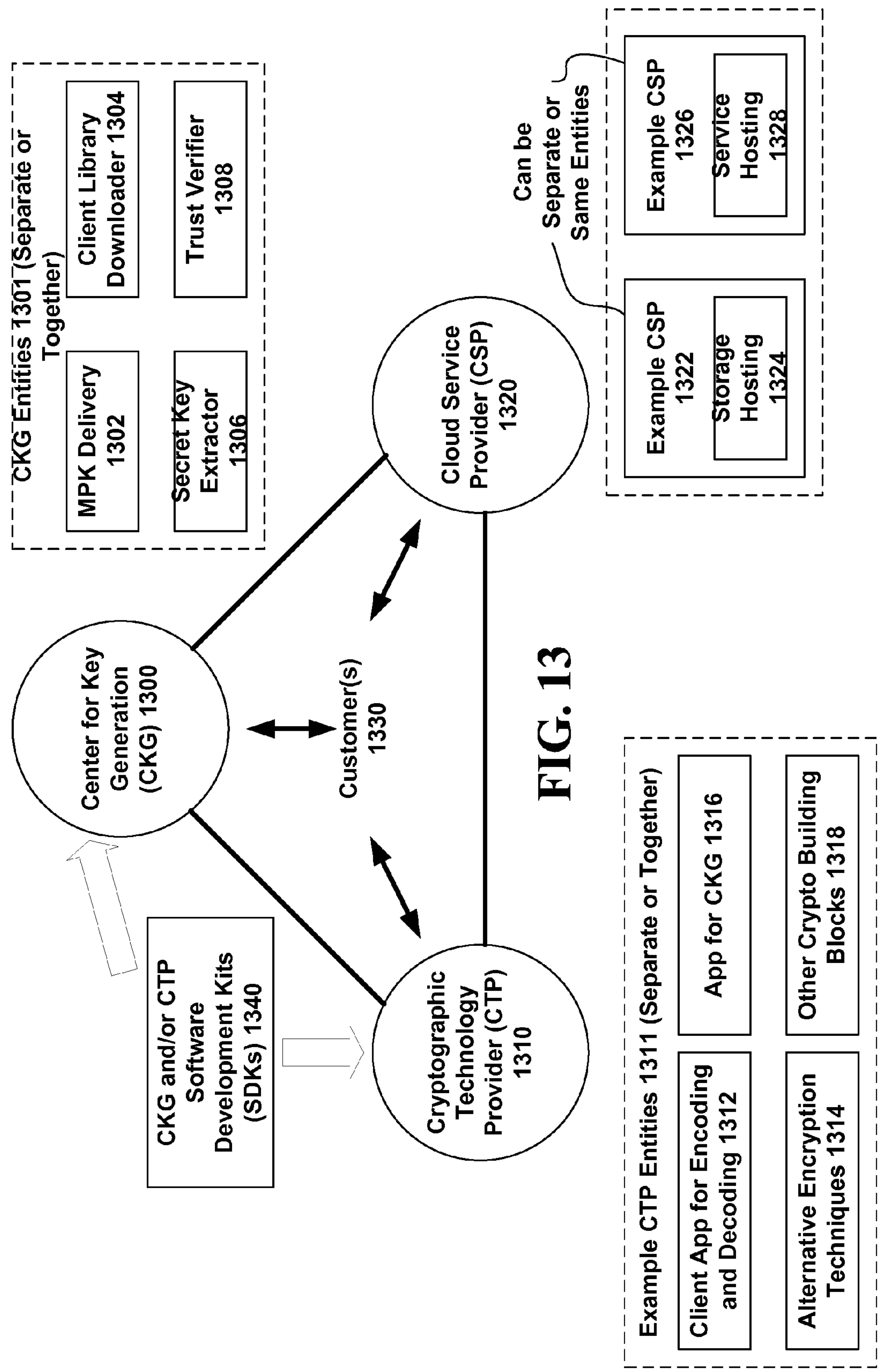
FIG. 13 illustrates an exemplary ecosystem showing the separation of center for key generation, cryptographic technology provider and cloud service provider in a trusted ecosystem.

FIG. 13 illustrates an exemplary ecosystem showing the separation of center for key generation (CKG) 1300, cryptographic technology provider (CTP) 1310 and cloud service provider (CSP) 1320 thereby eliminating the possibility of compromise by a single entity in the trusted ecosystem. In this regard, customer(s) 1330 include publishers and/or subscribers of data. Optionally, CKG 1300 can be built based on reference software, open source software, and/or a software development kit (SDK), e.g., provided by CTP 1310, enabling the building blocks for parties to create such components by themselves, or be satisfied by third party implementations of such ecosystem components. In one embodiment, the SDK is provided by the CTP 1310, and can be used by one or more participants to host or implement CKG 1300, a compute and storage abstraction (CSA) described in more detail below and/or cryptographic client libraries. Optionally, the SDK can be distributed to the entity hosting the CKG 1300 from CTP 1310.

In general, each of CKG 1300, CTP 1310 or CSP 1320 can be subdivided into subcomponents depending on a given implementation, however, the overall separation is preserved to maintain trust. For instance, CKG entities 1301, such as master public key (MPK) delivery 1302, client library downloader 1304, secret key extractor 1306, trust verifier 1308, or other subcomponents, can be provided separately, in subsets, or together as an integrated component. CTP entities 1311, such as client app for encoding and decoding 1312, alternative encryption techniques 1314, an application for interfacing with the CKG 1316, other crypto building blocks 1318, etc., can also be provided separately, in subsets or together. Moreover, CSP 1320 can be thought of as many separate service providers, such as CSPs 1322, 1326 hosting storage service 1324 and service hosting 1328, respectively, or such services can be provided together.

It can be appreciated that the CKG, or CKG instance(s) hosted by one or more participants in the trusted ecosystem, is not required to be a single monolithic entity. Rather, the CKG can be separated into a number of (redundant) entities that cooperate to generate keys, so that operation can continue even if a small subset of the participants are offline. In one embodiment, optionally, a set of participants can be trusted in aggregate even if a small subset of these participants have been compromised by an adversary, or otherwise become unavailable or untrusted.

Figure 14:
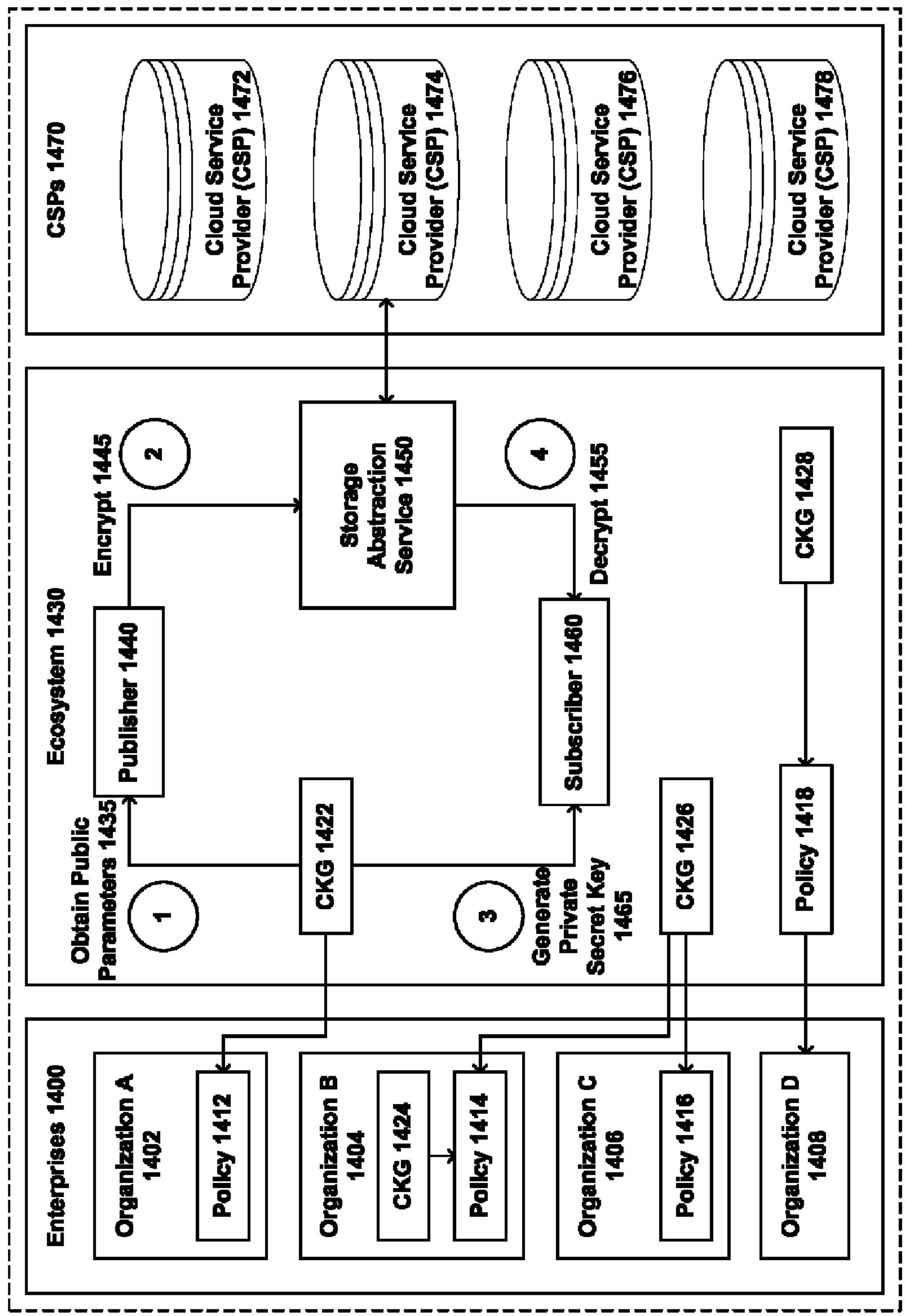
FIG. 14 is another architectural diagram illustrating further benefits of a trusted ecosystem for performing cloud services for enterprises.

FIG. 14 is another architectural diagram illustrating further benefits of a trusted ecosystem for performing cloud services for enterprises 1400. For instance, enterprises 1400 can include different organizations 1402, 1404, 1406, 1408. The different organizations 1402, 1404, 1406, 1408 in this diagram illustrate that organizations can take on as much or as little ownership with respect to implementing policy for using the system, or key generation. For instance, organization 1402 implements its own policy 1412, but uses a centralized key generator 1422 whereas organization 1404 chooses to implement its own key generator 1424 and implement its own policy 1414. Organization 1406 also implements its own policy but relies on a third part CKG 1426 whereas organization 1408 chooses to rely on a third party policy provider 1418 and an independent CKG 1428.

In this regard, to publish data, a publisher 1440 obtains public parameters for encrypting data 1435 based on the output from CKG 1422. Based on the public parameters, the data is encrypted by the publisher device 1440 at 1445 using an independent cryptographic technology provider. The encrypted data is uploaded to a storage abstraction service 1450, which hides the storage semantics in connection with storing the encrypted data by one or more CSPs 1470, such as CSPs 1472, 1474, 1476, or 1478. On the subscriber device 1460, a request for data results in the generation of a private secret key 1465 from CKG 1422. The private secret key 1465 includes information that enables the subscriber device 1460 to selectively access the searchably encrypted data by decrypting the data at 1455. Again, the semantics of retrieving the data from CSPs 1470 is hidden by the storage abstraction service 1450. Also, the privileges granted to the subscriber device 1460 are the current set of privileges due to late binding of capabilities granted by publishers/owners.

It can be appreciated from FIG. 14 that multiple data owners, either enterprises or consumers, can participate in a trusted ecosystem as described herein to establish trusted relationships. In such case, each owner can host, or control their own CKG (e.g., CKG 1424 of organization 1404) so that requests or queries for data are forwarded to the corresponding CKGs to gather the necessary keys from all co-owners of the requested data.

Figure 15:
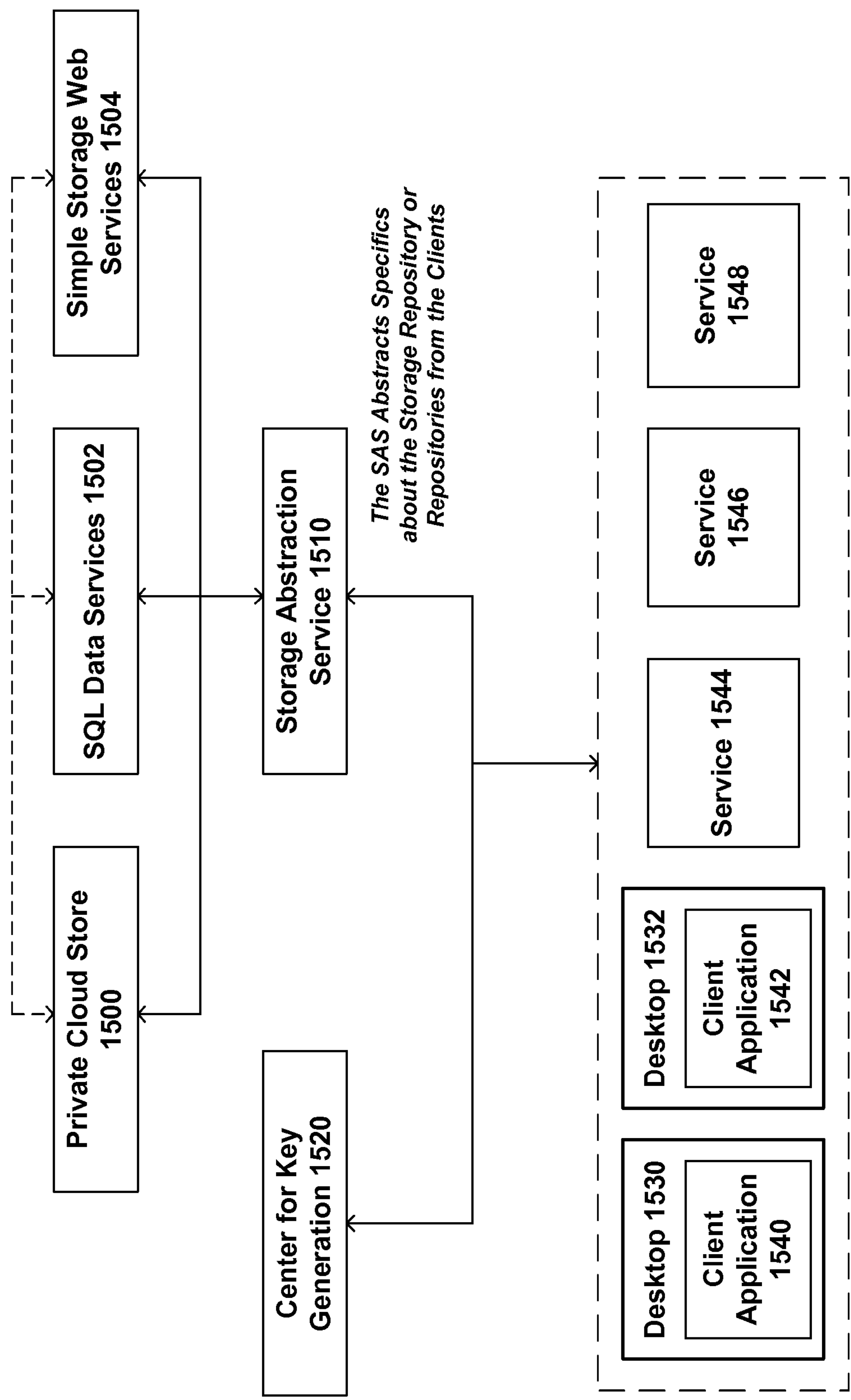
FIG. 15 is another block diagram illustrating the accommodation of different storage providers via a storage abstraction layer according to a trusted cloud services ecosystem.

FIG. 15 is another block diagram illustrating the accommodation of different storage providers via a storage abstraction layer 1510. With the trusted ecosystem, desktops 1530, 1532 having client applications 1540, 1542, respectively, may publish or subscribe to data as described above, initiating a request to the center for key generation 1520 for key information for use in encrypting or decrypting data. Similarly, services 1544, 1546, 1548 might also be a publisher and/or a subscriber in the ecosystem. In this regard, to make the storage or extraction of data by any of a private cloud store 1500, SQL data services store 1502, or simple storage web service 1504, etc., the storage abstraction service 1510, as the name implies, abstracts the specifics about the particular storage repository or repositories away from the clients.

In this regard, for the avoidance of doubt, FIG. 15 is directed to multiple situations. In one situation, FIG. 15 covers the disintermediation of storage providers (abstracting them out as individuals) through the Storage Abstraction Service, also referred to sometimes as the Compute and Storage Abstraction (CSA). In addition, FIG. 15 covers scenarios where data is segmented and/or fanned out (e.g., for redundancy) to multiple back-end storage providers, which can be of the same or different type, such that the original data can be reconstituted even is one (or a small number) of the back-end Storage Providers accidentally or intentionally delete or alter their copies of the data.

Figure 16:
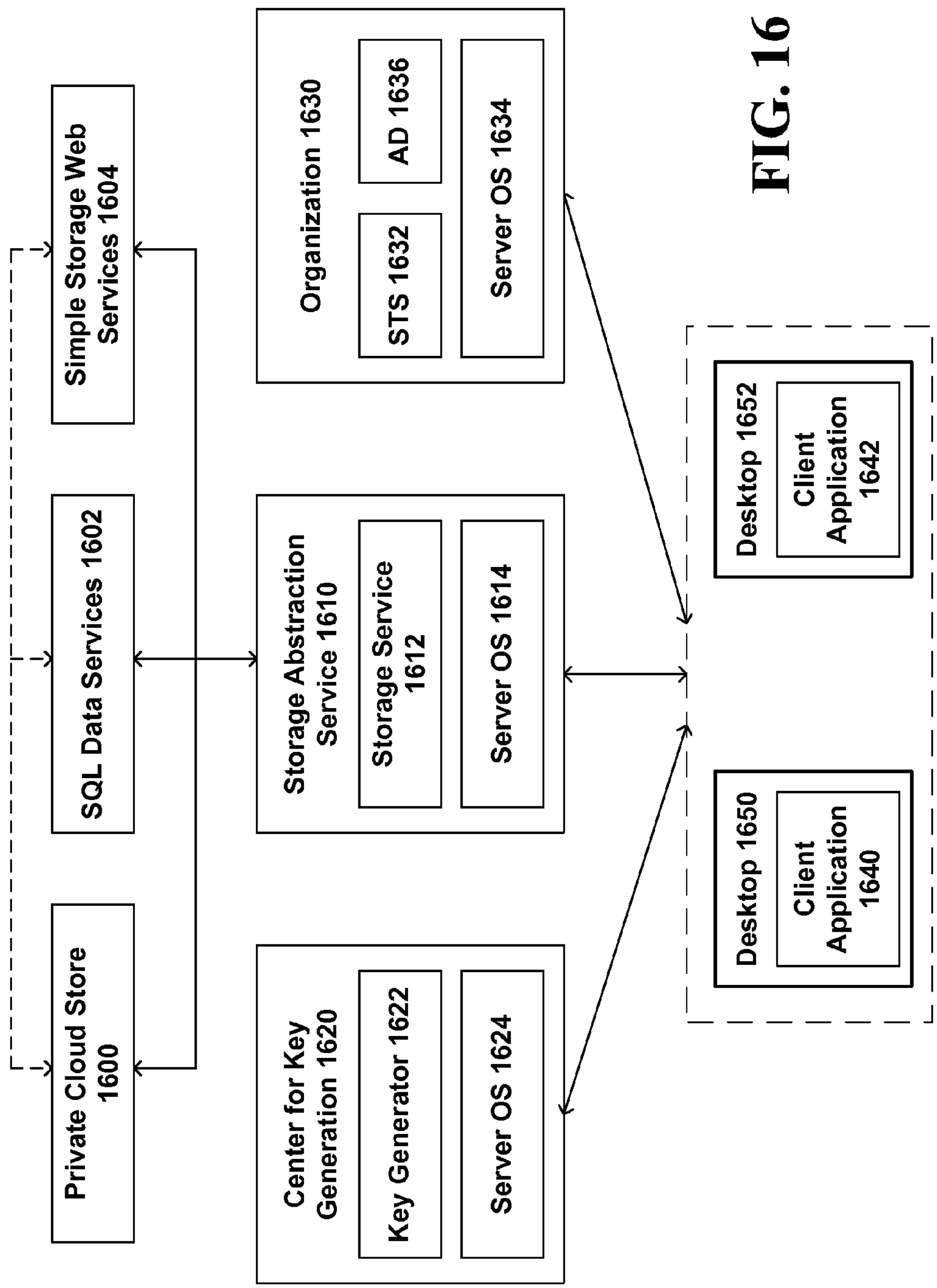
FIG. 16 illustrates further aspects of storage in connection with a storage abstraction service that abstracts storage details of various storage providers.

FIG. 16 illustrates further aspects of storage in connection with a storage abstraction service 1610 including server operating system (OS) 1614 and a storage service 1612 that abstracts the details of storage of private cloud store 1600, SQL data store 1602, simple storage web service store 1604, etc. The clients can be desktops 1650 or 1652 having client applications 1640 and 1642, respectively. The center for key generation 1620 can include a key generator application 1622 executing on server OS 1624. In this regard, an organization 1630 having active directory 1636, server OS 1634 and security token service (STS) 1632 can be a publisher or subscriber in the ecosystem. In this regard, storage transfer format (STF) is a standard interchange format that can be used for exchanging encrypted data and metadata across repositories. For instance, organization 1630 may wish to transfer e-mail data among storage service providers 1600, 1602 or 1604 in which case STF can be used.

Figure 17:
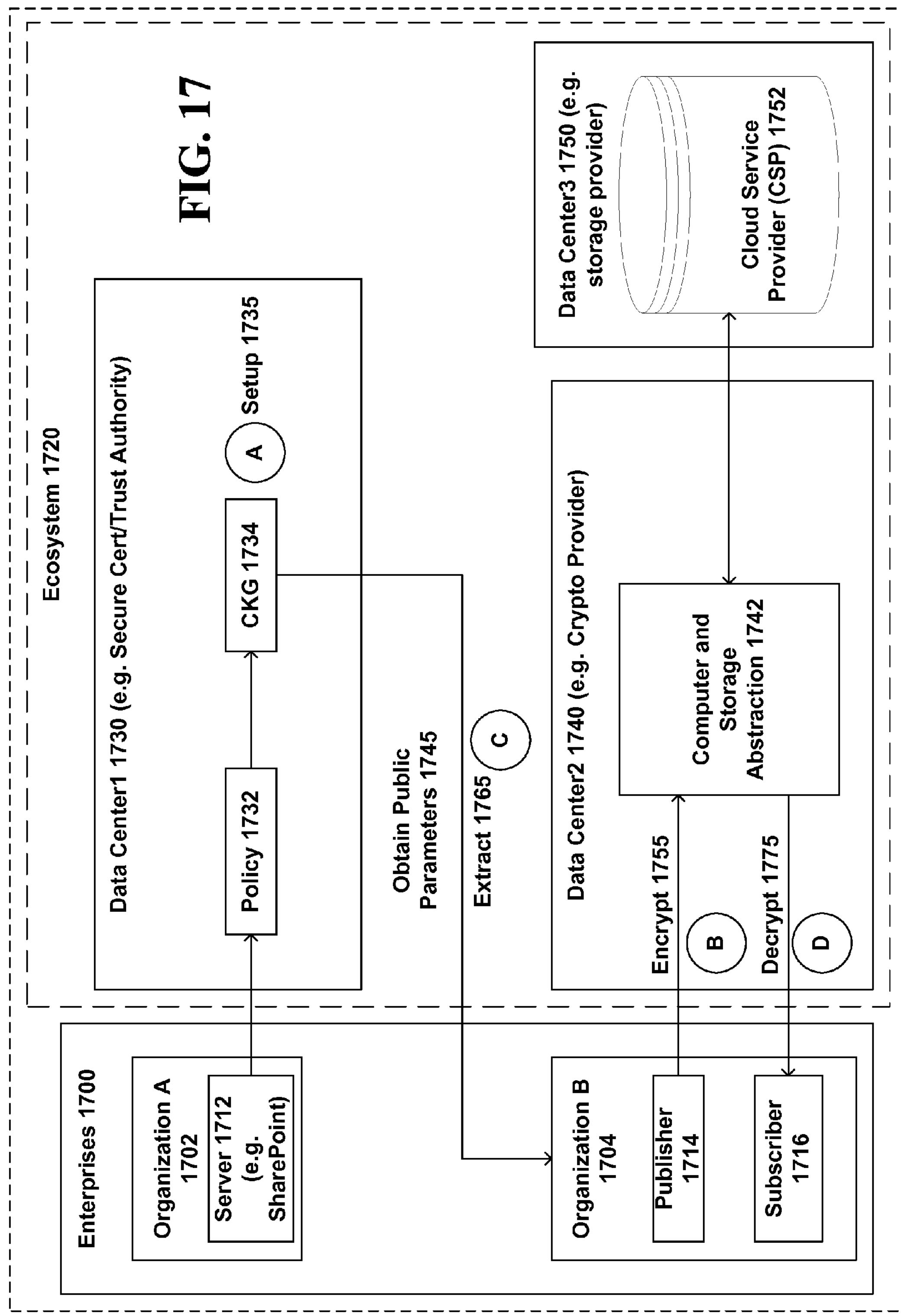
FIG. 17 is another block diagram illustrating various different participants in a trusted cloud services ecosystem.

FIG. 17 is another block diagram illustrating various different participants in a trusted ecosystem 1720. As mentioned, advantageously, enterprises 1700 can offload the storage and maintenance of volumes of data from on-site to cloud storage service providers better suited to handling such volumes while at the same time maintaining comfort that the data will not be decrypted to the wrong subscribers since the enterprise maintains control over capabilities defined over the encrypted data. For instance, an organization 1702 may operate a collaborative application 1712 such as Sharepoint. In this regard, organization 1702 may set up a digital escrow, or trusted domain, for the sharepoint data. The policy 1732 and CKG 1734 can be implemented by a first data center 1730, which operates to setup the secure space by defining cryptographic key information 1745 for the trusted domain.

Then, another organization 1704, e.g., behaving as a publisher 1714, can encrypt data based on the key information obtained from CKG 1734, at which point computer and storage abstraction component 1742 of a second data center 1740 handles the details of storing the searchably encrypted data at a third data center 1750, e.g., in CSP 1752. On the flip side, when a subscriber 1716 of organization 1704 requests data, private or secret key information is delivered to subscriber 1716 as part of extraction 1765. Next, based on the private key information which includes capabilities defined for the subscriber, data requested by the subscriber is decrypted at 1775 assuming the subscriber has privileges, and again abstraction layer 1742 handles the details of the underlying storage 1752.

Figure 18:
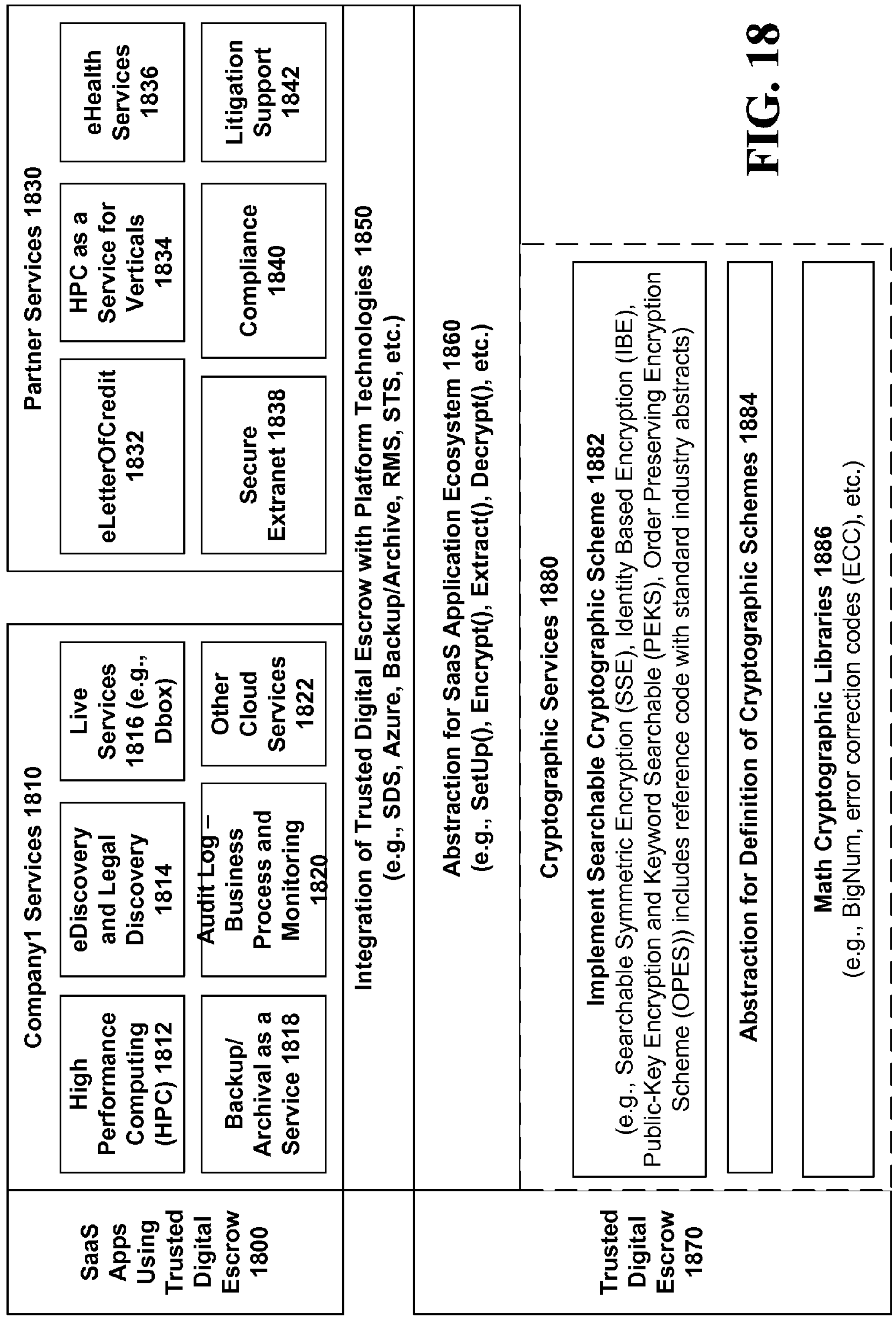
FIG. 18 is a representative view of some layers of an exemplary, non-limiting implementation of a trusted cloud computing system in which the different pieces can be provided by different or the same entities.

FIG. 18 is a representative view of some layers of an exemplary, non-limiting implementation of a trusted cloud computing system in which the different pieces can be provided by different or the same entities. At the bottom of the layer stack are math and cryptographic libraries 1886 used for implementing the encryption/decryption algorithms. Abstraction of the definitions of various cryptographic schemes can be provided as a middle layer 1884 between the detailed libraries 1886 and the actual implementation of the searchable cryptographic schemes 1882. Together, layers, 1882, 1884 and 1886 form a larger cryptographic services layer 1880, which when combined with an abstraction layer 1860 for the software as a service (SaaS) application ecosystem, form the basis for an implementation of the trusted digital escrow 1870 and storage therefor. The abstraction layer 1860 contains the basic language used to implement the digital escrow pattern, namely commands such as SetUp( ), Encrypt( ), Extract( ), Decrypt( ), etc.).

On top of abstraction layer 1860 is the layer 1850 that ties into various more specific platform technologies (e.g., SDS, Azure, Backup/Archive, RMS, STS, etc.). On top of the layer 1850 that ties into various specific platform technologies are the various SaaS applications that use the trusted digital escrow 1800. The exemplary, non-limiting illustration shows that the digital escrow apps 1800 can be implemented by a single company 1810 or by partners 1830 or by both. For instance, company 1810 may implement services such as high performance computing (HPC), eDiscovery and Legal Discovery 1814, Live Services 1816 (e.g., DBox), backup/archive as a service 1818, audit log—business process and monitoring 1820 or other cloud services 1822. In turn, partners 1830 could implement services such as eLetterOfCredit 1832, HPC as a service for verticals 1834, eHealth services, secure extranet 1838, compliance 1840, litigation support 1842, etc.

Scenarios Based on Trusted Cloud Services Ecosystem

The top half of FIG. 9 scratches the surface of the types of applications that can be realized in the cloud due to the increased trust inherent in the division of key generator, crypto provider and cloud service provider. In this regard, having enabled such a trusted cloud services ecosystem, a set of rich services and scenarios can be realized that take advantage of one or more of the benefits of the trusted ecosystem described herein.

Figure 19:
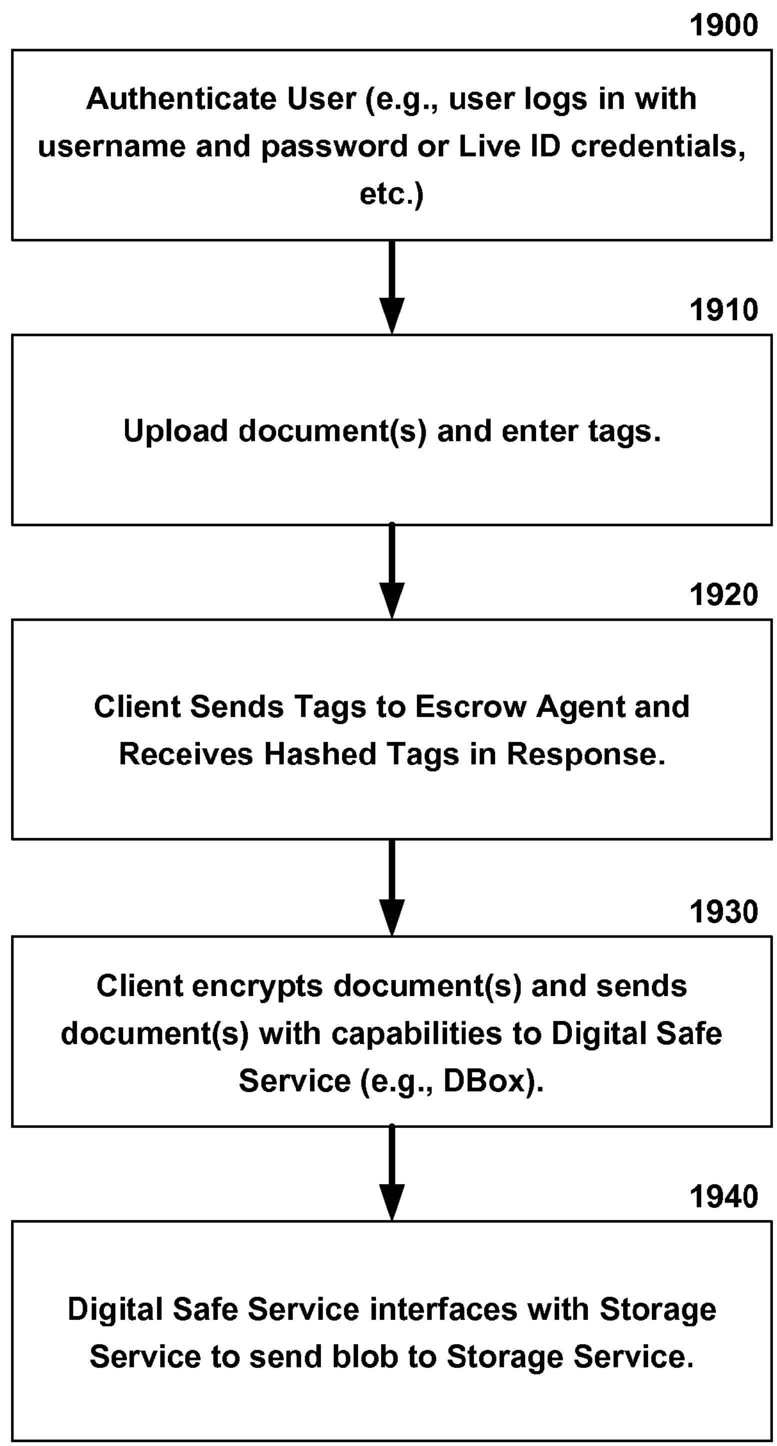
FIGS. 19-20 are flow and block diagrams, respectively, illustrating of an exemplary non-limiting process and/or system for publishing documents to a digital safe application in a way that provides publisher controlled selective access to the data with late binding.

For instance, FIG. 19 is a flow diagram of an exemplary non-limiting process for publishing documents to a digital safe application in a way that provides publisher controlled selective access to the data with late binding as described above. At 1900, a device is authenticates (e.g., the device logs in with a username and password, password credentials, biometric credentials, Live ID credentials, etc.). At 1910, the document(s) are uploaded and tags are entered. The tags are sent to an escrow agent at 1920 and hashed tags are received from the escrow agent in response. In this regard, the tags can be supplied as mentioned, or alternatively can be automatically extracted from the payload (record, document), e.g., through full-text indexing. At 1930, the client encrypts the documents with the publisher's key information and the document(s) are sent to a secure digital cloud storage provider along with capabilities for subscribers with respect to the document(s). At 1940, the secure digital cloud storage provider sends the encrypted blob to a storage service, e.g., vis-á-vis a storage abstraction layer.

Figure 20:
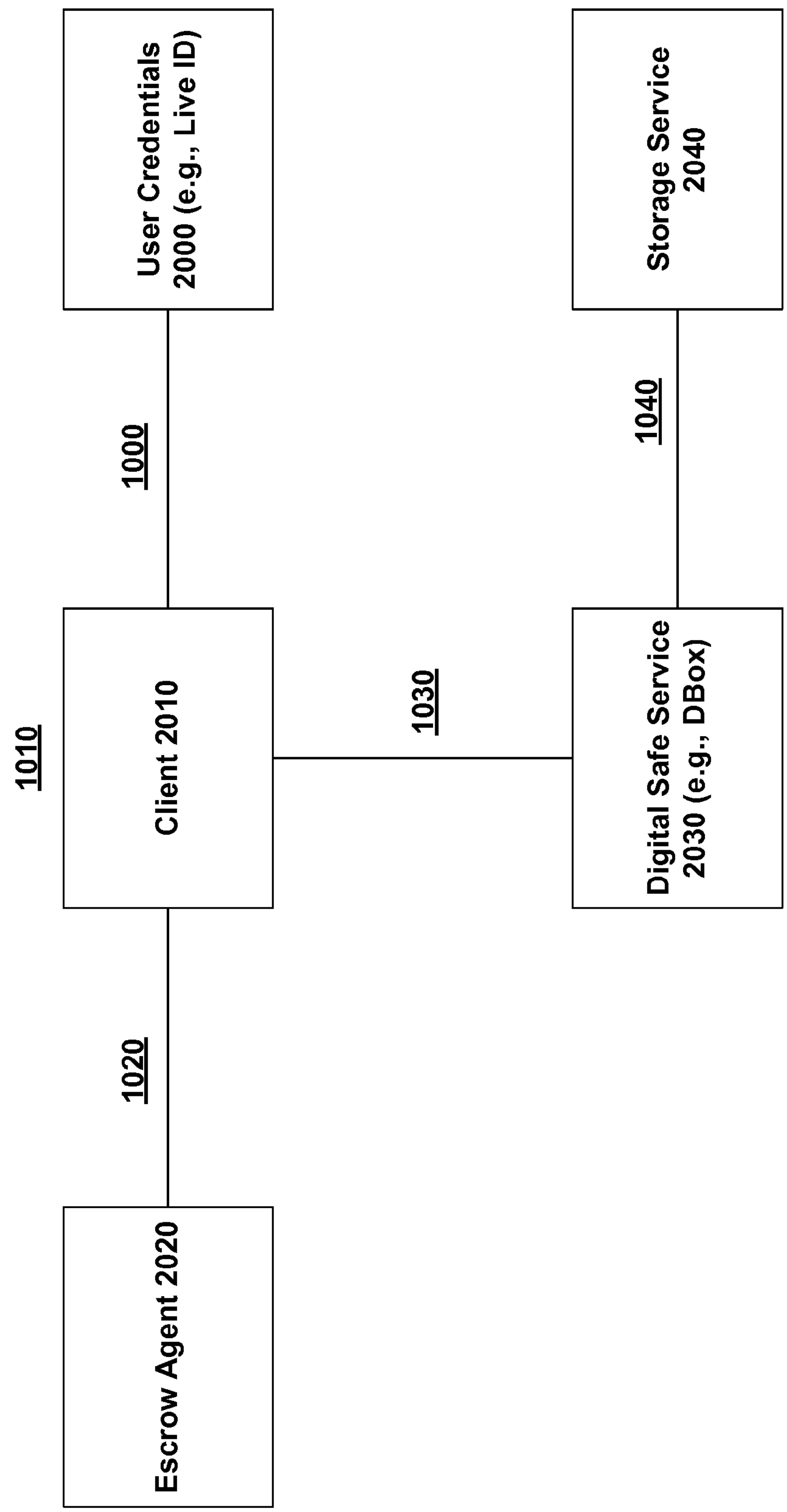

FIG. 20 illustrates FIG. 19 in the context of different participants in the trusted ecosystem with the acts of FIG. 19 labeled in the diagram. In this regard, beginning with the credentials 2000 of client 2010, 1900 occurs. Next, 1910 occurs at client 2010. Next, the step of sending tags to escrow agent 2020 and receiving hashed tags is represented at 1920. Next, client 2010 encrypts the documents and sends to digital safe service 2030 as shown at 1930. Lastly, the encrypted blob is sent to storage service 2040 as represented by 1940. A subscriber can then be granted access to a subset of the user if the capabilities sent with the document(s), or later updated, so permit.

Figure 21:
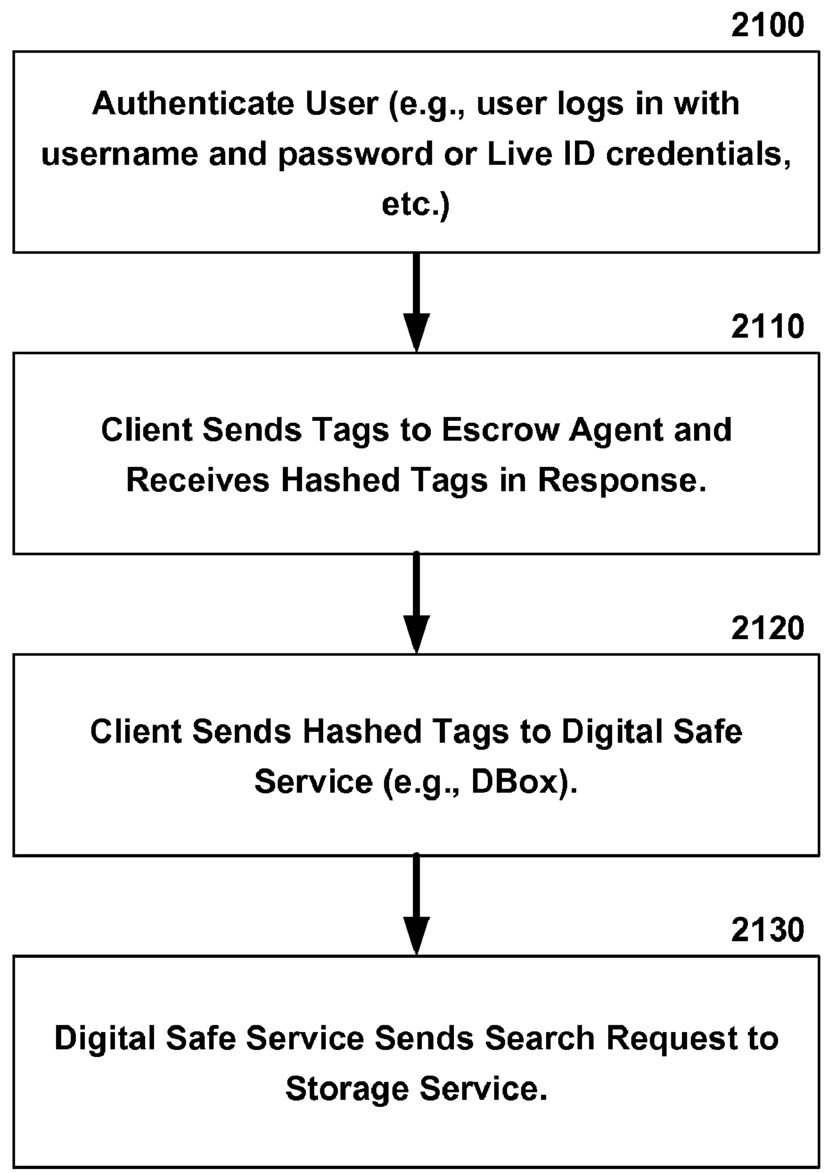
FIG. 21-22 are flow and block diagrams, respectively of an exemplary, non-limiting process and/or system for subscribing to data according to a digital safe scenario.

FIG. 21 is a flow diagram of an exemplary, non-limiting process for subscribing to materials placed in the digital safe. At 2100, the subscriber is authenticated and the client device sends tags to an escrow agent who sends back hashed tags in response at 2110. The client then sends the hashed tags to the digital safe service at 2120 and the hashed tags are interpreted to understand whether, at 2130, the client is entitled to have its search request carried out by the storage service, in whole or in part.

Figure 22:
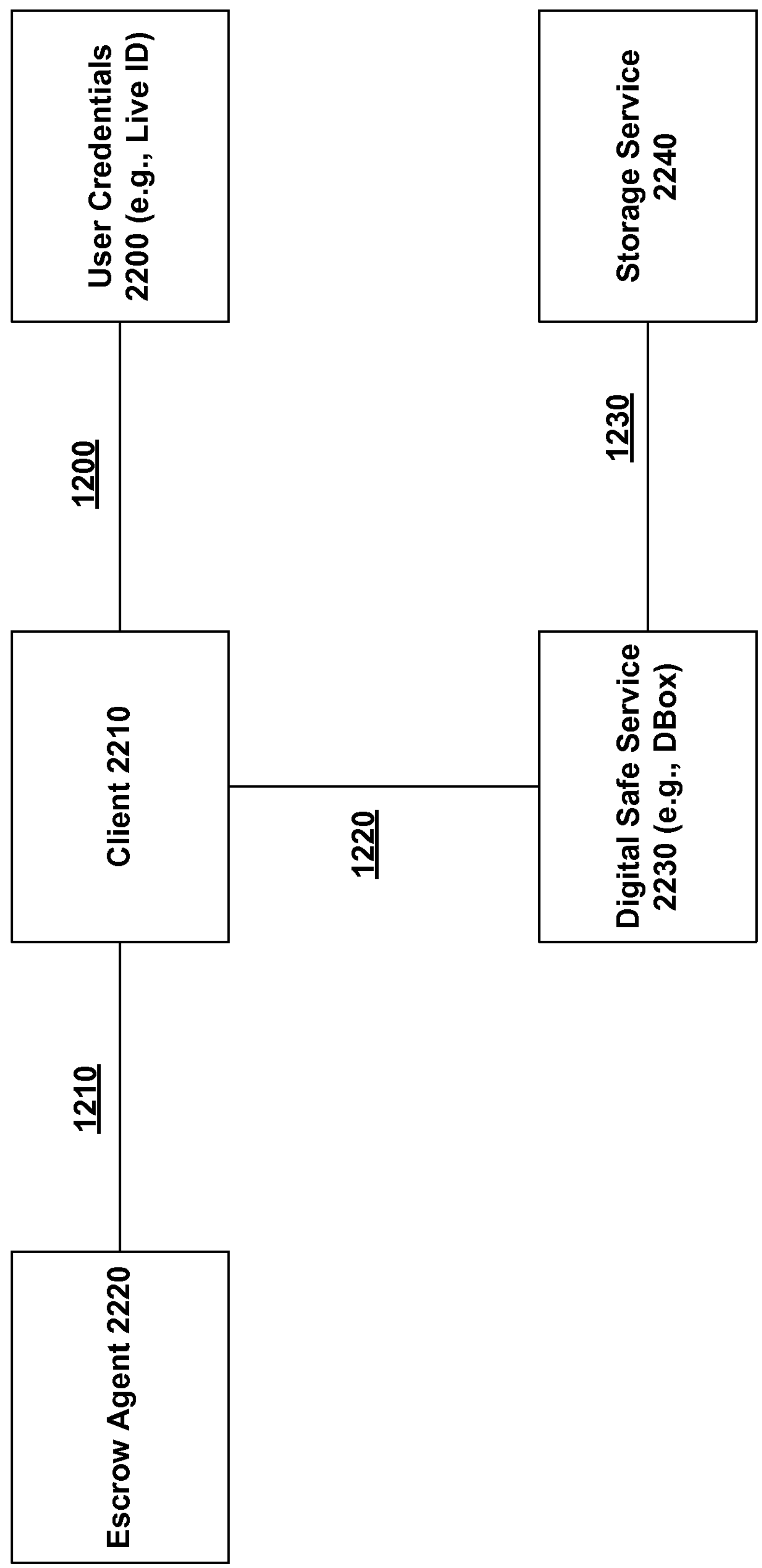

FIG. 22 represents the acts of FIG. 21 overlaid on the participants Similar to FIG. 11: client 2210 and its credentials 2200 for act 2100, client 2210 and escrow agent 2220 for act 2110, client 2210 and digital safe service 2230 for act 2120 and digital safe service 2230 and storage service 2240 for act 2130.

In FIGS. 20 and 22, the escrow agent 2020, 2220 can be the CKG, or a component of the CKG. Alternatively, escrow agent 2020, 2220 can be a CKG instance hosted by a separate participant whereby the escrow agent 2020, 2220 is a trusted entity that is encrypting/decrypting on behalf of the Client. In this regard, design tradeoffs and relationships among participants may dictate the function and scope of the escrow agent 2020, 2220. For instance, for low-end clients, offloading the client functionality to a trusted proxy service may be needed to perform heavy processing.

Figure 23:
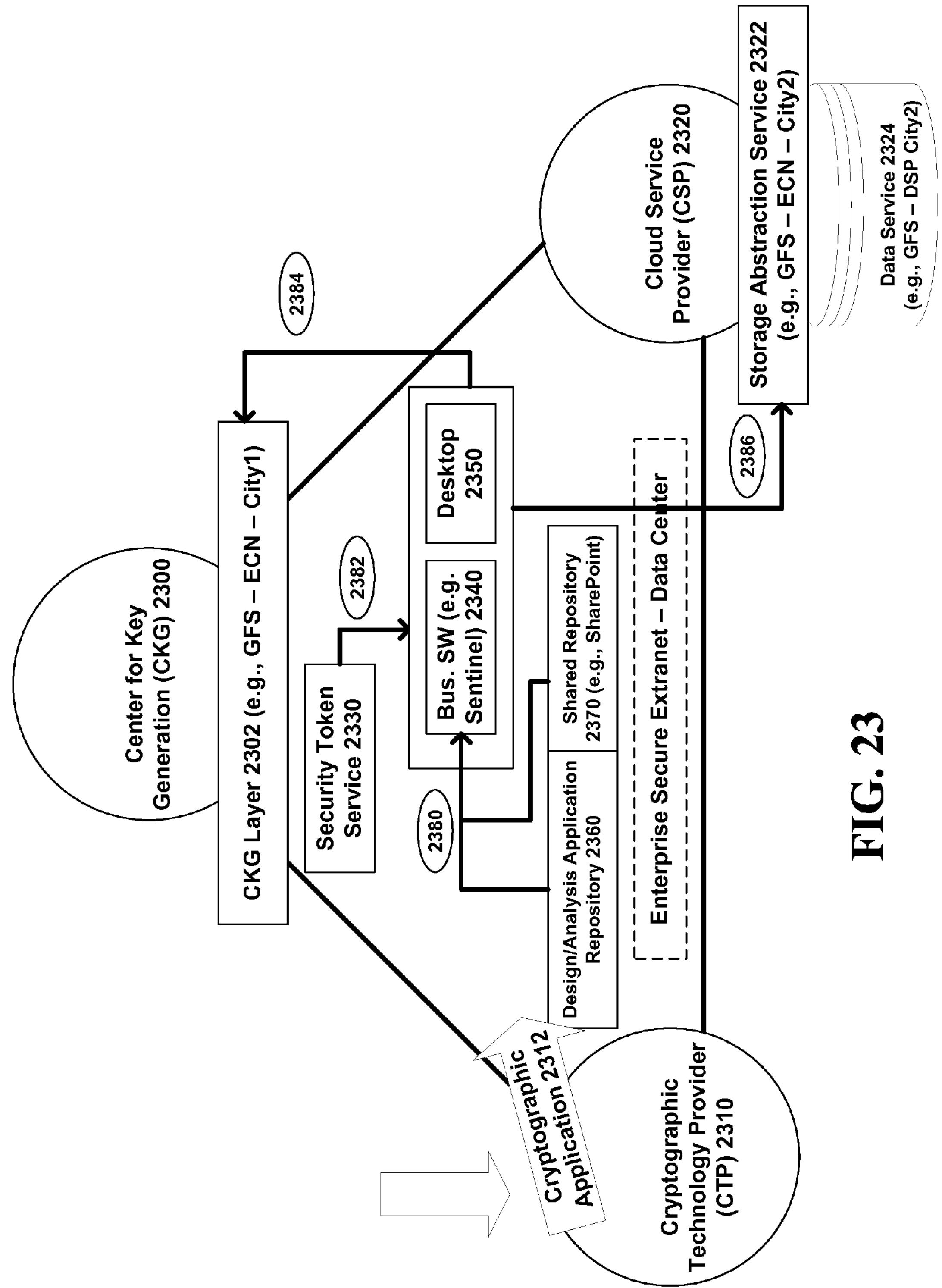
FIG. 23 illustrates an exemplary non-limiting implementation of a trusted cloud services ecosystem using a digital escrow pattern to implement a secure extranet for an enterprise via one or more data centers.

FIG. 23 illustrates an exemplary non-limiting implementation of a trusted cloud services using the digital escrow pattern to implement a secure extranet for an enterprise via one or more data centers. As mentioned, the trusted computing ecosystem can include a center for key generation 2300 implemented separately from a cryptographic technology provider (CTP) 2310, which provides reference implementations for use in implementing cryptographic techniques consistent with the ecosystem that are implemented separately from one or more cloud service providers (CSPs) 2320. In an exemplary non-limiting implementation of secure extranet, 2380 shows that the enterprise maintains a shared repository 2370 (e.g., SharePoint) and a repository 2360 of design or analysis applications for use in connection with the documents in shared repository 2370. Business software 2340 (e.g., Sentinel) can monitor application or server performance and the like for a computer having desktop 2350.

In this regard, in a trusted cloud services ecosystem, when a subscriber using the desktop 2350 seeks information selectively accessible and encrypted from storage, a security token service 2330 can deliver some information to identify the subscriber 2382 and the CKG 2300 can be consulted via interfaces of the CKG layer 2302 of a first data center as shown by 2384. The CKG 2300 returns key information which can then be used to selectively access data as shown by 2386 held by data service 2324 via storage abstraction service 2322. Any type of data can be therefore be shared across an enterprise and selectively according to the roles of the subscribers in the enterprise.

Figure 24:
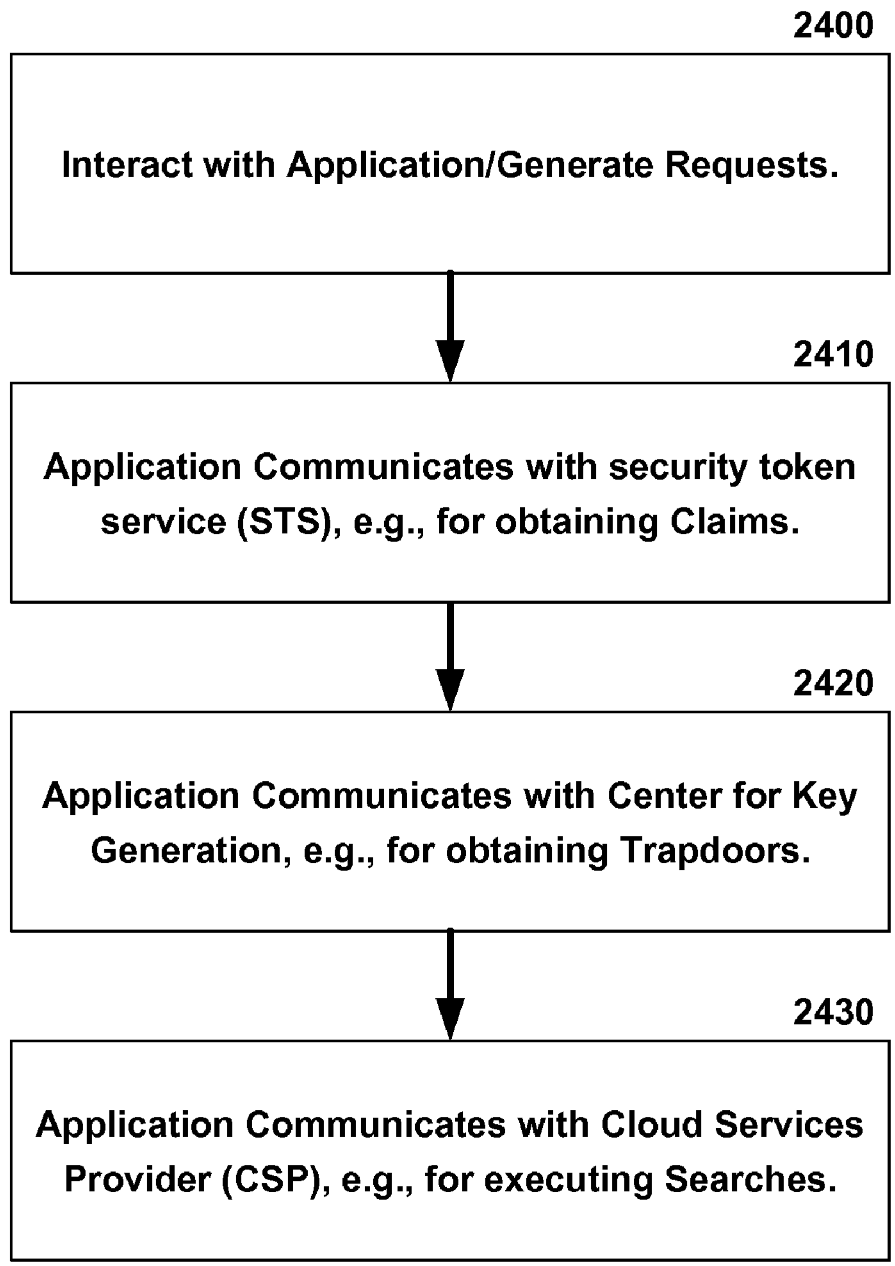
FIG. 24 is a flow diagram illustrating another exemplary non-limiting scenario based on a trusted cloud services ecosystem in which a subscriber is given selective access to encrypted data stored by a cloud service provider.

FIG. 24 is a flow diagram illustrating another exemplary non-limiting scenario based on a trusted cloud services ecosystem in which a subscriber is given selective access to encrypted data stored by a CSP, e.g., within an enterprise. Initially, the subscriber device has acquired no privileges to access the encrypted data. By making a request for some or all of the encrypted data however, e.g., by interacting with an application, at 2400, the application automatically communicates with a corresponding STS for obtaining Claims (in the parlance of cryptography) at 2410. At 2420, the application communicates with the CKG to obtain key information that encodes information about capabilities for the subscriber (capabilities are sometimes referred to as Trapdoors in the parlance of cryptography, though the term capabilities is not restricted to the context in which the term Trapdoor typically appears). Lastly, the application provides the key information to the CSP at 2430, which permits searches or queries over the encrypted data to the extent allowed by the subscriber's capabilities.

Figure 25:
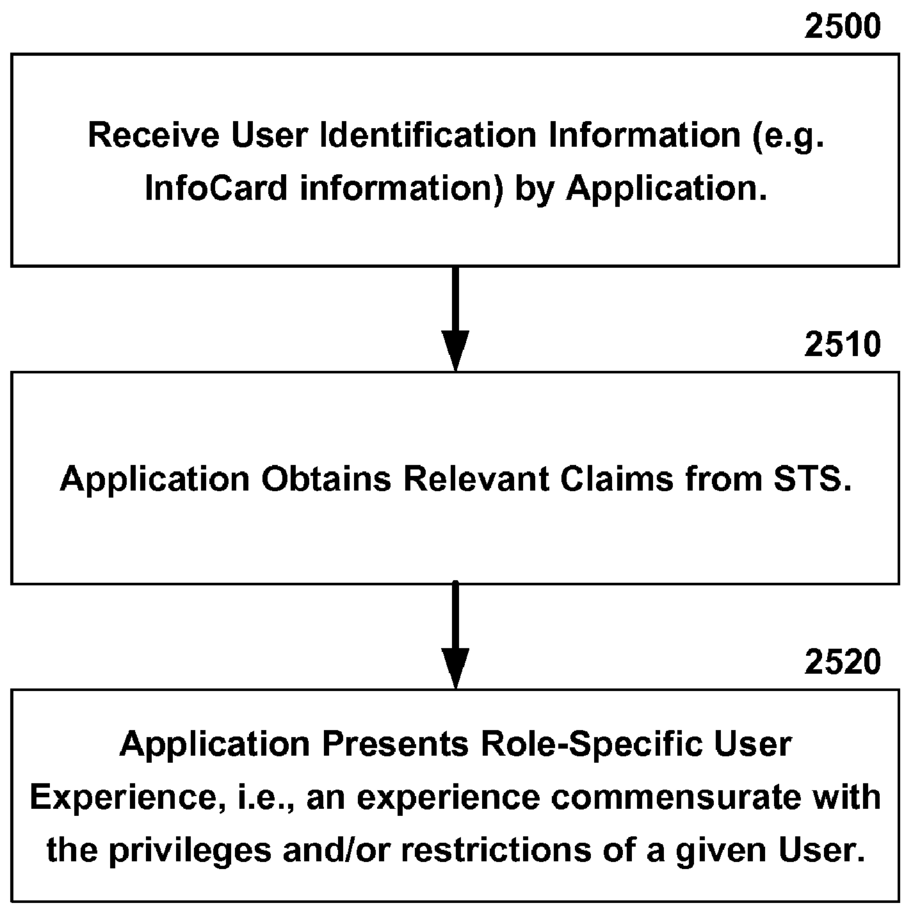
FIG. 25 is another flow diagram illustrating that the application response can be tailored to a subscriber based on user credentials.

FIG. 25 is another flow diagram illustrating that the application response can be tailored to a subscriber based on sign-in information. For instance, at 2500, user ID information is received by an application. At 2510, the application obtains relevant Claims from the STS. At 2520, based on one or more roles served by the user associated with the user ID information, the experience can be tailored commensurate with privileges/restrictions for those roles. For instance, the user experience with which a company's chief financial officer is presented as a view over the company's encrypted data can and should be a different user experience than the view over the company's encrypted data given to a mail room employee. FIG. 25 can apply to single or multi-party login scenarios.

Figure 26:
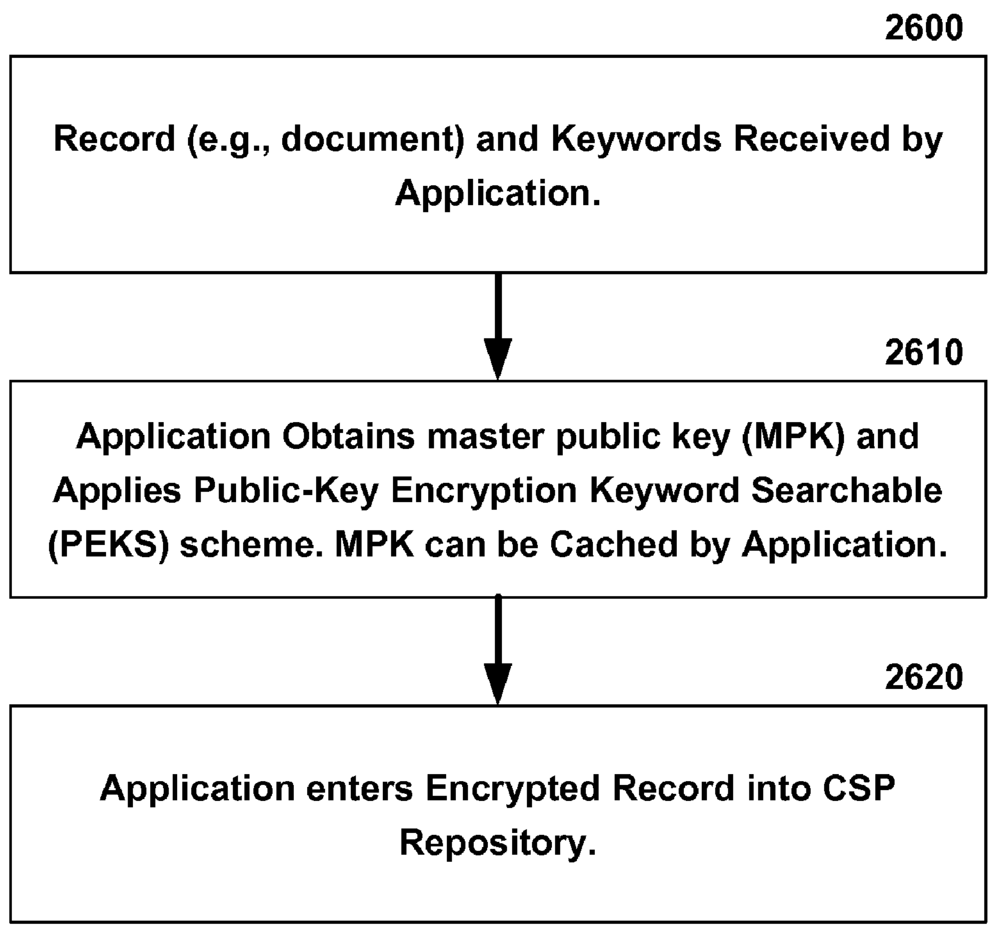
FIG. 26 is another flow diagram illustrating a secure record upload scenario, which can be implemented for a single party or multiple parties.

FIG. 26 is another flow diagram illustrating a secure record upload scenario, which can be implemented for a single party or multiple parties. At 2600, a record and keywords are received by an application, e.g., provided or designated by a user of a device with the application. At 2610, the application obtains a master public key (MPK) and applies public key encryption keyword searchable (PEKS) algorithm(s). The MPK can optionally be cached by the application. At 2620, the application enters the encrypted record into a CSP repository, e.g., via a storage abstraction layer.

Figure 27:
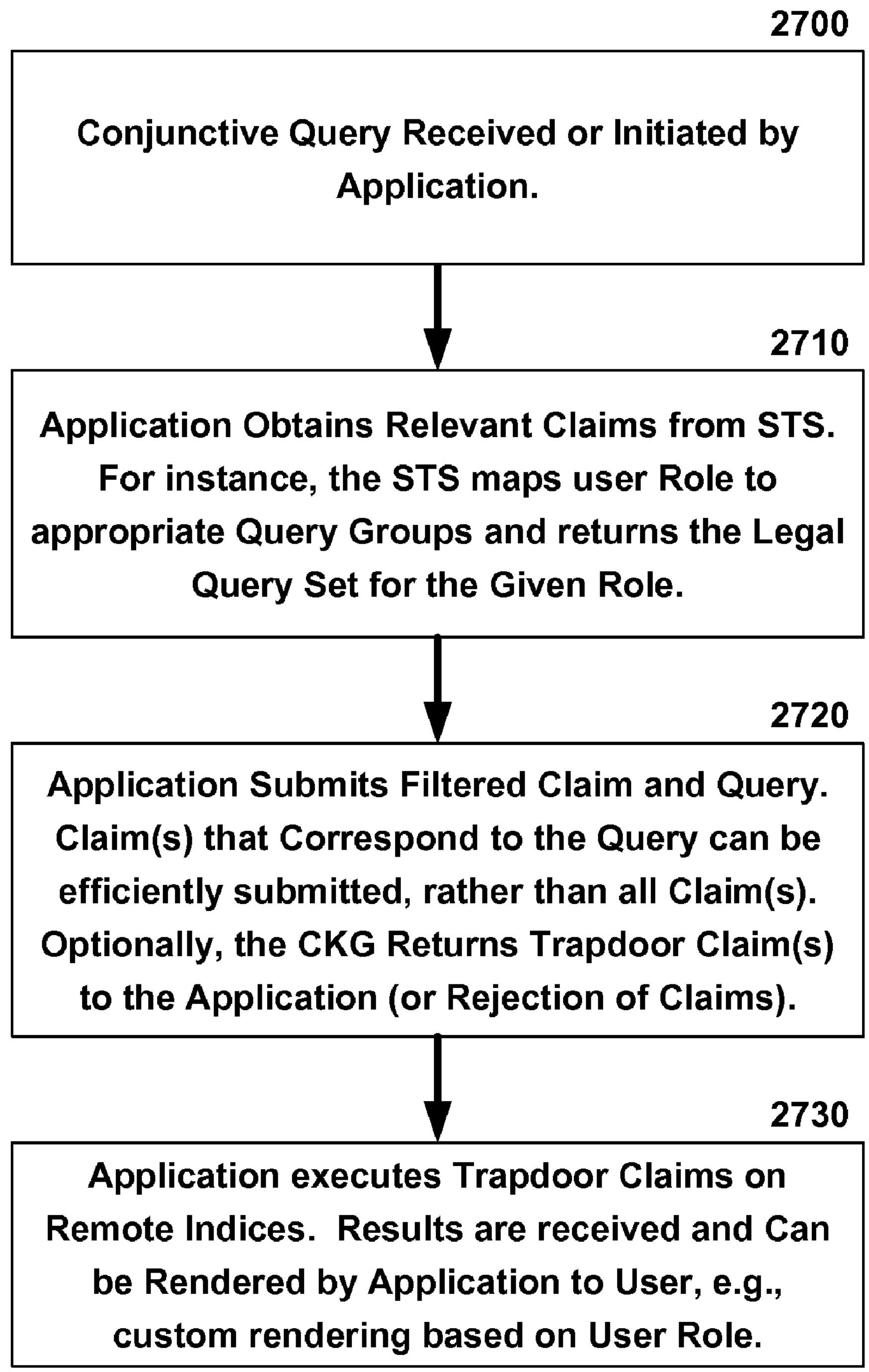
FIG. 27 is yet another flow diagram illustrating an exemplary non-limiting implementation of role-based querying over the searchably encrypted data store enabled by a trusted cloud services ecosystem, e.g., for automated search by a single party.

FIG. 27 is yet another flow diagram illustrating an exemplary non-limiting implementation of role-based querying over the searchably encrypted data store enabled by a trusted cloud services ecosystem, e.g., for automated search by a single party. At 2700, a conjunctive query is received or initiated by an application. At 2710, the application obtains relevant claims from the STS. For instance, the STS maps the user's Role(s) to appropriate Query Group(s) and returns the Legal Query Set for the Given Role(s). At 2720, the application submits a Filtered Claim and Query such that Claim(s) that Correspond to the Query can be efficiently submitted, rather than all Claim(s). Optionally, the CKG returns Trapdoor Claim(s) to the application (or Rejects the Claims). At 2730, the application executes the Trapdoor Claims on Remote Indices. Based on the processing over the Remote Indices, results are received and can be rendered by the application to the user, e.g., using custom rendering based on User Role(s).

Figure 28:
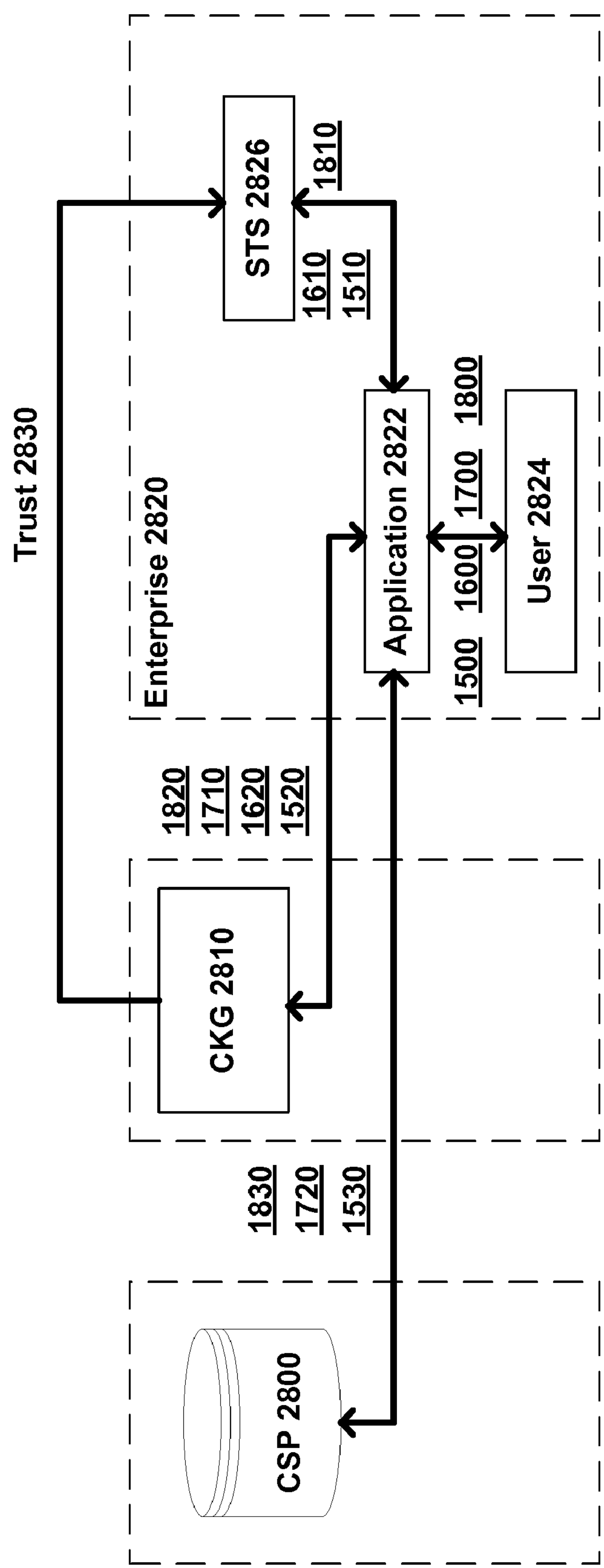
FIG. 28 is a block diagram of an implementation of a trusted cloud service ecosystem among an enterprise, a center for key generation and a cloud service provider in accordance with one or more scenarios.

FIG. 28 is a block diagram of an implementation of a trusted cloud service ecosystem among an enterprise 2820, a CKG 2810 and a CSP 2800 in which the acts of FIGS. 24-27 described above are highlighted via the same reference numerals. The scenarios begin with user 2824 identifying himself or herself to application 2822. The STS 2826 operates to establish trust 2830 in connection with the exchange of information to and from CKG 2810, returning key information to the application 2822 for use in encrypting or decrypting data from CSP 2800 depending on the goals of the scenario.

Figure 29:
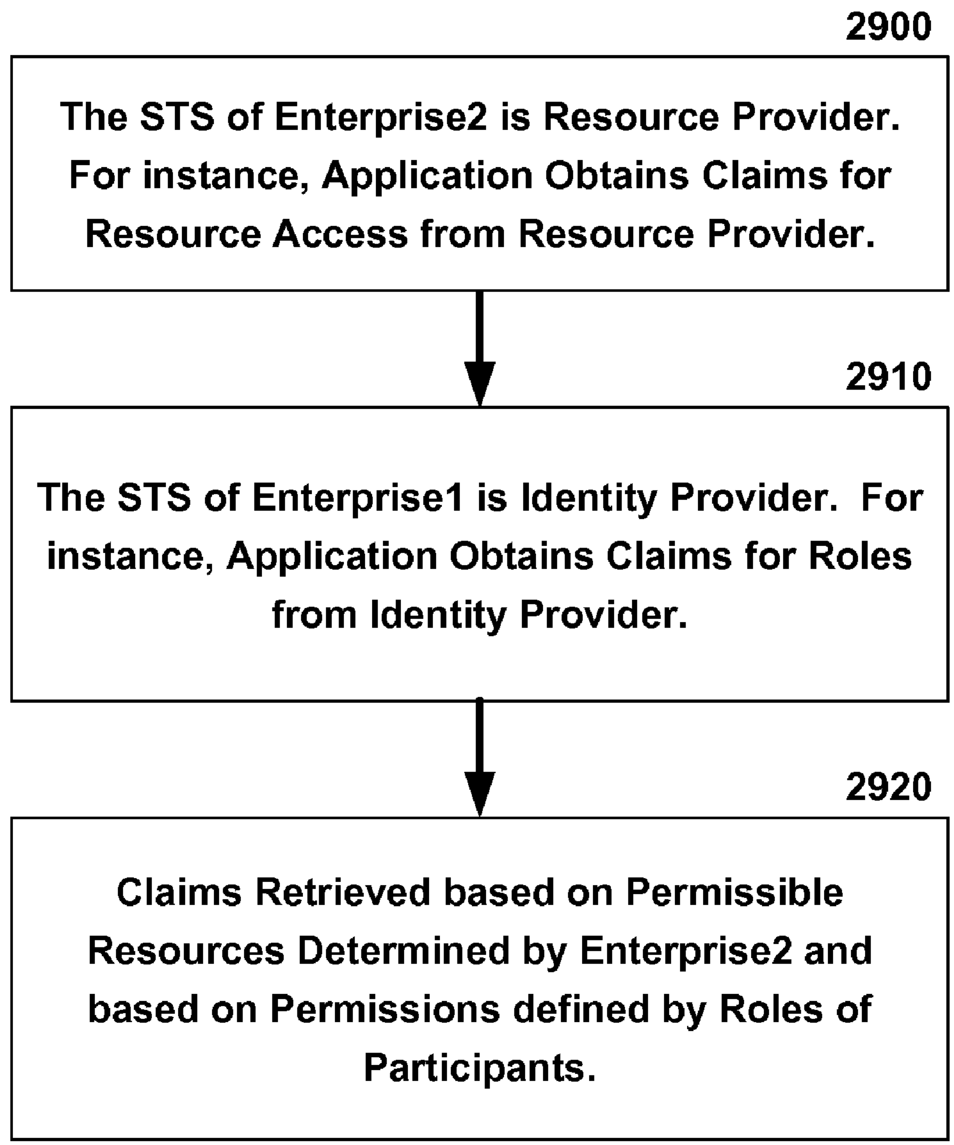
FIG. 29 is a flow diagram illustrating a multi-party cooperative scenario where an enterprise provides access to some of its encrypted data to an external enterprise.

FIG. 29 is a flow diagram illustrating a multi-party cooperative scenario where an enterprise provides access to some of its encrypted data to an external enterprise. For example, a manufacturer may grant a supplier access to some of its data stored in the trusted cloud, or vice versa. In this regard, at 2900, the STS of Enterprise2 is designated the resource provider and an application of Enterprise1 proceeds to obtain Claims for access to the resources provided by the resource provider in the cloud. At 2910, the STS of Enterprise1 is designated as the identity provider. In this respect, the application obtains the Claims for a role or set of roles defined by the subscriber at Enterprise1 as facilitated by the identity provider. At 2920, the Claims are retrieved by the application based on Permissible Resources controlled by Enterprise2 and based on Permissions/Capabilities defined by the role(s) of the subscribing entity. In FIG. 29, while only one STS is depicted, it is noted that that there can be multiple Identity Provider STSs and/or multiple Resource Provider STSs in a Digital Escrow, or Federated Trust Overlay.

Figure 30:
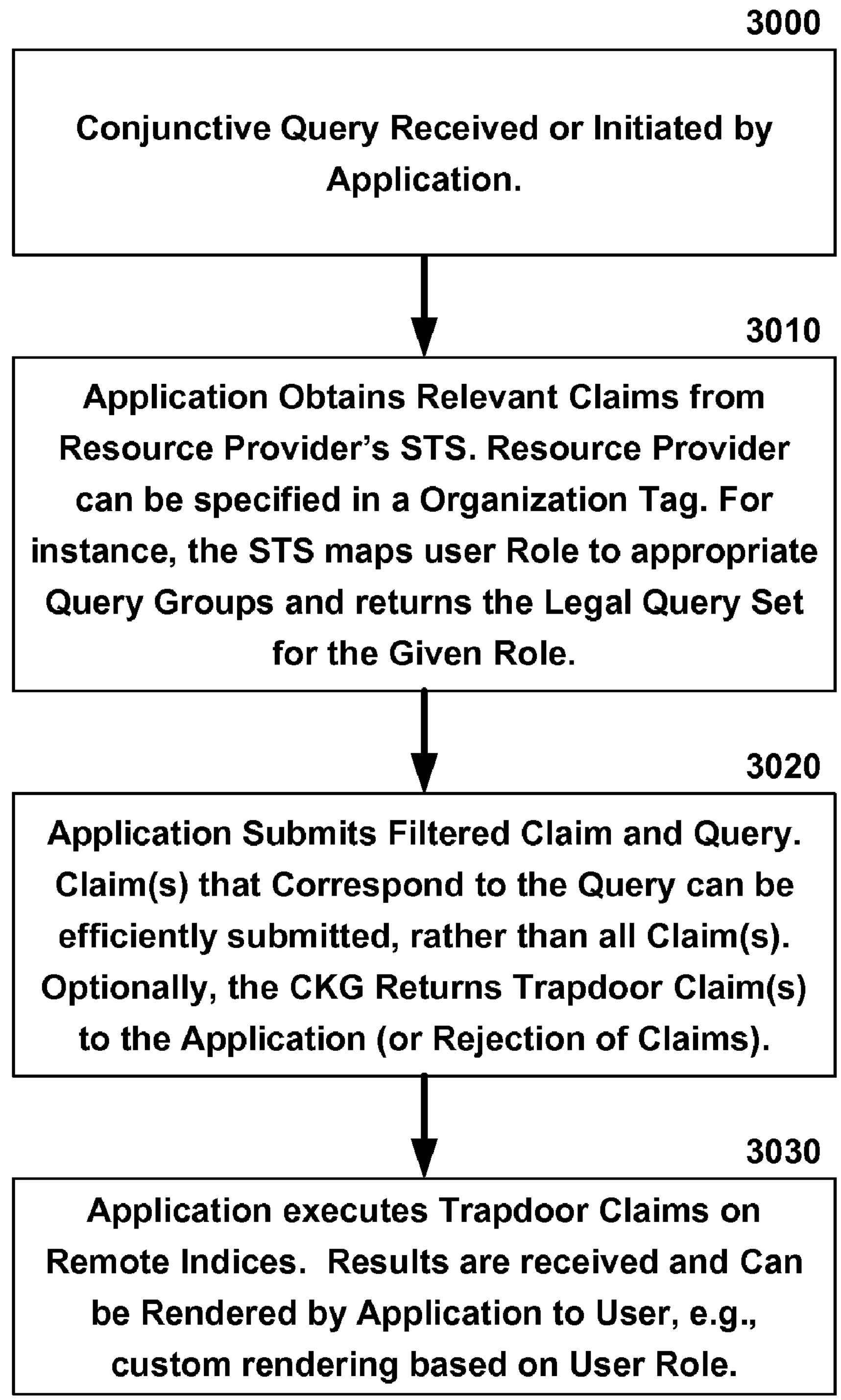
FIG. 30 is a flow diagram illustrating a multi-party automated search scenario among multiple enterprises.

FIG. 30 is a flow diagram illustrating a multi-party automated search scenario, e.g., among multiple enterprises such as Enterprise1 and Enterprise2. At 3000, a conjunctive query is received or initiated by an application of Enterprise1 for execution. At 3010, the application obtains relevant Claims from the STS of the resource provider (Enterprise2). The resource provider can be specified in an organization tag, optionally. The STS can optionally perform a mapping of user Role to Query Groups, so that the Legal Query Set is returned for the user Role. At 3020, the application submits a Filtered Claim and Query based on the user Role, The Claims that correspond to the Query can be efficiently submitted, rather than all Claim(s). Optionally, the CKG returns capabilities to the application (e.g., Trapdoor Claims), or the CKG rejects the Claims. At 3030, the application executes the Trapdoor Claims on Remote Indices. Based on the processing over the Remote Indices, results are received and can be rendered by the application to the user, e.g., using custom rendering based on User Role(s).

In FIGS. 27 and 30, the method includes a step of receiving a conjunctive query, or otherwise initiating a conjunction query. In this regard, optionally, conjunctive queries can also be cryptographically protected so that no recipient of a trapdoor (or capability), either the client or the service provider, can decompose the conjunctive query and determine its constituent parts.

Figure 31:
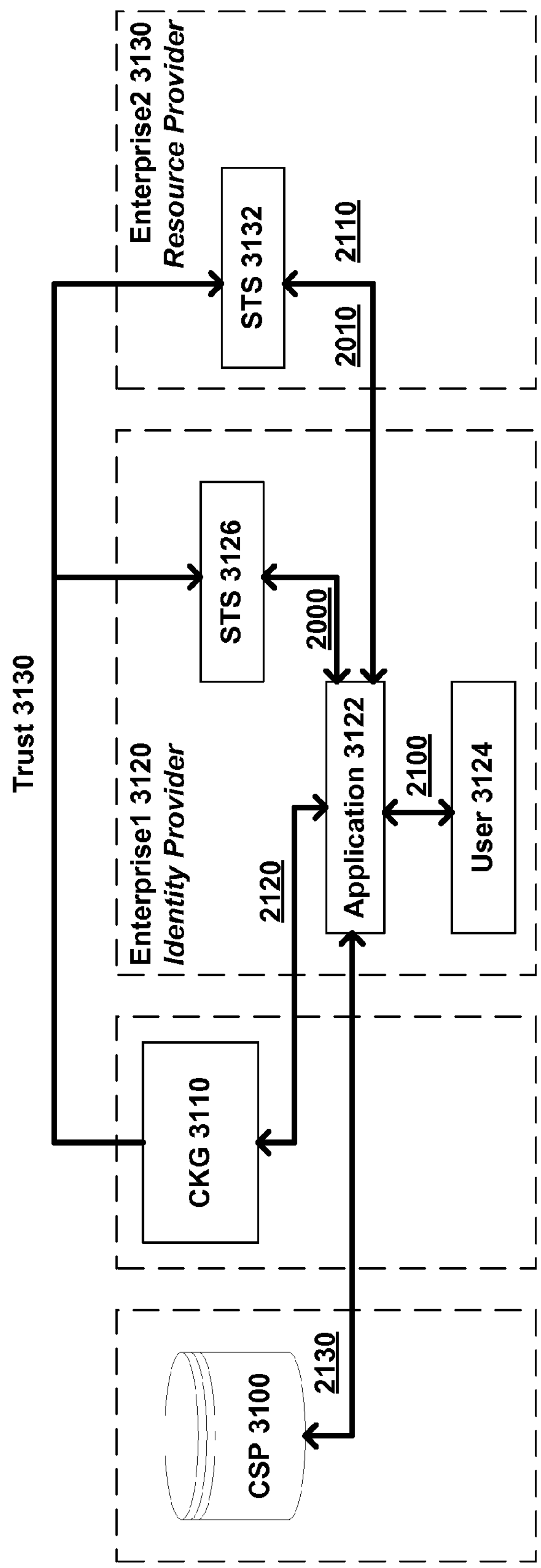
FIG. 31 is a block diagram of an implementation of a trusted cloud service ecosystem among multiple enterprises, a center for key generation and a cloud service provider in accordance with one or more scenarios.

FIG. 31 is a block diagram of an implementation of a trusted cloud service ecosystem among enterprises 3120, 3130, a CKG 3110 and a CSP 3100 in which the acts of FIGS. 20-21 described above are designated via the same reference numerals. For instance, a user 3124 can identify himself or herself to application 3122. The STS 3126 of enterprise 3120 and the STS 3132 of enterprise 3130 cooperate to establish trust 3130 in connection with the exchange of information to and from CKG 3110, returning key information to the application 3122 for use in encrypting or decrypting data from CSP 3100 depending on the goals of the scenario.

Figure 32:
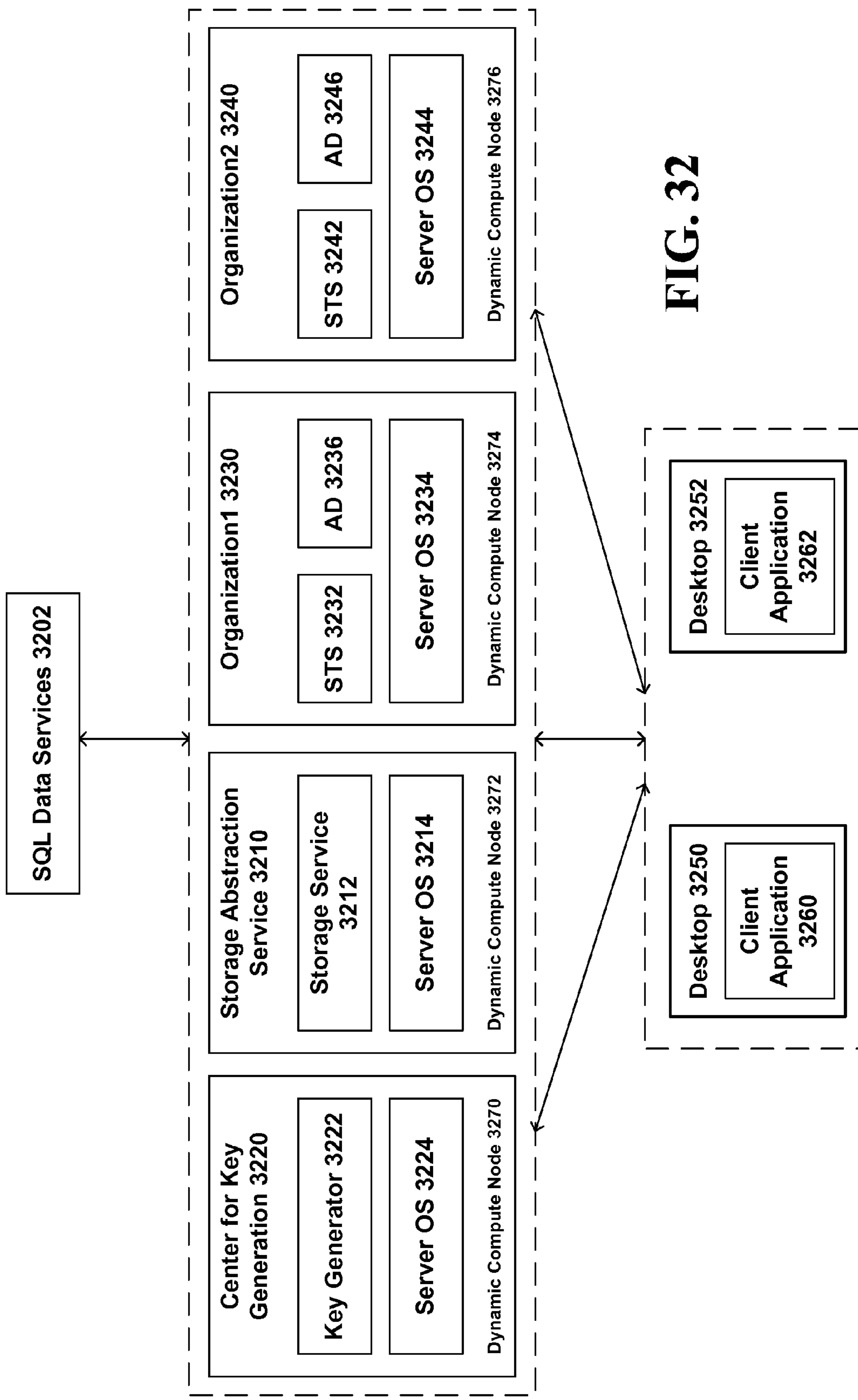
FIG. 32 illustrates an exemplary non-limiting edge compute network (ECN) technology that can be implemented for a trusted cloud service.

FIG. 32 illustrates an exemplary non-limiting edge compute network (ECN) technology that can be implemented for a trusted cloud service. In this regard, a plurality of dynamic compute nodes 3270, 3272, 3274, 3276 are dynamically allocated for computational bandwidth in connection with a set of trusted cloud components operating independently of one another. For instance, a center for key generation 3220, a storage abstraction service 3210, organization 3230 and organization 3240 can be implemented as shown to cover multi-organizational business or other scenarios, such as those described above. Center for key generation 3220 includes a key generator 3222 and a server OS 3224. Storage abstraction service 3210 includes a storage service component 3212 and a server OS 3214. Organization 3230 includes an STS 3232, an AD 3236 and a server OS 3234. Organization 3240 includes an STS 3234, an AD 3246 and a server OS 3244. The server OSs 3214, 3224, 3234, 3244 cooperate to implement the ECN across servers. Any storage provider or abstraction 3202 can be used for storage of data, e.g., SQL data services can be employed. In this way, one or more desktops 3250, 3252 can publish or subscribe to data via client applications 3260, 3262, respectively.

Figure 33:
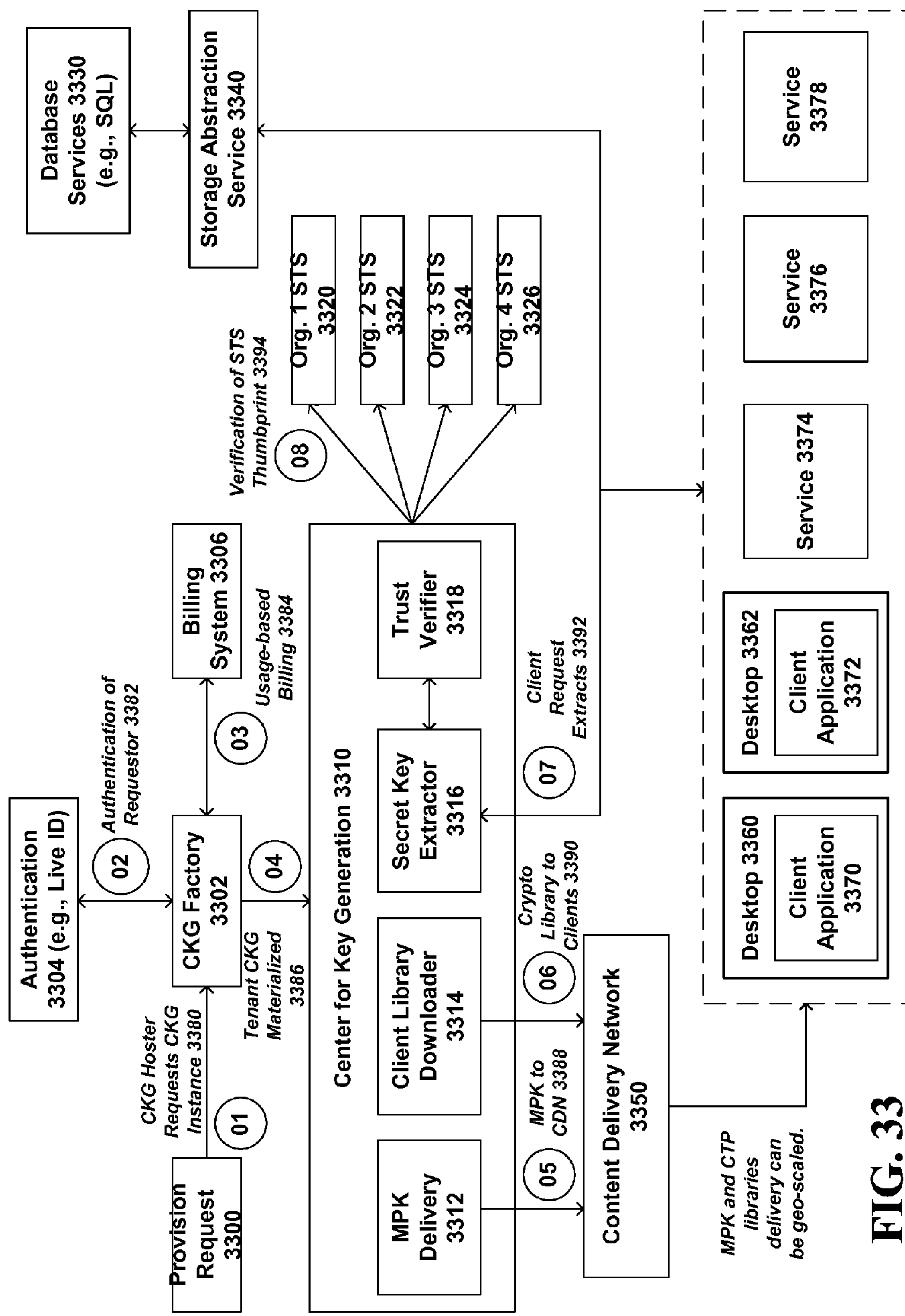
FIG. 33 is a block diagram illustrating one or more optional aspects of a center for key generation in accordance with a trusted cloud service ecosystem.

FIG. 33 is a block diagram illustrating one or more optional aspects of a center for key generation 3310 in accordance with a trusted cloud service ecosystem. Initially, a set of computing devices, such as desktops 3360, 3362 and respective client applications 3370, 3372, or services or servers 3374, 3376, 3378, etc. are potential publishers and/or subscribers to a cloud content delivery networks 3350. However, prior to fulfilling requests from any of the set of computing devices, initially a center for key generation acts as a custodian for trust for publishers encrypting data based on a public key, and handing out private keys to data subscribers based on their capabilities.

In an exemplary non-limiting interaction, initially a request from a computing device is provisioned 3300 and the hoster of the CKG 3310 requests an instance of the CKG 3310 from the CKG factory 3302 at 3380. Next, user authentication 3304 takes place at 3382. Next, any usage-based billing 3384 can be applied by billing system 3306 for use of the CKG factory 3302. Next, the tenant CKG is materialized at 3386 by CKG factory 3302, which may include MPK delivery component 3312, client library downloader 3314, secret key extractor 3316 and trust validator/verifier 3318.

MPK delivery component 3312 delivers MPK to the CDN 3350 at 3388. Client library downloader 3314 downloads crypto libraries to requesting clients which can be used in connection with encrypting data to be published or decrypting data to which the device is subscribed. Next, the client makes request to extract a given set of documents based on key information received from secret key extractor 3316, which cooperates with trust verifier 3318, which can validate that the subscriber has certain capabilities based on verifying the STS thumbprint of the subscriber at 3394, e.g., based on communication with different STSs 3320, 3322, 3324, 3326 of organizations involved in the request. As in other embodiments, a storage abstraction service 3340 can be provided to abstract storage details of database services 3330 (e.g., SQL).

Figure 34:
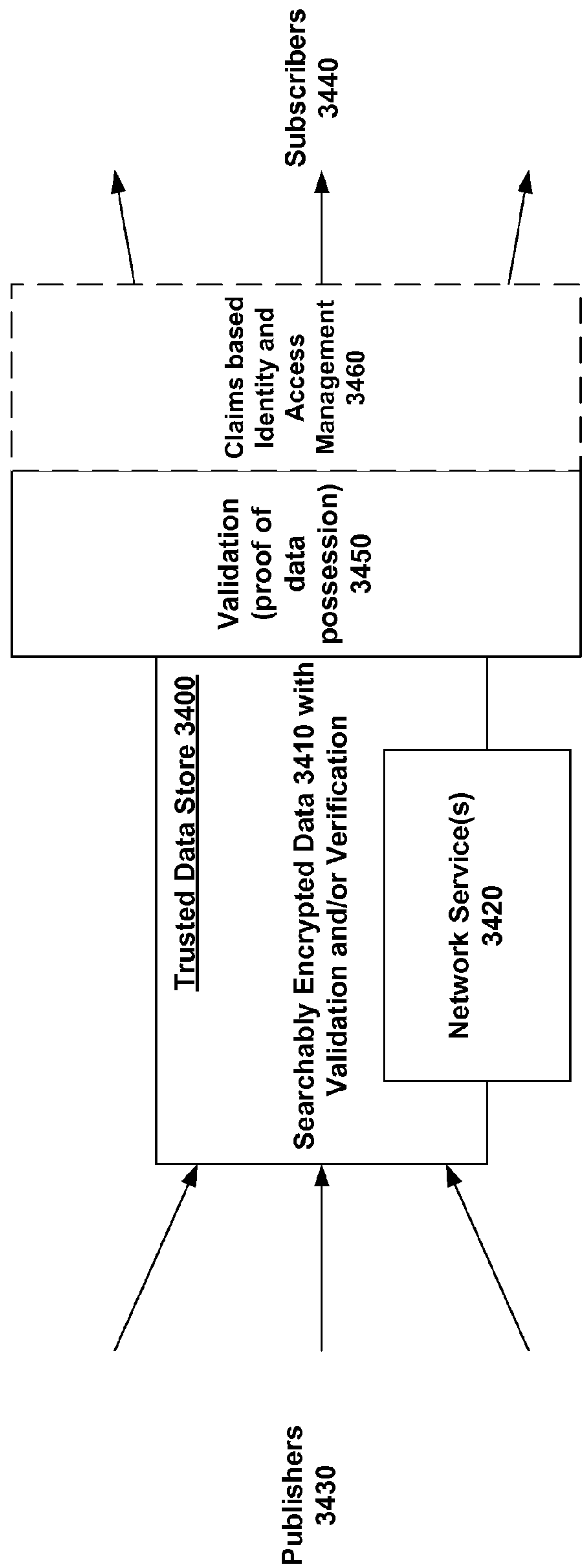
FIGS. 34-35 illustrate the incorporation of validation, e.g., proof of data possession, into the provision of trusted data services in an embodiment.

FIG. 34 is a block diagram of an exemplary non-limiting embodiment of a trusted store 3400 including searchably encrypted data 3410 with validation and/or verification, in connection with the delivery of network services 3420. In this embodiment, a subscriber 3440 or application used by subscriber 3440 can request, as part of a request to access certain parts of the encrypted store 3400, that a validation proof be run over the items returned from the request to validate that the items actually received are also the items that should have been received. In this regard, FIG. 34 illustrates the combination of searchable encryption techniques with techniques for validation. Optionally, the system may also be integrated with Claims-based Identity and Access Management, as described in other embodiments herein. In this regard, the Digital Escrow pattern, also referred to as Federated Trust Overlay, as described in various embodiments herein, can be integrate seamlessly with more traditional Claims-based Authentication systems.

In FIG. 34, the Trusted Data Store 3400 or the Service Provider or Hoster of the data store performs the proving step, whereas the owner of the data (e.g., the subscriber device) performs the validation. Data Store 3400 is trusted because the users can have confidence that it provides strong guarantees, though it is understood that physical entities actually host that data, and some participants are not fully trusted.

Figure 35:
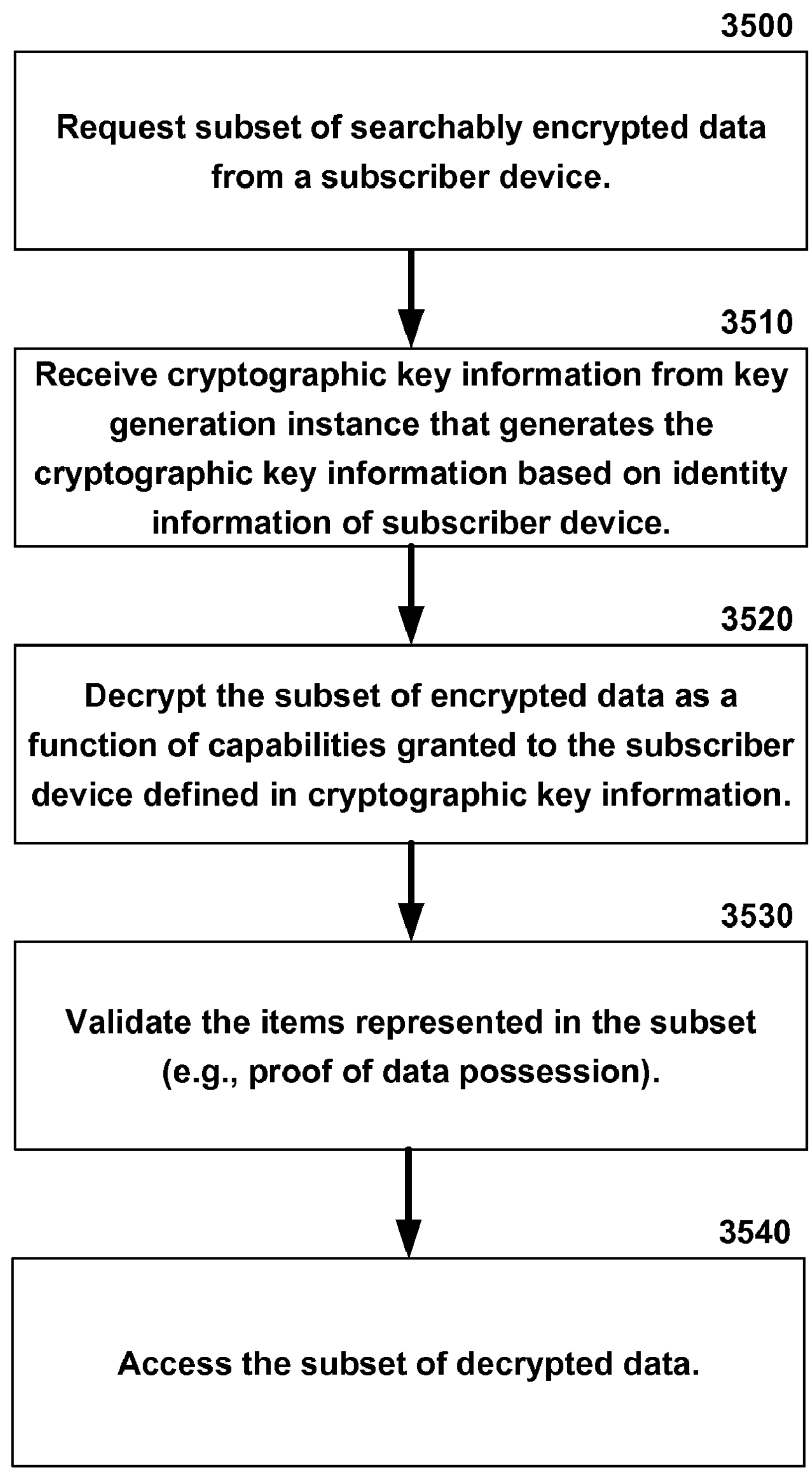

FIG. 35 is a flow diagram illustrating an exemplary non-limiting process for subscribing including a validation step. At 3500, a subset of searchably encrypted data is received from a subscriber device. At 3510, cryptographic key information is generated from key generation instance that generates the cryptographic key information based on identity information of the subscriber device. At 3520, the subset of encrypted data is decrypted as a function of capabilities granted to the subscriber device defined in cryptographic key information. At 3530, the items represented in the subset can be validated (e.g., proof of data possession) and the data is accessed at 3540.

In many cases, it is desirable to be able to execute PDP/POR over encrypted data without needing to decrypt it. Optionally, the key information needed for PDP can be encoded within the metadata that was protected with Searchable Encryption. While this is an effective way of managing the keys used for PDP/POR, it is noted there are many high-value scenarios where PDP/POR can be performed on encrypted data without needing access to the cleartext contents.

Figure 36:
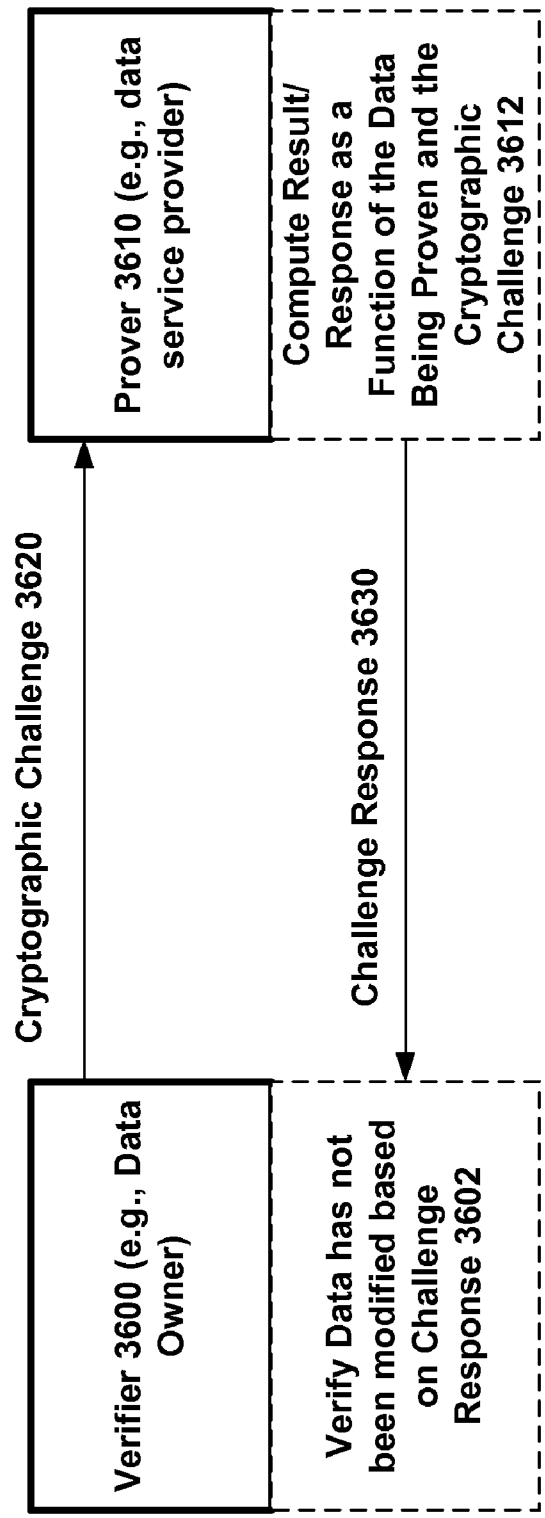
FIG. 36 is a block diagram illustrating exemplary validation of data of a data service in accordance with a trusted service ecosystem.

FIG. 36 illustrates an exemplary non-limiting validation challenge/response protocol in which a verifier 3600 (e.g., the data owner) issues a cryptographic challenge 3620 to a prover 3610 (e.g., the data service provider). Upon receiving the challenge 3620, the prover 3610 computes the response as a function of the data and the challenge 3612. The challenge response 3630 is then returned to verifier 3600, which then performs computation to verify or prove that the data has not been modified 3602.

The validation generally illustrated in FIG. 36 is known as private PDP, though it is noted there is also a "Public" version where a third party is provided with a key (a "public" key) so the third party acts as the Verifier according to a similar protocol, without coming to know anything about the actual data. POR, an example of verification, is different from PDP in that it provides proof that the data is retrievable (despite any corruptions/modifications), but as illustrated in FIG. 30 below, the basic protocol is the same, though the structure of the documents and the actual algorithms are different. Various implementations of a trusted ecosystem herein combine Searchable Encryption and POR/PDP to benefit the system and bolster trust. In this regard, before submitting the data to the Service Provider, the data is searchably encrypted and post processing of the data can include POR and/or PDP.

In addition, a "data dispersion" technique can optionally be overlaid on any one or more of the above embodiments if there is a need to provide even stronger guarantees. With data dispersion, data is distributed to several Service Providers for resilience against "massively bad behavior" or catastrophic loss in any single Service Provider. Using the trust mechanisms described herein, this dispersion is performed in a way that makes it difficult for independent Service Providers to collude and corrupt the data. This is similar in concept to the above described distributed CKG embodiment.

Figure 37:
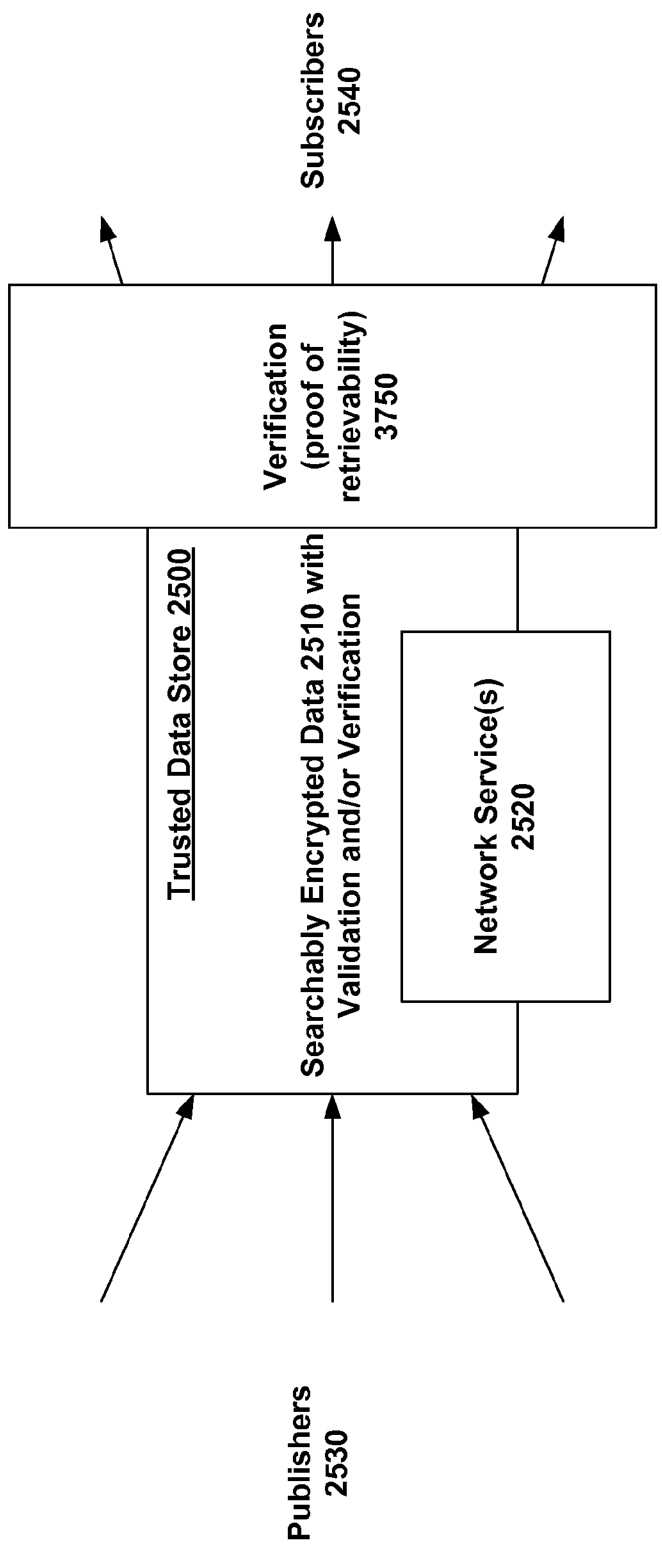
FIGS. 37-38 illustrate the incorporation of verification, e.g., proof of retrievability, into the provision of trusted data services in an embodiment.

FIG. 37 is a block diagram of another exemplary non-limiting embodiment of a trusted store 2500 including searchably encrypted data 2510 with validation and/or verification, in connection with the delivery of network services 2520. Specifically, FIG. 37 illustrates a verification component 3750 for verifying that the items returned to subscribers 2540 were not tampered with, or otherwise inadvertently altered. PDP, mentioned above, is a non-limiting example of verification.

Figure 38:
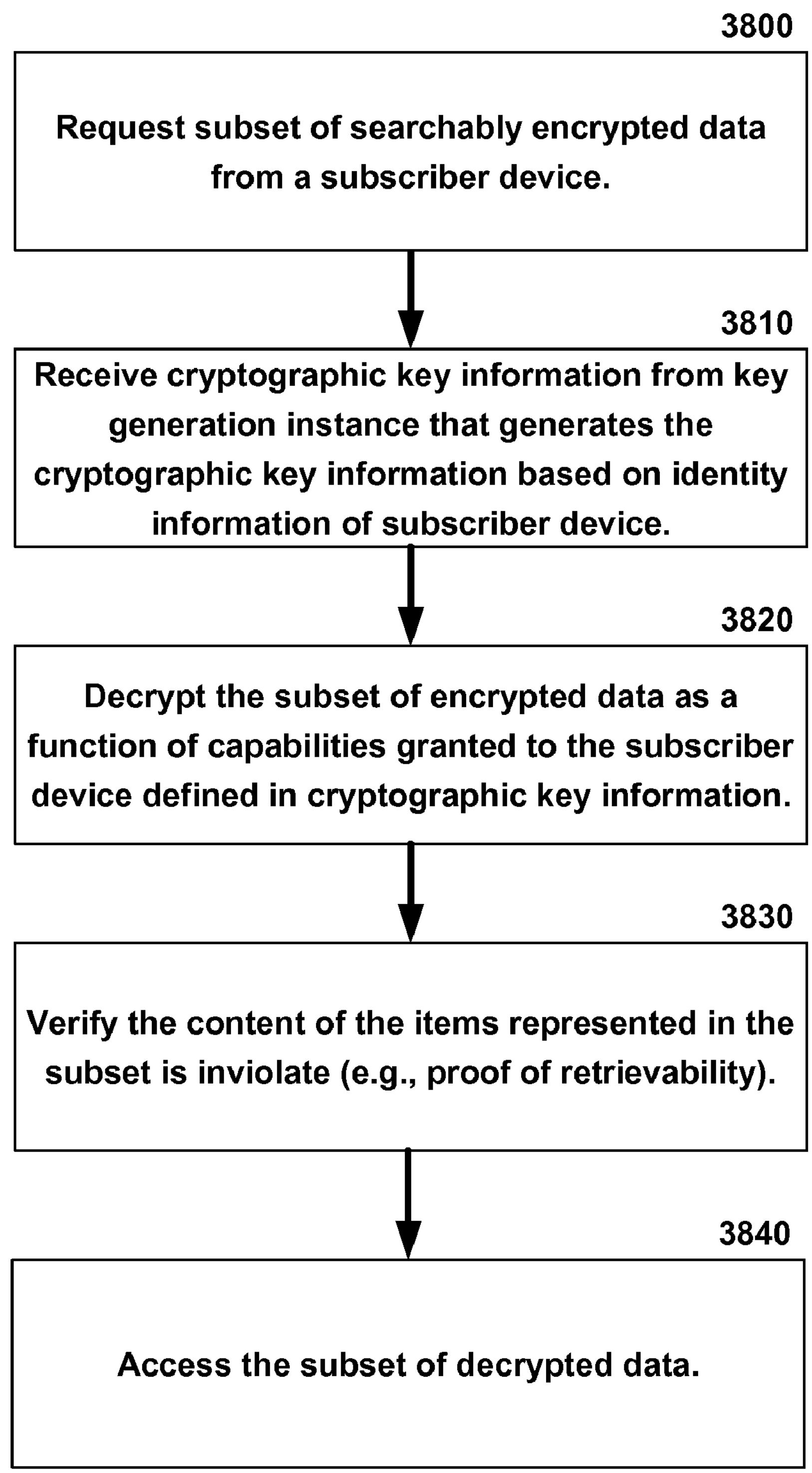

FIG. 38 is a flow diagram illustrating an exemplary non-limiting process for subscribing including a validation step. At 3800, a subset of searchably encrypted data is received from a subscriber device. At 3810, cryptographic key information is generated from key generation instance that generates the cryptographic key information based on identity information of the subscriber device. At 3820, the subset of encrypted data is decrypted as a function of capabilities granted to the subscriber device defined in cryptographic key information. At 3830, the content of the items represented in the subset can be verified (e.g., proof of retrievability) and the data is accessed at 3840.

Figure 39:
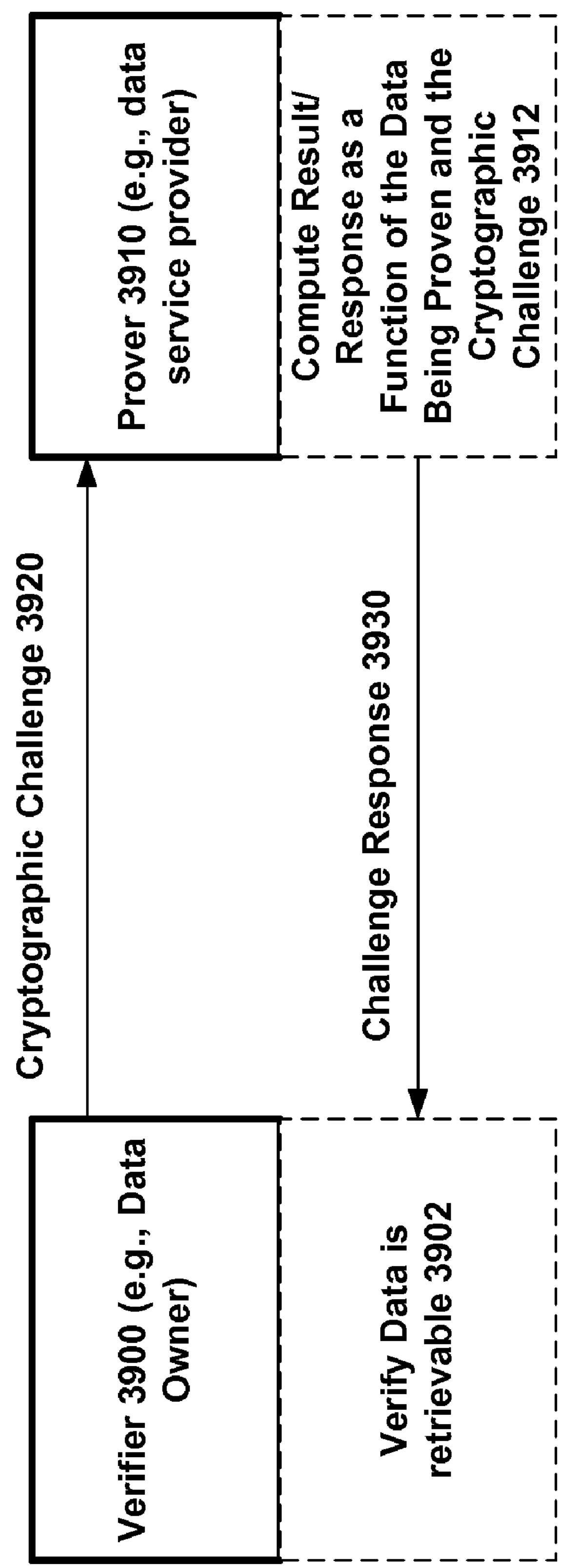
FIG. 39 is a block diagram illustrating exemplary validation of data of a data service in accordance with a trusted service ecosystem.

FIG. 39 illustrates an exemplary non-limiting verification challenge/response protocol in which a verifier 3900 (e.g., the data owner) issues a cryptographic challenge 3920 to a prover 3910 (e.g., the data service provider). Upon receiving the challenge 3920, the prover 3910 computes the response as a function of the data and the challenge 3912. The challenge response 3930 is then returned to verifier 3900, which then performs computation to verify or prove that the data is retrievable 3902.

Figure 40:
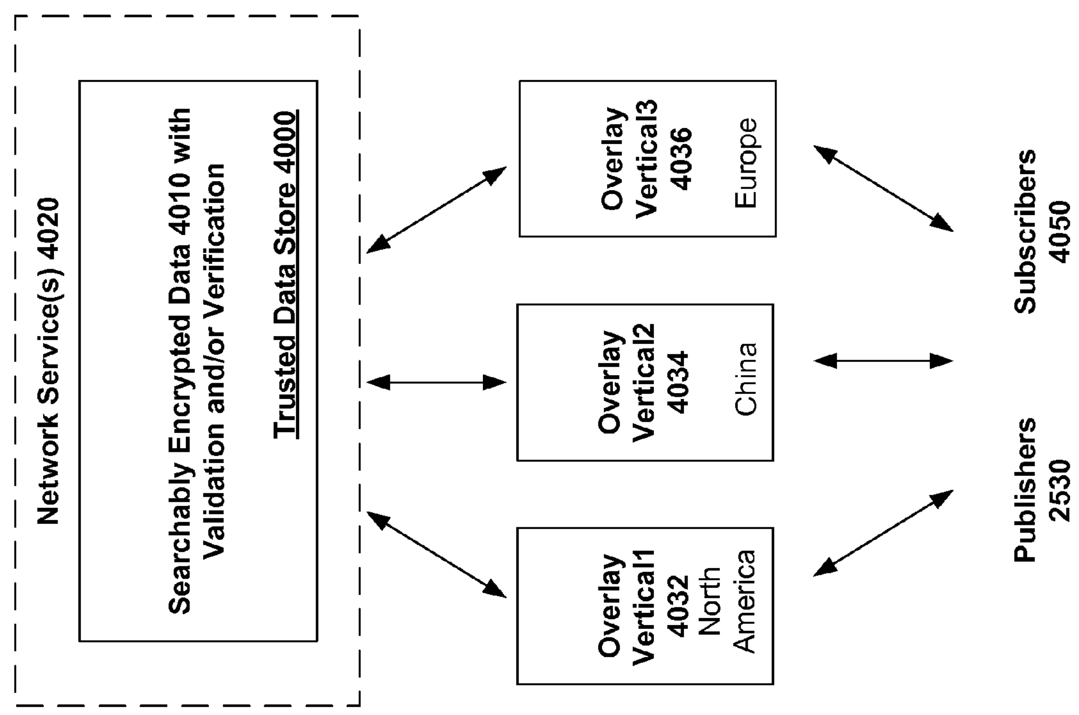
FIG. 40 is a block diagram illustrating the provision of multiple, different overlays or digital escrow verticals for publishers and subscribers to use based on a set of different conditions applicable to the use of a service, independent of the provision of the service itself.

FIG. 40 is a block diagram illustrating a non-limiting scenario where multiple, independent Federated Trust Overlays, or Digital Escrows can exist side by side, or on top of one another for a layered approach. In this scenario, there is a trusted data store 4000 having searchably encrypted data 4010 upon which various network service(s) 4020 can be predicated. For instance network service(s) 4020 can include the delivery of word processing software as a cloud service. As part of geo-distribution, or otherwise, optionally, multiple Overlays/Escrows 4032, 4034, 4036 can be provided that are each tuned to different applications/verticals/compliance needs/sovereign entity requirements, such that the publishers 2530 or subscribers 4050 select, implicitly or explicitly, the correct Overlay/Escrow in which to participate, e.g., based on a set of requirements or area of jurisdiction/domicile. The overlay thus can change, but the back-end services from the cloud can remain the same without complicating the delivery of the core service itself.

Herein described are a variety of exemplary, non-limiting embodiments that illustrate the delivery of trusted data services. These embodiments are not standalone, but rather can be combined with one another where appropriate. In addition, any of the above-described embodiments can be extended in a number of alternative ways. For instance, in one embodiment, the trusted data services provide for the expiry and revocation of trapdoors or capabilities for greater degree of security over the access to the data. In another optional embodiment, a rights management layer is built into the provision of trusted data services, e.g., to preserve rights attached to content as part of encryption/decryption or to prevent acts with respect to copyrighted data in digital escrow that are more easily recognizable or detectable in the clear. Accordingly, any combinations or permutations of embodiments described herein are contemplated as within scope of the subject disclosure.

Exemplary Non-Limiting Implementation

An exemplary implementation of the digital escrow pattern is referred to as a Federated Trust Overlay (FTO). Attached in Appendix A are some additional non-limiting details about FTO implementations.

In this regard, the Digital Escrow Pattern is just an example of many possible patterns and variations. Furthermore, this pattern (which involves publishers, subscribers, administrators and auditors—and possibly other specialized roles as described above) is layered over another underlying FTO pattern, which performs the "church & state" separation of CTP, CSP, CKG, etc., to maintain trust. There can also be multiple, independent FTOs and DEPs that could co-exist without interfering with each other, and without even knowing about the existence of each other. Also, it is possible to overlay DEP and FTO patterns over Cloud storage without the Cloud Storage service provider co-operating, or even coming to know about the existence of these patterns/overlays.

In more detail, an FTO is a set of services that is independent of the data services in the cloud. These services are operated by parties other than the operator of the data services, and are able to provide strong guarantees regarding confidentiality, tamper detection and non-repudiation for the data hosted by the cloud services.

Any partner can construct and host these overlay services, e.g., a Mediator Service, the validation service, Storage Abstraction service, etc. These partners might choose to host a reference implementation, or construct their own implementation based on openly available formats and protocols.

Due to the open nature of the formats, protocols and the reference implementations, it would be straightforward to maintain a separation of control among parties, such as the operators of the FTO and the Data Owners.

While encryption is an element of this solution, the orchestration of services that are federated across different parties is also a part of the solution. While conventional encryption techniques are compelling for many scenarios, they preclude enabling many of the scenarios like tamper detection, non-repudiation, building trust by orchestrating multiple (untrusted) services, searching data repositories, etc.

Supplemental Context

For some additional non-limiting context, as described above, a trusted set of cloud offerings enables an application ecosystem for the cloud that builds on the trust. Various terminology used herein includes: CKG—Center for Key Generation, an entity that hosts a multi-tenant key generation center, e.g., any of Microsoft, VeriSign, Fidelity, A Sovereign Entity, Enterprise, Compliance Entity, etc. could host the CKG. In this regard, multi-tenancy is optional (e.g., desirable but not mandatory). Other terminology includes: CTP—Crypto Technology Provider, an entity that provides encryption technologies for use with the trusted ecosystem, e.g., any of Symantec, Certicom, Voltage, PGP Corp, BitArmor, Enterprise, Guardian, Sovereign Entity, etc. are example companies that could be CTPs.

In addition, the term CSP—Cloud Service Provider is an entity that provides cloud services, including storage. A variety of companies can provide such data services. A CIV—Cloud Index Validator is a second repository to validate returned indices. A CSA—Compute and Storage Abstraction abstracts the storage back-end. STF—Storage Transfer Format is a universal format for transferring data/metadata across repositories.

In this regard, as mentioned, some enterprise scenario(s) includes engineering extranet using data service technologies or applications, design and engineering analysis, defining data relationships among manufacturer and supplier(s), etc. A unique ecosystem is thus enabled for a whole variety of scenarios by distributing trust across multiple entities so that no 'uber' trusted entity or single point of compromise exists.

With respect to some supplemental context regarding searchable encryption, a user typically has or gets 'capabilities' or 'trapdoors' for keyword(s) and then sends a request using the 'capabilities' presenting them to the server. The server 'combines' capabilities and indices to find relevant documents or data. The user is then given access only to documents that result from the search (though the user may have access to more than just those documents).

As mentioned, no single algorithm should be considered as limiting on the provision of a searchably encrypted data store as described herein, however, the below generally outlines some of the theory behind an exemplary non-limiting algorithm and provides a primer for the Searchable Symmetric Encryption (SSE) Pattern:

Message: m

Keywords: $w_1, \ldots, w_n$

PRF: H

Generating escrow key

Choose random S for H

Encrypting

Choose random key K

Choose random fixed-length r

For $1 \leqq i \leqq n$

Compute $a_i = H_S(w_i)$

Compute $b_i = H_{ai}(r)$

Compute $c_i = b_i \oplus \text{flag}$

Output $(E_K(m), r, c_1, \ldots, c_n)$

Generating trapdoor or capability for w $d = H_{Sj}(w)$

Testing for w

Compute $p = H_d(r)$

Compute $z = p \oplus c_i$

Output "true" if z = flag

Decrypt $E_K(m)$ to obtain m

While again not to be considered limiting on any embodiment described herein, the following is a primer regarding public-key encryption w/keyword search (PEKS) pattern.

Public-key encryption a. PKE = (Gen, Enc, Dec)

Identity-based Encryption b. IBE = (Gen, Enc, Extract, Dec)

c. Generating master keys i. (msk,mpk) = IBE.Gen( )

d. Encrypting m for ID i.c = IBE.Enc(mpk, ID, m)

e. Generating secret key for ID i. sk = IBE.Extract(msk, ID)

f. Decrypting i. m = IBE.Dec(sk, c)

g. Message: m h. Keywords: $w_1, \ldots, w_n$ i. Generating escrow keys i. (msk, mpk) = IBE.Gen( )

ii. (pk,sk) = PKE.Gen( )

j. Encrypting k. For $1 \leqq i \leqq n$ i. $c_i$ = IBE.Enc(mpk, $w_i$, flag)

l. Return (PKE.Enc(pk,m), $c_1, \ldots, c_n$)

m. Generating capability or trapdoor for w i. d = IBE.Extract(msk, w)

n. Testing for w o. For $1 \leqq i \leqq n$ i. z = IBE.Dec(d, $c_i$)

ii. Output "true" if z = flag

Decrypt $E_K(m)$ to obtain m

Exemplary Networked and Distributed Environments

One of ordinary skill in the art can appreciate that the various embodiments of methods and devices for a trusted cloud services framework and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 41:
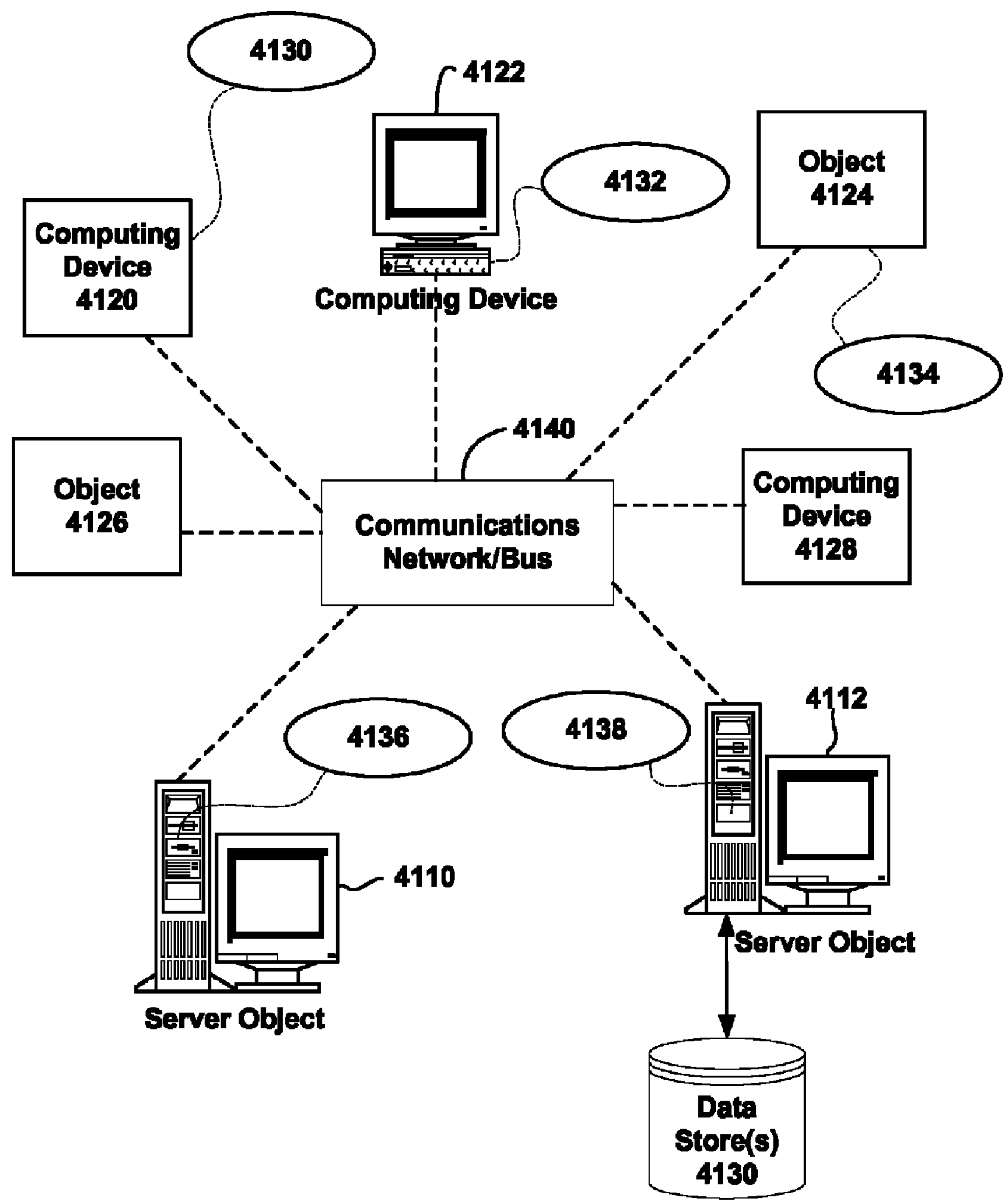
FIG. 41 is a block diagram representing exemplary non-limiting networked environments in which various embodiments described herein can be implemented.

FIG. 41 provides a non-limiting schematic diagram of an exemplary networked or distributed computing environment. The distributed computing environment comprises computing objects 4110, 4112, etc. and computing objects or devices 4120, 4122, 4124, 4126, 4128, etc., which may include programs, methods, data stores, programmable logic, etc., as represented by applications 4130, 4132, 4134, 4136, 4138. It can be appreciated that objects 4110, 4112, etc. and computing objects or devices 4120, 4122, 4124, 4126, 4128, etc. may comprise different devices, such as PDAs, audio/video devices, mobile phones, MP3 players, laptops, etc.

Each object 4110, 4112, etc. and computing objects or devices 4120, 4122, 4124, 4126, 4128, etc. can communicate with one or more other objects 4110, 4112, etc. and computing objects or devices 4120, 4122, 4124, 4126, 4128, etc. by way of the communications network 4140, either directly or indirectly. Even though illustrated as a single element in FIG. 41, network 4140 may comprise other computing objects and computing devices that provide services to the system of FIG. 41, and/or may represent multiple interconnected networks, which are not shown. Each object 4110, 4112, etc. or 4120, 4122, 4124, 4126, 4128, etc. can also contain an application, such as applications 4130, 4132, 4134, 4136, 4138, that might make use of an API, or other object, software, firmware and/or hardware, suitable for communication with or implementation of a trusted cloud computing service or application as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 41, as a non-limiting example, computers 4120, 4122, 4124, 4126, 4128, etc. can be thought of as clients and computers 4110, 4112, etc. can be thought of as servers where servers 4110, 4112, etc. provide data services, such as receiving data from client computers 4120, 4122, 4124, 4126, 4128, etc., storing of data, processing of data, transmitting data to client computers 4120, 4122, 4124, 4126, 4128, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 4140 is the Internet, for example, the servers 4110, 4112, etc. can be Web servers with which the clients 4120, 4122, 4124, 4126, 4128, etc. communicate via any of a number of known protocols, such as the hypertext transfer protocol (HTTP). Servers 4110, 4112, etc. may also serve as clients 4120, 4122, 4124, 4126, 4128, etc., as may be characteristic of a distributed computing environment.

Exemplary Computing Device

As mentioned, various embodiments described herein apply to any device wherein it may be desirable to implement one or pieces of a trusted cloud services framework. It should be understood, therefore, that handheld, portable and other computing devices and computing objects of all kinds are contemplated for use in connection with the various embodiments described herein, i.e., anywhere that a device may provide some functionality in connection with a trusted cloud services framework. Accordingly, the below general purpose remote computer described below in FIG. 42 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 42:
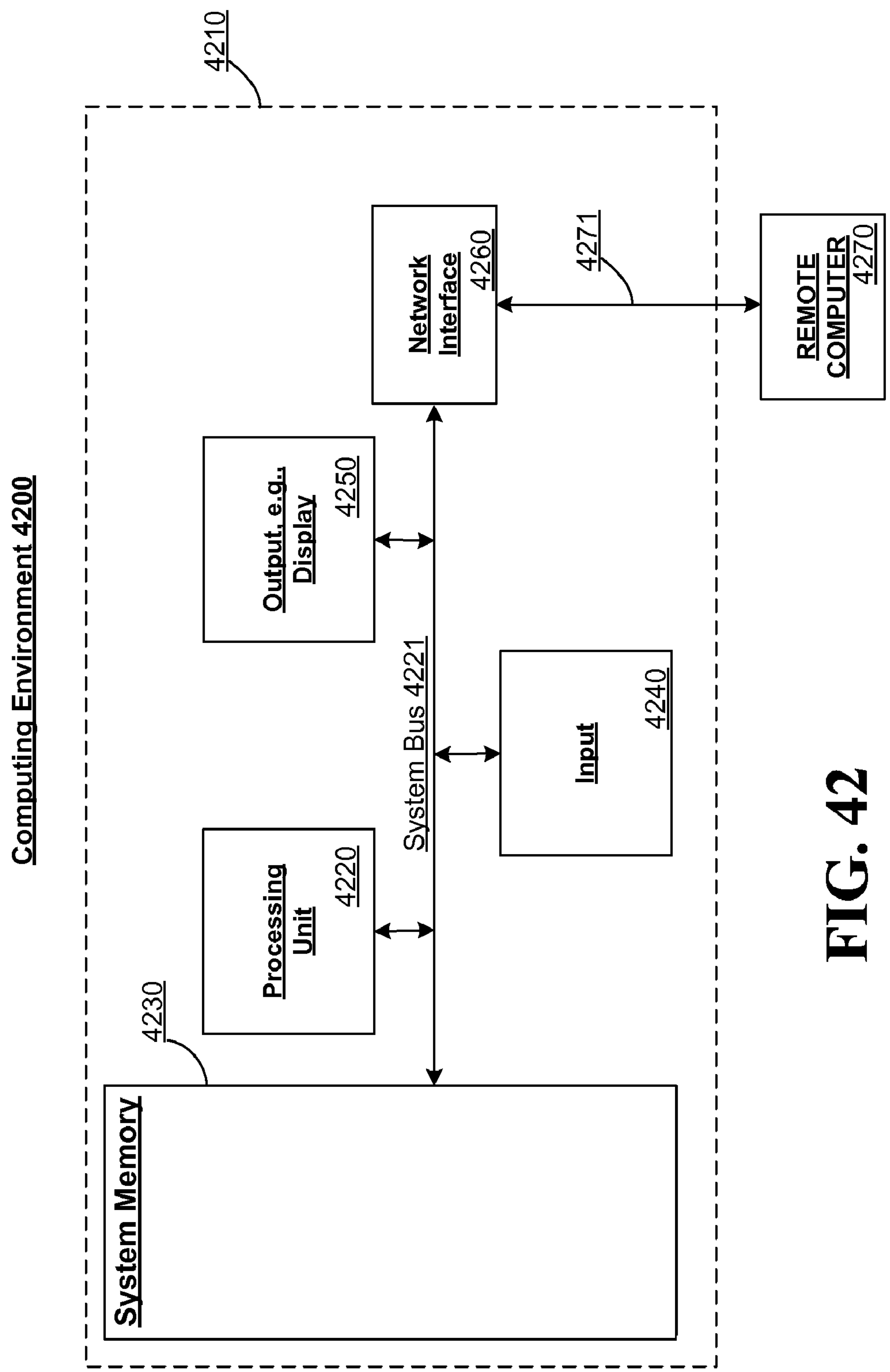
FIG. 42 is a block diagram representing an exemplary non-limiting computing system or operating environment in which one or more aspects of various embodiments described herein can be implemented.

FIG. 42 thus illustrates an example of a suitable computing system environment 4200 in which one or more of the embodiments may be implemented, although as made clear above, the computing system environment 4200 is only one example of a suitable computing environment and is not intended to suggest any limitation as to the scope of use or functionality of any of the embodiments. Neither should the computing environment 4200 be interpreted as having any dependency or requirement relating to any one or combination of components illustrated in the exemplary operating environment 4200.

With reference to FIG. 42, an exemplary remote device for implementing one or more embodiments herein can include a general purpose computing device in the form of a handheld computer 4210. Components of handheld computer 4210 may include, but are not limited to, a processing unit 4220, a system memory 4230, and a system bus 4221 that couples various system components including the system memory to the processing unit 4220.

Computer 4210 typically includes a variety of computer readable media and can be any available media that can be accessed by computer 4210. The system memory 4230 may include computer storage media in the form of volatile and/or nonvolatile memory such as read only memory (ROM) and/or random access memory (RAM). By way of example, and not limitation, memory 4230 may also include an operating system, application programs, other program modules, and program data.

A user may enter commands and information into the computer 4210 through input devices 4240 A monitor or other type of display device is also connected to the system bus 4221 via an interface, such as output interface 4250. In addition to a monitor, computers may also include other peripheral output devices such as speakers and a printer, which may be connected through output interface 4250.

The computer 4210 may operate in a networked or distributed environment using logical connections to one or more other remote computers, such as remote computer 4270. The remote computer 4270 may be a personal computer, a server, a router, a network PC, a peer device or other common network node, or any other remote media consumption or transmission device, and may include any or all of the elements described above relative to the computer 4210. The logical connections depicted in FIG. 42 include a network 4271, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to provide trust in connection with interactions with a cloud service.

There are multiple ways of implementing one or more of the embodiments described herein, e.g., an appropriate API, tool kit, driver code, operating system, control, standalone or downloadable software object, etc. which enables applications and services to use a trusted cloud services framework. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word “exemplary” is used herein to mean serving as an example, instance, or illustration. For the avoidance of doubt, the subject matter disclosed herein is not limited by such examples. In addition, any aspect or design described herein as “exemplary” is not necessarily to be construed as preferred or advantageous over other aspects or designs, nor is it meant to preclude equivalent exemplary structures and techniques known to those of ordinary skill in the art. Furthermore, to the extent that the terms “includes,” “has,” “contains,” and other similar words are used in either the detailed description or the claims, for the avoidance of doubt, such terms are intended to be inclusive in a manner similar to the term “comprising” as an open transition word without precluding any additional or other elements.

As mentioned, the various techniques described herein may be implemented in connection with hardware or software or, where appropriate, with a combination of both. As used herein, the terms “component,” “system” and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for publishing backup data, comprising:

encrypting, by at least one computing device of a publisher, modification data to form encrypted modification data representing a set of modifications to a data set of the at least one computing device of the publisher, the encrypted modification data formed according to at least one searchable encryption algorithm based on cryptographic key information received from a key generator that generates the cryptographic key information;

transmitting, by the at least one computing device of the publisher, the encrypted modification data to at least one computing device of a backup data service provider for update of synthetic full backup data stored by the at least one computing device of the backup data service provider; and proving, by the at least one computing device of the publisher, that the at least one computing device of the backup data service provider applied the set of modifications to the synthetic full backup data to update the synthetic full backup data.

2. The method of claim 1, further comprising:

generating, by the at least one computing device of the publisher, structural metadata describing the modification data;

encrypting, by the at least one computing device of the publisher, the structural metadata to form encrypted structural metadata; and transmitting, by the at least one computing device of the publisher, the encrypted structural metadata to the at least one computing device of the backup data service provider, wherein the encrypted structural metadata is selectively accessible by the at least one computing device of the backup data service provider.

3. The method of claim 1, further comprising:

generating, by the at least one computing device of the publisher, at least one cryptographic trapdoor based on the cryptographic key information for enabling selective access of the encrypted modification data by the at least one computing device of the backup data service provider as defined by the at least one cryptographic trapdoor.

4. The method of claim 1, wherein the proving includes determining whether the synthetic full backup data is updated within a pre-specified performance requirement with respect to updating the synthetic full backup data.

5. The method of claim 4, wherein the proving includes determining whether the synthetic full backup data is updated within a pre-specified time.

6. The method of claim 4, wherein the proving includes determining whether the synthetic full backup data is updated according to a pre-specified rate of processing the encrypted modification data.

7. The method of claim 1, wherein the proving includes determining that an analysis of the synthetic full backup data is identical to a corresponding analysis of the data set.

8. The method of claim 7, wherein the proving includes determining that an analysis of the synthetic full backup data is identical to a corresponding analysis of the data set for a corresponding point in modification history.

9. The method of claim 1, wherein the proving includes verifying that the synthetic full backup data includes auxiliary data supplied within the encrypted modification data at a specified location in the synthetic full backup data.

10. The method of claim 1, wherein the encrypting of modification data includes encrypting at least one transaction log recorded by the at least one computing device of the publisher.

11. A computer storage medium storing computer-executable instructions implementing the method of claim 1.

12. A method for publishing backup data, comprising:

encrypting, by at least one computing device of a publisher, modification data to form encrypted modification data representing a set of modifications to a data set of at least one computing device of the publisher, the encrypted modification data formed according to at least one searchable encryption algorithm based on cryptographic key information received from a key generator that generates the cryptographic key information; and transmitting, by the at least one computing device of the publisher, the encrypted modification data to at least one computing device of a backup data service provider for update of synthetic full backup data stored by the at least one computing device of the backup data service provider, wherein to reduce transmitting redundant data, the transmitting includes fingerprinting at least one data segment represented in the data set to form at least one fingerprint for replacing actual modification data when the at least one data segment is determined to be represented in a local set of fingerprints representing data segments of the data set.

13. The method of claim 12, further comprising:

comparing, by the at least one computing device of the publisher, the at least one fingerprint to the local set of fingerprints to determine actual modification data that can be replaced by the at least one fingerprint.

14. The method of claim 12, wherein the encrypting includes encrypting the at least one fingerprint to form at least one encrypted fingerprint according to at least one searchable encryption algorithm.

15. The method of claim 14, further comprising:

transmitting, by the at least one computing device of the publisher, the at least one encrypted fingerprint to the at least one computing device of the backup data service provider.

16. The method of claim 12, further comprising:

receiving, by the at least one computing device of the publisher, at least one encrypted fingerprint from the at least one computing device of the backup data service provider; and decrypting, by the at least one computing device of the publisher, the at least one encrypted fingerprint based on the cryptographic key information.

17. The method of claim 16, further comprising:

determining, by the at least one computing device of the publisher, a set of fingerprints not within the decrypted at least one encrypted fingerprint;

encrypting, by the at least one computing device of the publisher, the set of fingerprints to form a set of encrypted fingerprints; and transmitting, by the at least one computing device of the publisher, the set of encrypted fingerprints to the at least one computing device of the backup data service provider.

18. The method of claim 12, further comprising:

receiving, by the at least one computing device of the publisher, a set of encrypted fingerprints determined by the at least one computing device of the backup data service provider to be absent from the at least one computing device of the publisher.

19. The method of claim 12, wherein the fingerprinting includes fingerprinting the at least one data segment at a block level.

20. The method of claim 12, wherein the fingerprinting includes fingerprinting the at least one data segment at an object level.

21. A computer storage medium storing computer-executable instructions implementing the method of claim 12.

22. A method for subscribing to backup data, comprising:

after a failure of data of a data set of at least one computing device of a subscriber, requesting a restore of at least one data item of the data set from a backup data service that maintains synthetic full data corresponding to the data set in a searchably encrypted format;

receiving, by the at least one computing device of the subscriber, at least a portion of the at least one data item in an encrypted format from the backup data service;

restarting, by the at least one computing device of the subscriber, an application of the at least one computing device of the subscriber based on use of the at least a portion of the at least one data item; and subsequent to restarting the application, receiving any remaining data of the at least one data item not yet received by the at least one computing device of the subscriber.

23. A computer storage medium storing computer-executable instructions implementing the method of claim 22.

* * * * *